United States Patent
Wu et al.

(10) Patent No.: US 11,997,739 B2
(45) Date of Patent: May 28, 2024

(54) APPARATUS AND METHOD FOR IDLE MODE UPLINK TRANSMISSION IN WIRELESS COMMUNICATION SYSTEM

(71) Applicant: Samsung Electronics Co., Ltd., Suwon-si (KR)

(72) Inventors: Min Wu, Beijing (CN); Feifei Sun, Beijing (CN); Miao Zhou, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 17/250,591

(22) PCT Filed: Aug. 9, 2019

(86) PCT No.: PCT/KR2019/010029
§ 371 (c)(1),
(2) Date: Feb. 5, 2021

(87) PCT Pub. No.: WO2020/032659
PCT Pub. Date: Feb. 13, 2020

(65) Prior Publication Data
US 2021/0298108 A1 Sep. 23, 2021

(30) Foreign Application Priority Data

Aug. 9, 2018 (CN) .......................... 201810905324.8
Sep. 27, 2018 (CN) .......................... 201811136964.3
Nov. 1, 2018 (CN) .......................... 201811298996.3

(51) Int. Cl.
*H04W 76/19* (2018.01)
*H04W 56/00* (2009.01)
(Continued)

(52) U.S. Cl.
CPC ....... *H04W 76/19* (2018.02); *H04W 56/0045* (2013.01); *H04W 72/23* (2023.01);
(Continued)

(58) Field of Classification Search
CPC . H04L 27/2601; H04L 5/0053; H04L 5/0094; H04L 5/00; H04L 5/0044;
(Continued)

(56) References Cited

U.S. PATENT DOCUMENTS 10,869,272 B2    12/2020  Shu et al.
10,986,526 B2 *   4/2021  Chun ................... H04W 76/18
(Continued)

FOREIGN PATENT DOCUMENTS

CN        106686750 A      5/2017
CN        107155221 A      9/2017
(Continued)

OTHER PUBLICATIONS

International Search Report and Written Opinion of the International Searching Authority in connection with International Application No. PCT/KR2019/010029 dated Dec. 9, 2019 8 pages.
(Continued)

*Primary Examiner* — Nathan S Taylor

(57) ABSTRACT

The disclosure relates to a pre-5th-generation (5G) or 5G communication system to be provided for supporting higher data rates Beyond 4th-generation (4G) communication system such as long term evolution (LTE). Embodiments of the disclosure provide a method and device for RRC idle mode uplink transmission. The method may include: receiving a parameter and resource configuration for RRC idle mode uplink transmission; and, transmitting, in a RRC idle mode, uplink data according to preconfigured at least one of a
(Continued)

parameter or a resource. The method can improve system transmission efficiency and reduce user equipment power consumption.

16 Claims, 6 Drawing Sheets

(51) Int. Cl.
   *H04W 72/23*      (2023.01)
   *H04W 74/0833*    (2024.01)
   *H04W 76/27*      (2018.01)
   *H04W 76/30*      (2018.01)
   H04W 74/08        (2009.01)
(52) U.S. Cl.
   CPC ....... *H04W 74/0833* (2013.01); *H04W 76/27* (2018.02); *H04W 76/30* (2018.02)
(58) Field of Classification Search
   CPC ....... H04L 1/08; H04L 1/1819; H04L 1/1854; H04L 1/189; H04L 1/1896; H04L 5/0007; H04L 5/0051; H04L 5/0055; H04L 5/0091; H04L 5/0096; H04L 5/10; H04L 41/06; H04L 1/18; H04L 1/1812; H04L 1/1867; H04L 1/00; H04W 28/0268; H04W 28/10; H04W 76/10; H04W 80/02; H04W 76/12; H04W 28/02; H04W 80/10; H04W 76/20; H04W 52/0235; H04W 74/0833; H04W 76/27; H04W 76/28; H04W 72/21; H04W 72/23; H04W 4/70; H04W 52/02; H04W 72/04; H04W 74/04; H04W 74/08; H04W 76/00; H04W 72/12; H04W 76/30; H04W 56/0045; H04W 56/0055; H04W 74/006; H04W 74/0891; H04W 76/19; H04W 76/38; H04W 24/08; H04W 36/0055; H04W 36/08; H04W 36/14; H04W 52/0209; H04W 68/005; H04W 68/02; H04W 72/0446; H04W 72/51; H04W 74/02; H04W 76/36; H04W 8/24; H04W 56/0005; H04W 72/046; H04W 72/1268; H04W 74/002; H04W 76/32; H04W 52/0229; H04W 52/028; H04W 52/325; H04W 52/36; H04W 52/50; H04W 56/00; H04W 68/00; H04W 4/00; H04W 74/00; H04W 52/32; Y02D 30/70; H04B 1/713; H04B 1/7143; H04J 13/0062; H04J 13/00
   See application file for complete search history.

(56) References Cited

U.S. PATENT DOCUMENTS

| | | | |
|---|---|---|---|
| 11,510,240 B2 * | 11/2022 | Lee | H04W 74/02 |
| 2014/0022990 A1 | 1/2014 | Guo et al. | |
| 2015/0312826 A1 | 10/2015 | Yiu et al. | |
| 2016/0192431 A1 | 6/2016 | Guo et al. | |
| 2016/0366682 A1 * | 12/2016 | Tseng | H04W 72/04 |
| 2017/0195949 A1 | 7/2017 | Nagasaka et al. | |
| 2018/0139778 A1 | 5/2018 | Chou et al. | |
| 2018/0270716 A1 | 9/2018 | Takahashi et al. | |
| 2018/0279267 A1 * | 9/2018 | Yasukawa | H04W 48/10 |
| 2019/0215907 A1 * | 7/2019 | Phuyal | H04W 76/27 |
| 2020/0037345 A1 * | 1/2020 | Ryoo | H04W 72/1268 |
| 2020/0187245 A1 * | 6/2020 | Fujishiro | H04W 74/0833 |
| 2020/0322994 A1 * | 10/2020 | Tian | H04W 76/27 |
| 2021/0120622 A1 * | 4/2021 | Fujishiro | H04W 76/27 |
| 2021/0168894 A1 * | 6/2021 | Sha | H04L 5/0053 |
| 2021/0168895 A1 * | 6/2021 | Sha | H04W 76/27 |
| 2021/0204192 A1 * | 7/2021 | Lee | H04L 67/62 |
| 2021/0274526 A1 * | 9/2021 | Shin | H04L 1/1896 |
| 2021/0314925 A1 * | 10/2021 | Shin | H04L 5/0053 |
| 2021/0321413 A1 * | 10/2021 | Shin | H04W 72/23 |
| 2021/0337588 A1 * | 10/2021 | Lee | H04W 72/23 |
| 2022/0256587 A1 * | 8/2022 | Fujishiro | H04W 72/21 |

FOREIGN PATENT DOCUMENTS

| | | | | |
|---|---|---|---|---|
| EP | 3252985 | A1 | 6/2017 | |
| EP | 3422788 | A1 | 1/2019 | |
| JP | 2018-026773 | A | 2/2018 | |
| WO | 2016130264 | A1 | 8/2016 | |
| WO | WO-2020067711 | A1 * | 4/2020 | ........ H04W 72/0446 |

OTHER PUBLICATIONS

LG Electronics Inc., "Further consideration on SPS for NB-IoT", 3GPP TSG-RAN WG2 Meeting #101, Feb. 26-Mar. 2, 2018, R2-1802995, 4 pages.
Huawei, et al., "Early data transmission on dedicated resource for Rel-15 MTC", 3GPP TSG RAN WG2 #99 Meeting, Aug. 21-25, 2017, R2-1709334, 2 pages.
Huawei et al., "Semi-Persistent Scheduling in NB-Iot", 3GPP TSG-RAN WG2 Meeting #99, Aug. 21-25, 2017, R2-1708302, 5 pages.
Qualcomm Incorporated, "UL early data transmission", 3GPP TSG-RAN WG2 Meeting #99, Aug. 21-25, 2017, R2-1708239, 13 pages.
Supplementary European Search Report dated Aug. 4, 2021 in connection with European Patent Application No. 19 84 6208, 9 pages.
Office Action dated Jan. 5, 2023 in connection with Chinese Patent Application No. 201811298996.3, 8 pages.
European Search Report dated Oct. 17, 2023, in connection with European Application No. 23183465.6, 9 pages.
3GPP TS 36.321 V15.2.0 (Jul. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15), Jul. 2018, 126 pages.

* cited by examiner

[Fig. 1]
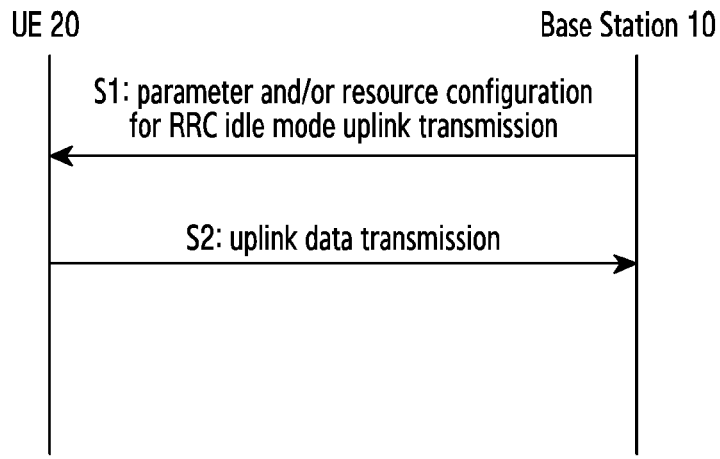
[Fig. 2]
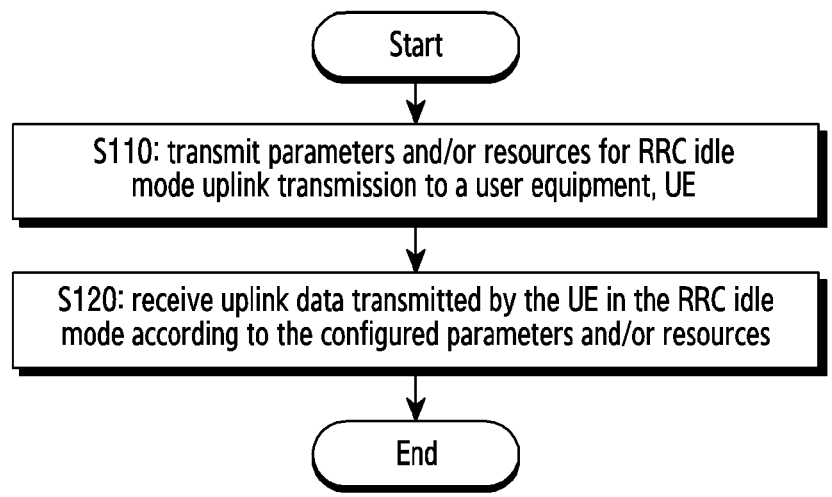
[Fig. 3]
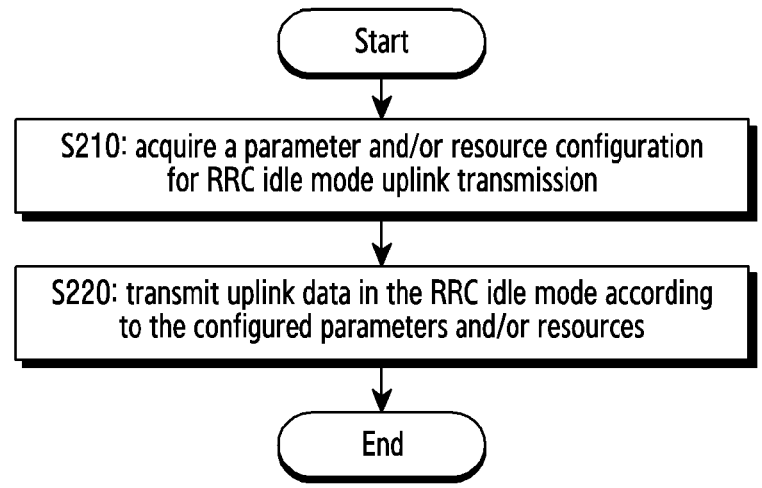

[Fig. 4]
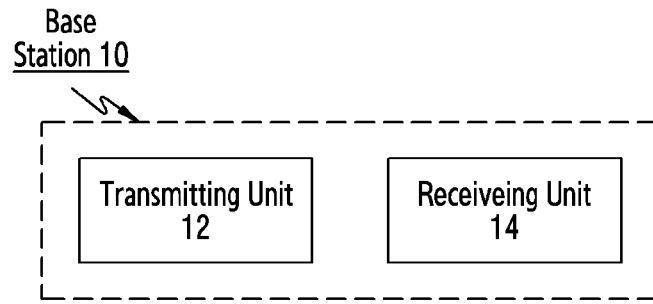
[Fig. 5]
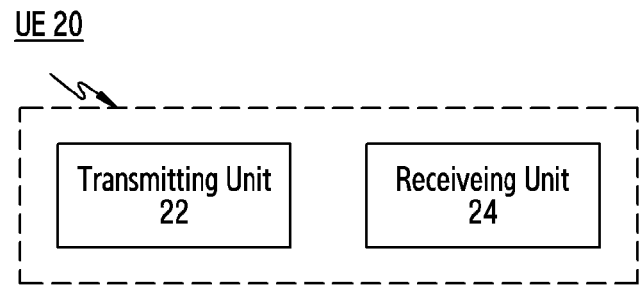
[Fig. 6]
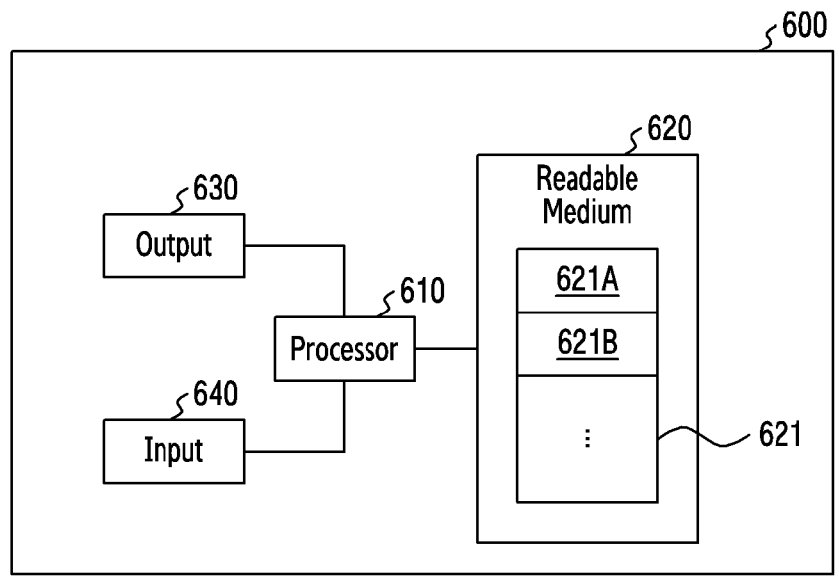

[Fig. 7]
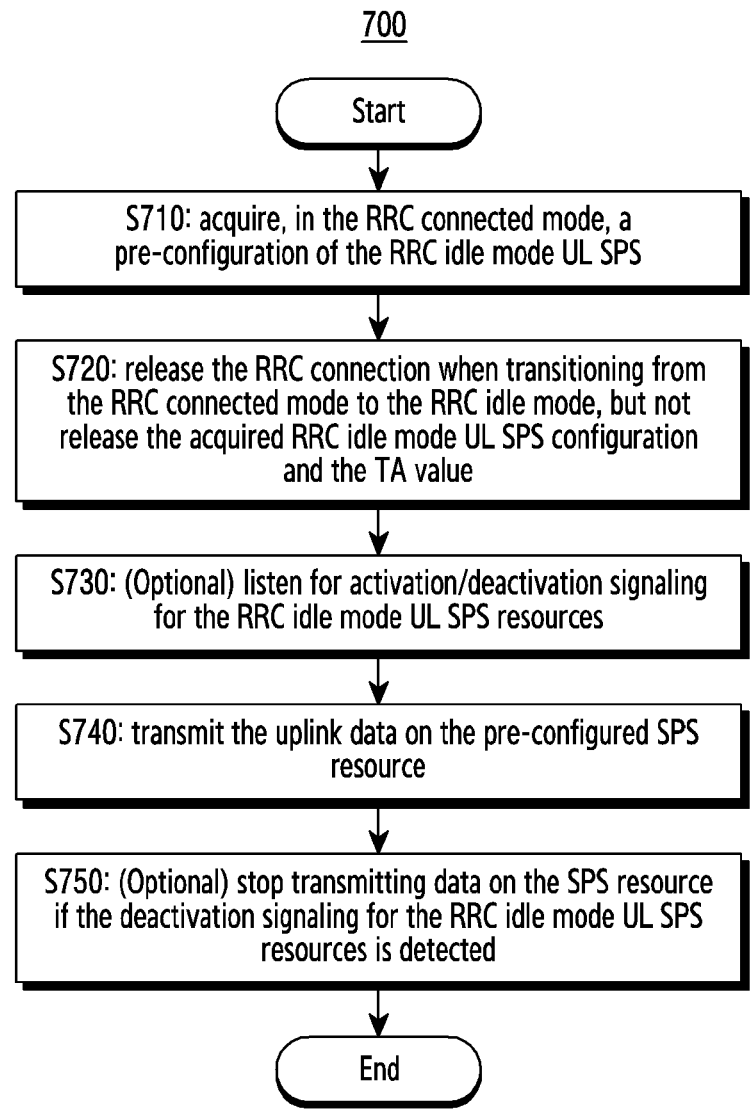

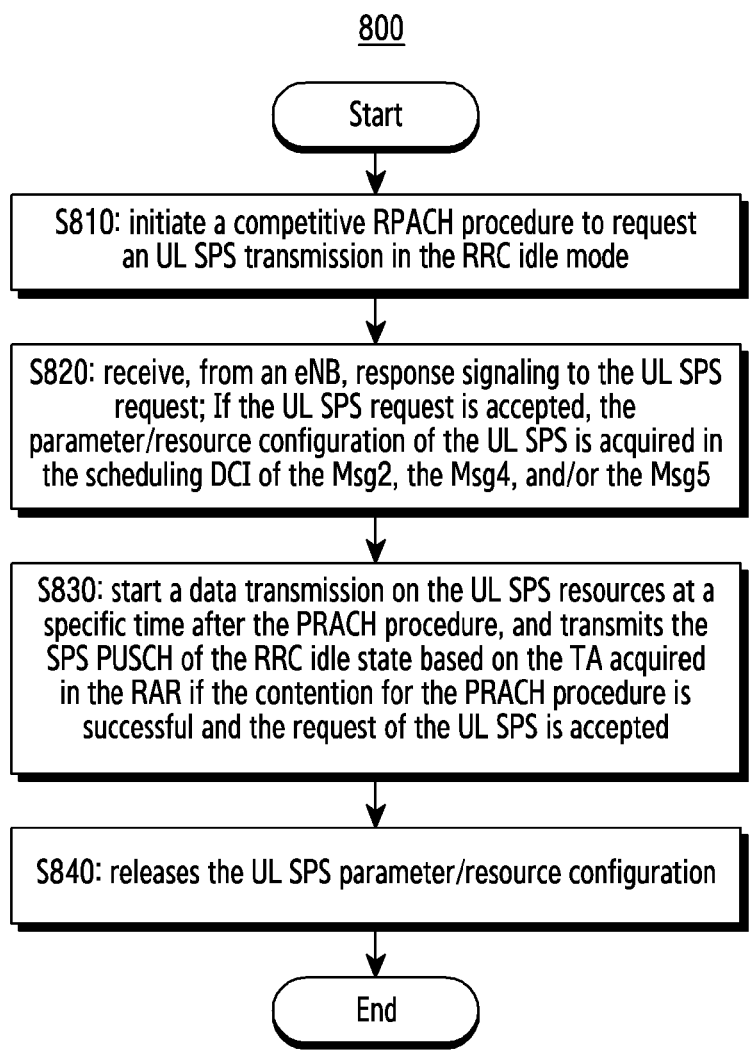

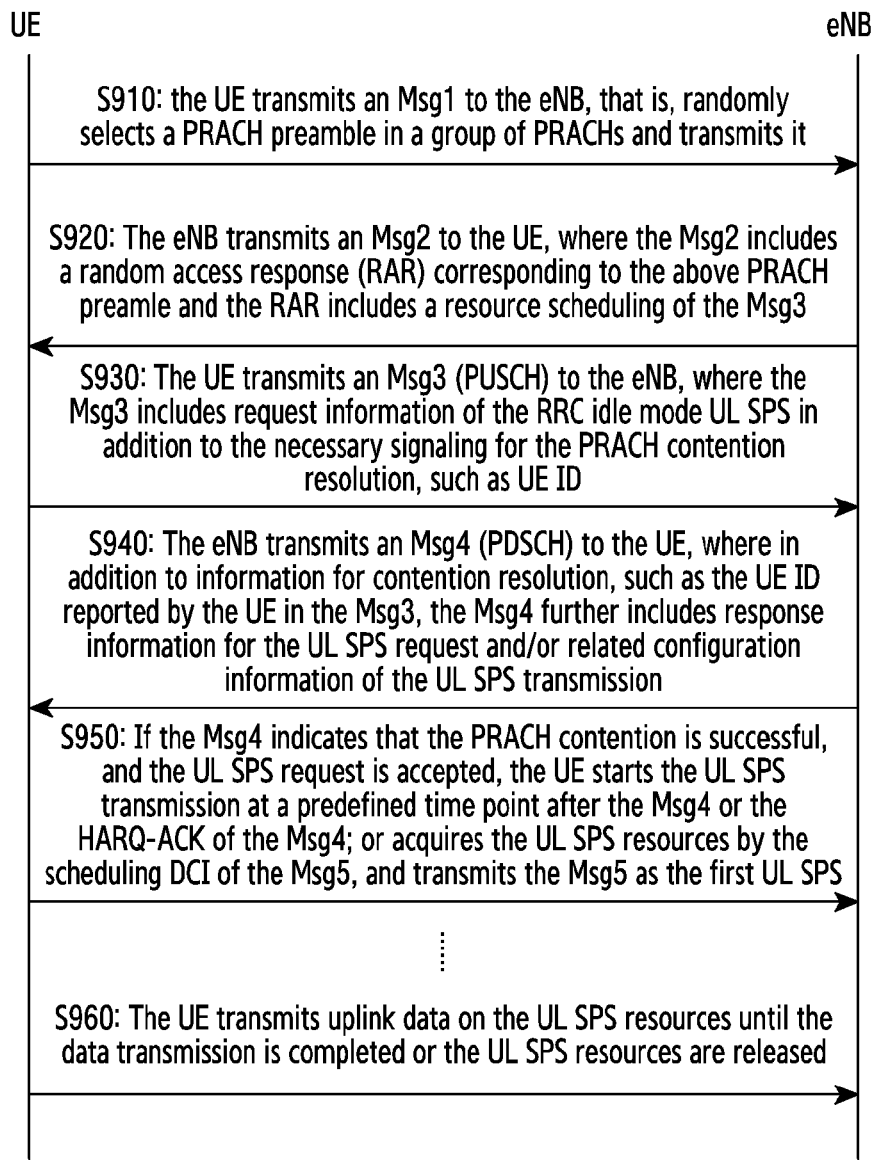
[Fig. 9]

[Fig. 10]
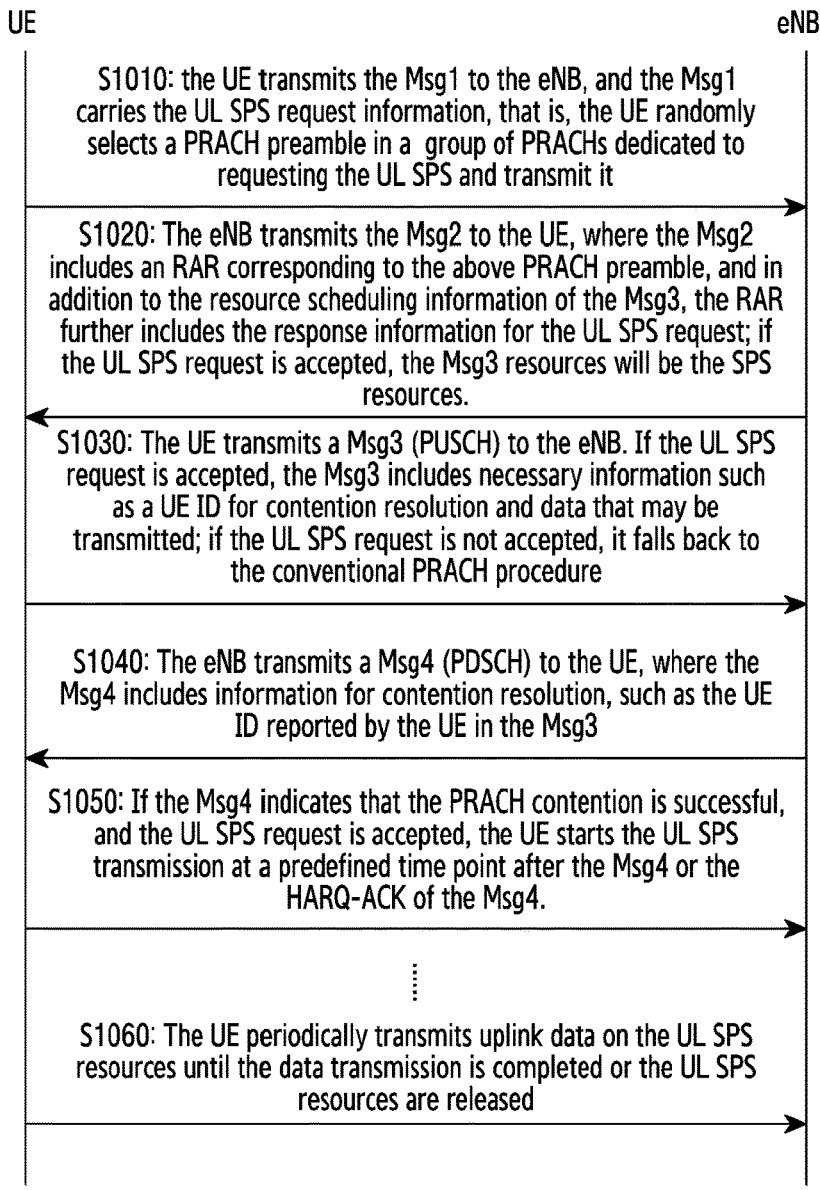
[Fig. 11]
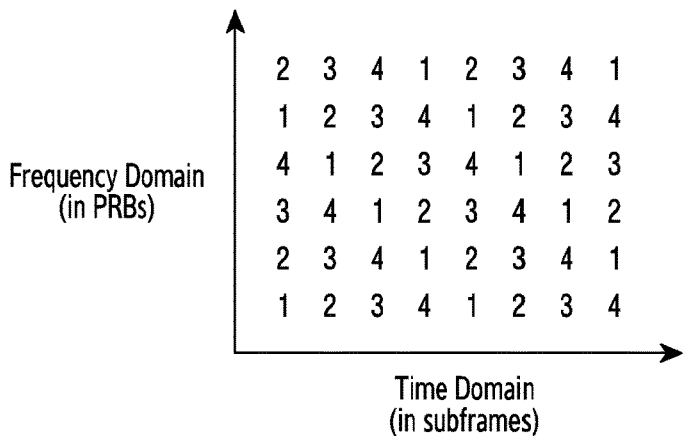

APPARATUS AND METHOD FOR IDLE MODE UPLINK TRANSMISSION IN WIRELESS COMMUNICATION SYSTEM

CROSS-REFERENCE TO RELATED APPLICATIONS

This application is a 371 National Stage of International Application No. PCT/KR2019/010029, filed Aug. 9, 2019, which claims priority to Chinese Patent Application No. 201810905324.8, filed Aug. 9, 2018, Chinese Patent Application No. 201811136964.3, filed Sep. 27, 2018, and Chinese Patent Application No. 201811298996.3, filed Nov. 1, 2018, the disclosures of which are herein incorporated by reference in their entirety.

BACKGROUND

1. Field

The disclosure relates to the field of communication technologies, and in particular, the disclosure relates to a method and device for radio resource control (RRC) idle mode uplink (UL) transmission.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

For internet-of-things (TOT) user equipment (UE) such as machine-type control (MTC) UE and narrow band internet of things (NB-IOT), there are high requirements on the life of battery due to the limitation of the application scenario. UE power consumption is a key improvement indicator when designing a system, and the related standards are also evolving based on the target of reducing the UE power consumption. In the long term evolution (LTE) R-16 efeMTC and NB-IOT systems, one technical requirement is to support uplink transmission in RRC idle mode (hereinafter referred to as RRC idle mode uplink transmission). In existing LTE systems, UL transmission is only supported in the RRC connected mode. Therefore, a new mechanism is needed to support the RRC idle mode UL transmission.

SUMMARY

To this end, embodiments of the disclosure propose a method for supporting the RRC idle mode uplink transmission, and a corresponding user equipment and a base station.

Solution to Problem

According to a first aspect of the disclosure, A method for operating a user equipment (UE) in a wireless communication system, the method comprising: receiving at least one of a parameter or a resource configuration for radio resource control, (RRC) idle mode uplink transmission; and transmitting uplink data in the RRC idle mode according to the preconfigured at least one of a parameter or a resource.

According to a first aspect of the disclosure, a method performed in a user equipment is provided. The method includes: receiving at least one of a parameter or a resource configuration for RRC idle mode uplink transmission; and, transmitting, in a RRC idle mode, uplink data according to configured at least one of a parameter or a resource.

In some embodiments, the receiving at least one of a parameter or a resource configuration for RRC idle mode uplink transmission may include: receiving at least one of a parameter or a resource configuration for RRC idle mode uplink transmission in a RRC connected mode; and not releasing the configured at least one of a parameter or a resource for the RRC idle mode uplink transmission when the RRC connection is released. Thus, in the RRC idle mode, the UE may transmit uplink data on the configured resources. The receiving at least one of a parameter or a resource configuration for RRC idle mode uplink transmission in a RRC connected mode may include: receiving at least one of a parameter or a resource configuration for RRC idle mode uplink transmission via UE-specific RRC signaling in a RRC connected mode. In the above embodiments, a transmission period on the configured resources for the RRC idle mode uplink transmission may be set longer, even in minutes or hours.

In the above embodiments, a timing advance (TA) for transmitting the RRC idle mode uplink transmission may use the TA received in the RRC connected mode. Here, a timing alignment timer (TimeAlignmentTimer) for managing the TA in the RRC connected mode is configured to be infinity, and when the RRC connection is released, the TA received in the RRC connected mode is not released. Thus, the method may further include: receiving a timing advance TA in the RRC connected mode; and, when the RRC connection is released, not releasing the TA for use in transmitting uplink data in the RRC idle mode.

In some systems, the configured resources may be available.

In other systems, the configured resources are not available. In such a system, the configured resources for RRC idle mode uplink transmissions can be activated/deactivated by activation/deactivation signaling. In such an embodiment, the method may further include: monitoring the activation signaling in the RRC idle mode, the activation signaling being used to activate the configured resources for RRC idle mode uplink transmission. In the RRC idle mode, the UE transmits uplink data on the activated resources. Optionally, the method may further include: monitoring the deactivation signaling in the RRC idle mode, the deactivation signaling being used to deactivate the configured resources for RRC idle mode uplink transmission. When the UE detects the deactivation signaling, it will stop transmitting the uplink data. The activation/deactivation signaling may be the same signaling in which different carried values are used to indicate whether the activation or the deactivation is instructed. Optionally, the activation/deactivation signaling may also be different signaling. The activation/deactivation signaling may be carried by system broadcast information, or the activation/deactivation signaling may be carried by paging information. Throughout the text, "activation" refers to that the resources indicated by the saved resource configuration information are currently available; while "deactivation" refers to that the resources indicated by the saved resource configuration information are currently unavailable, but the related configuration information is still to be saved.

In other embodiments, the receiving at least one of a parameter or a resource configuration for RRC idle mode uplink transmission includes: requesting at least one of the parameter or the resource configuration for RRC idle mode uplink transmission via a random access procedure.

In the foregoing embodiment, the TA used for the RRC idle mode uplink transmission may use the TA received via a random access response (RAR) (i.e., random access message 2) in the random access procedure until the TimeAlignmentTimer expires. Optionally, the TA used for the RRC idle mode uplink transmission may also be received via downlink control information (DCI). Thus, the method may further include: receiving a timing advance TA for the RRC idle mode uplink transmission via a random access message 2; or receiving the TA for the RRC idle mode uplink transmission via the DCI.

In some systems, the base station may reject the request by the UE. If the base station rejects the request during the random access procedure, then the random access procedure falls back to the random access procedure used to establish or resume the RRC connection. If the base station accepts the request in the random access procedure, at least one of a parameter or a resource for RRC idle mode uplink transmission will be configured during or after the random access procedure.

In other systems, the base station accepts the request by the UE, and then the base station will configure at least one of a parameter or a resource for RRC idle mode uplink transmission during or after the random access procedure.

Preferably, the UE may transmit the request information via a random access message 3, and receive at least one of the parameter or the resource configuration for the RRC idle mode uplink transmission via a random access message 4. Optionally, the UE may transmit the request information via a random access message 3, receive a parameter configuration for the RRC idle mode uplink transmission via a random access message 4, and receive a resource configuration for the RRC idle mode uplink transmission via the scheduling DCI of a random access message 5.

Optionally, the method may further include: releasing the configured at least one of a parameter or a resource for the RRC idle mode uplink transmission. Releasing the configured at least one of a parameter or a resource for the RRC idle mode uplink transmission may be implemented by any of the following: releasing the configured at least one of a parameter or a resource after a predefined number of RRC idle mode uplink blank transmissions (throughout the text, "blank transmission" refers to that there is no data transmitted on the configured resources); releasing the configured at least one of a parameter or a resource after the timing alignment timer (TimeAlignmentTimer) for managing the timing advance (TA) expires; and releasing the configured at least one of a parameter or a resource after the release signaling from the base station is received. The release signaling may be carried, for example, by DCI (hereinafter, such DCI is also referred to as release DCI). "Release" refers to emptying related configuration information, that is, related configuration information is deleted, and resources indicated by the related configuration information will not be used.

Optionally, the method may further include: after a predetermined number of transmissions on the RRC idle mode configuration uplink resources have failed, initiating a random access procedure to establish or resume the RRC connection. In some systems, from the perspective of the UE, the configured resources for the RRC idle mode uplink transmission are specific to a certain UE, and a RRC idle mode uplink transmission is considered successful only after the UE has received acknowledgment (ACK) signaling for this uplink transmission, or otherwise, this uplink transmission is considered unsuccessful. In other systems, from the perspective of the UE, the configured resources for the RRC idle mode uplink transmission are shared by multiple UEs. The UE needs to perform a contention resolution procedure when it initiates a transmission on the configured shared uplink resource. Only if the UE succeeds in the contention, the uplink transmission is considered to be successful, otherwise, the uplink transmission is considered unsuccessful.

In some embodiments, the receiving at least one of a parameter or a resource configuration for RRC idle mode uplink transmission may include: receiving at least one of the parameter or the resource configuration for RRC idle mode uplink transmission by reading system broadcast information in the RRC idle mode.

In the above embodiment, the method may further include: receiving multiple at least one of a parameter or a resource configurations for RRC idle mode uplink transmission by reading system broadcast information in the RRC idle mode; and selecting randomly one of the configured multiple resources to initiate a contention based transmission. The contention based transmission further includes: transmitting uplink data on one randomly selected configured resource, and carrying information such as a user equipment identity (UE ID); and monitoring contention resolution signaling in a predefined time window after the transmission of the data; if the UE ID of contained in the received contention resolution signaling is the same as a reported UE ID, the uplink data transmission is considered successful, otherwise, the uplink data transmission is considered unsuccessful, and a configured resource is reselected to initiate the contention based transmission.

In some systems, each uplink transmission on the configured RRC idle mode uplink transmission resources initiates a contention resolution procedure.

In other systems, each time a contention based transmission is initiated on the configured RRC idle mode uplink transmission resources and it succeeds in the contention, it may occupy multiple periods of the configured resources, without the need to initiate the contention resolution procedure again. Optionally, the occupying multiple periods of the configured resources further includes: consecutively occupying a predefined number of configured resources obtained after the success in the contention. Optionally, the occupying multiple periods of the configured resources further includes: occupying the configured resources obtained after the success in the contention until the uplink data transmission is completed.

According to a second aspect of the disclosure, a user equipment is disclosed. The user equipment includes: a processing unit; and a storage unit for storing machine readable instructions that, when executed by the processing unit, configure the processing unit to perform the above method.

According to a third aspect of the disclosure, a method performed in a base station is disclosed. The method includes: configuring, for a User Equipment, UE, at least one of a parameter or a resource for RRC idle mode uplink transmission; and receiving, according to the configured at least one of a parameter or a resource, uplink data transmitted by the UE in the RRC idle mode.

In some embodiments, the configuring, for a User Equipment, UE, a resource configuration for RRC idle mode uplink transmission may include: transmitting at least one of a parameter or a resource configuration for RRC idle mode uplink transmission to the UE when the UE is in a RRC connected mode; and not releasing the configured at least one of a parameter or a resource for the RRC idle mode uplink transmission when the RRC connection to the UE is released.

In some systems, the configured resources may be available.

In other systems, the configured resources are not available. In such a system, the configured resources for RRC idle mode uplink transmissions can be activated/deactivated by activation/deactivation signaling. In such an embodiment, the method then may further include: transmitting the activation signaling to the UE, the activation signaling being used to activate the configured resources for RRC idle mode uplink transmission. Optionally, the method may further include: transmitting the deactivation signaling to the UE, the deactivation signaling being used to deactivate the configured resources for RRC idle mode uplink transmission. The activation/deactivation signaling may be carried by system broadcast information, or the activation/deactivation signaling may be carried by paging information.

In other embodiments, the configuring, for a User Equipment, UE, at least one of a parameter or a resource for RRC idle mode uplink transmission may include: configuring, for the UE, at least one of a parameter or a resource for RRC idle mode uplink transmission via a random access procedure. Optionally, the base station may receive, via a random access message 3, request information for requesting by the UE at least one of the parameter or the resource for the RRC idle mode uplink transmission, and transmit at least one of the parameter or the resource configuration for the RRC idle mode uplink transmission via a random access message 4. Optionally, the base station may receive, via a random access message 3, request information for requesting by the UE at least one of the parameter or the resource for the RRC idle mode uplink transmission, transmit to the UE a parameter configuration for the RRC idle mode uplink transmission via a random access message 4, and transmit a resource configuration for the RRC idle mode uplink transmission via the scheduling DCI of a random access message 5.

Optionally, the method may further include: transmitting release signaling to the UE to instruct the UE to release the configured at least one of a parameter or a resource for the RRC idle mode uplink transmission.

Optionally, the method may further include: transmitting to the UE a TA for the RRC idle mode uplink transmission via DCI.

According a fourth aspect of the disclosure, a base station is provided. The base station includes: a processing unit; and a storage unit for storing machine readable instructions that, when executed by the processing unit, configure the processing unit to perform the method of the third aspect of the disclosure.

According to a fifth aspect of the disclosure, there is provided an Machine readable storage medium having stored thereon machine readable instructions that, when executed by an Machine, perform any of the above methods.

According to embodiments of the disclosure, the signaling overhead of establishing a RRC connection and the dynamic scheduling signaling for each physical uplink shared channel (PUSCH) transmission are saved, and the additional UE power consumption in the RRC connected mode is also avoided, thereby increasing the system transmission efficiency and reducing the UE power consumption.

BRIEF DESCRIPTION OF THE DRAWINGS

The above and additional aspects and advantages of the disclosure will become more apparent and easy to be understood from the following description taken in conjunction with the accompanying drawings, in which:

FIG. 1 schematically illustrates a flowchart of a method for RRC idle mode uplink transmission according to an embodiment of the disclosure.

FIG. 2 schematically shows a flowchart of operations on the base station side of the method for RRC idle mode uplink transmission according to an embodiment of the disclosure.

FIG. 3 schematically shows a flowchart of operations on the UE side of the method for RRC idle mode uplink transmission according to an embodiment of the disclosure.

FIG. 4 schematically shows a block diagram of a base station according to an embodiment of the disclosure.

FIG. 5 schematically shows a block diagram of a UE according to an embodiment of the disclosure.

FIG. 6 schematically illustrates a block diagram of a computing system that can be used to implement the base station or the user equipment of the disclosure, according to an embodiment of the disclosure.

FIG. 7 schematically illustrates a flowchart of an RRC idle mode uplink transmission method for configuring at least one of a parameter or a resource for RRC idle mode uplink transmission via UE-specific RRC signaling, according to an exemplary embodiment of the disclosure.

FIG. 8 schematically illustrates a flowchart of an RRC idle mode uplink transmission method for requesting, via a random access procedure, to configure at least one of a parameter or a resource for RRC idle mode uplink transmission, according to another exemplary embodiment of the disclosure.

FIG. 9 schematically illustrates a flowchart of an RRC idle mode uplink transmission method for receiving, via a random access procedure, at least one of a parameter or a resource configuration for RRC idle mode uplink transmission, according to another exemplary embodiment of the disclosure.

FIG. 10 schematically illustrates a flowchart of an RRC idle mode uplink method for receiving, via a random access procedure, at least one of a parameter or a resource configuration for RRC idle mode uplink transmission, according to another exemplary embodiment of the disclosure.

FIG. 11 schematically illustrates a cycling of the mapping relationship between the CRS and the MPDCCH DMRS, according to another exemplary embodiment of the disclosure.

The same or similar structures in the drawings are identified by the same or similar reference numerals.

DETAILED DESCRIPTION

The disclosure is described in detail below with respect to the accompanying drawings and particular implementations. It should be noted that the disclosure should not be limited to the particular implementations described below. The particular implementations shown herein are illustrative, and should not be construed as limiting. In addition, detailed descriptions of well-known technologies that are not directly related to the disclosure are omitted for the sake of brevity in order to prevent any obscure understanding of the disclosure.

As can be understood by those skilled in the art, the singular forms "a," "an," "said" and "the" used herein may also include the plural form, unless specifically stated. It is to be further understood that the word "comprise" used in the specification of the disclosure means that at least one of a feature, a integer, a step, a operation, a element or a component are present, not excluding the existence or adding of at least one of other feature, integer, step, operation, element, component or group thereof. It should be understood that when an element is referred to as being "connected" or "coupled" to another element, it can be directly connected or coupled to the another element, or there may be an intermediate element therebetween. Further, "connect" or "couple" used herein may include either a wireless connection or a wireless coupling.

Those skilled in the art will appreciate that all terms (including technical and scientific terms) used herein have the same meaning as commonly understood by one with ordinary skills in the art to which this disclosure belongs, unless specifically stated. It should also be understood that terms such as those defined in a general dictionary should be understood to have meaning consistent with the meaning in the context of the prior art, and will not be explained in an idealized or excessive formal way, unless specifically defined as here.

The solutions of the disclosure will be described in detail below with respect to the accompanying drawings.

FIG. 1 schematically shows a signal flowchart of a method 100 for RRC idle mode uplink transmission according to an embodiment of the disclosure.

As shown, in step S1: base station 10 configures, for UE 20, at least one of a parameter or a resource for RRC idle mode uplink transmission.

Step S1 can be implemented in a variety of ways. Several examples are shown below:
1. The base station 10 may transmit, via UE-specific RRC signaling, at least one of a parameter or a resource configuration for the RRC idle mode uplink transmission to the UE 20 in the RRC connected mode.
2. The base station 10 may broadcast at least one of the parameter or the resource configuration for the RRC idle mode uplink transmission via system broadcast information (such as system information block, SIB for short). The UE 20 may receive, in the RRC idle mode, at least one of the parameter or the resource configuration by reading the system broadcast information.
3. The base station 10 may configure at least one of the parameter or the resource for RRC idle mode uplink transmission via a random access procedure (hereinafter referred to as a physical random access channel (PRACH) procedure). The UE 20 may request, in the RRC idle mode, at least one of a parameter or a resource configuration for RRC idle mode uplink transmission via the PRACH procedure.

In the first method, the UE 20 may receive, in the RRC connected mode, at least one of the parameter or the resource configuration for RRC idle mode uplink transmission, and save it for use in the RRC idle mode. In such a system, a transmission period on the configured resources for the RRC idle mode uplink transmission may be set longer, even in minutes or hours.

In some systems, the configured resources may be available.

In other systems, the configured resources are not available. In such a system, the configured resources for RRC idle mode uplink transmissions can be activated/deactivated by activation/deactivation signaling.

In the second method, the UE 20 may receive, in the RRC idle mode, at least one of the parameter or the resource configuration for RRC idle mode uplink transmission by reading the system broadcast information.

Preferably, the system may configure multiple resources for RRC idle mode uplink transmission. The UE 20 can then randomly select a resource of the configured multiple resources to initiate a contention based transmission. For example, the contention based transmission may include: transmitting uplink data on the randomly selected resource, and carrying information such as UE ID; and monitoring contention resolution signaling in a predefined time window after the transmission of the data; if the UE ID of contained in the received contention resolution signaling is the same as a reported UE ID, the uplink data transmission is considered successful, otherwise, the uplink data transmission is considered unsuccessful, and a configured resource is reselected to initiate the contention based transmission.

In some systems, the UE 20 initiates a contention resolution procedure per uplink transmission on the configured RRC idle mode uplink transmission resources.

In other systems, each time the UE 20 initiates a contention based transmission on the configured RRC idle mode uplink transmission resources and succeeds in the contention, it may occupy multiple periods of the configured resources, without the need to initiate the contention resolution procedure again. Optionally, the occupying multiple periods of the configured resources may include consecutively occupying a predefined number of configured resources obtained after the success in the contention. Optionally, the occupying multiple cycles of the configured resources may include: occupying the configured resources obtained after the success in the contention until the uplink data transmission is completed.

In the third method, when the UE 20 is in the RRC idle mode and there is uplink data to be transmitted, the UE 20 may initiate a PRACH procedure to request at least one of a parameter or a resource configuration for RRC idle mode uplink transmission. In response to the request by the UE 20, the base station 10 may configures, for the UE 20, at least one of a parameter or a resource for RRC idle mode uplink transmission.

In some systems, the base station 10 may reject the request by the UE 20. If the base station 10 rejects the request during the PRACH procedure, then the PRACH procedure may fall back to the PRACH procedure used to establish or resume the RRC connection. If the base station 10 accepts the request in the PRACH procedure, at least one of a parameter or a resource for RRC idle mode uplink transmission will be configured during or after the PRACH procedure.

In other systems, the base station accepts the request by the UE, and then the base station will configure at least one of a parameter or a resource for RRC idle mode uplink transmission during or after the PRACH procedure.

Preferably, the UE 20 may transmit, via a random access message 3, request information for requesting at least one of the parameter or the resource configuration for the RRC idle mode uplink transmission, and then the base station 10 may transmit, to the UE 20, at least one of a parameter or a resource configuration information for the RRC idle mode uplink transmission via a random access message 4. Optionally, the UE 20 may transmit the request information via a random access message 3, and then the base station may transmit parameter configuration information for the RRC idle mode uplink transmission via a random access message 4, and transmit resource configuration information for the RRC idle mode uplink transmission via the scheduling DCI of a random access message 5.

The parameter configuration for the RRC idle mode uplink transmission may include one or more of the following configurations: a radio network temporary identity (RNTI) value for scrambling the retransmission scheduling DCI of the RRC idle mode uplink transmission PUSCH, open loop power control parameters for the RRC idle mode uplink transmission PUSCH, the period of the RRC idle mode uplink transmission PUSCH (or the transmission time interval of the RRC idle mode uplink transmission PUSCH), the transmission time offset of the RRC idle mode uplink transmission PUSCH, a DMRS-related parameter configuration of the RRC idle mode uplink transmission PUSCH, the number of hybrid automatic repeat request (HARD) processes for the RRC idle mode uplink transmission PUSCH, parameters relevant to the physical downlink control channel of the retransmission scheduling DCI for the RRC idle mode uplink transmission PUSCH, and the like.

The resource configuration for the RRC idle mode uplink transmission may include one or more of the following configurations: frequency domain resources for the RRC idle mode uplink transmission PUSCH, the modulation and coding scheme (MCS) for the RRC idle mode uplink transmission PUSCH, the number of repetitions of the RRC idle mode uplink transmission PUSCH, and the like.

Optionally, in some systems, the parameters for the RRC idle mode uplink transmission may further include: a parameter indicating that the system supports the RRC idle mode uplink transmission. This parameter may be broadcast by the base station 10, for example, via the system broadcast information. Thus, the UE 20 can learn whether the system supports the RRC idle mode uplink transmission by reading the system broadcast information.

Optionally, in some systems, the parameters for the RRC idle mode uplink transmission may further include: a parameter indicating that the UE supports the RRC idle mode uplink transmission. The UE may report this parameter to the base station in the connected mode to notify the base station that it supports the RRC idle mode uplink transmission.

Optionally, in other systems, the RRC idle mode uplink transmissions may be supported by default. In such a system, the parameter indicating that the system supports the RRC idle mode uplink transmission may not be defined.

In step S2: when the user equipment 20 has uplink data to transmit in the RRC idle mode, it transmits the uplink data to the base station 10 on the configured resources according to the configured parameters.

As stated above, in some systems, the configured resources may be available. Therefore, when the UE 20 has uplink data to transmit, it can transmit the uplink data on the configured resources.

In other systems, the configured resources are not available. In such a system, the base station 10 may activate/deactivate the configured resources for RRC idle mode uplink transmissions by activation/deactivation signaling. The activation/deactivation signaling may be carried by system broadcast information, or the activation/deactivation signaling may be carried by paging information. Then, in step S2, the UE transmits the uplink data on only the activated resources in the RRC idle mode. When the UE 20 detects the deactivation signaling, it will stop transmitting the uplink data.

It should be understood that the method 100 for RRC idle mode uplink transmission in accordance with an embodiment of the disclosure of FIG. 1 is described as an example only, which may include more optional steps.

Optionally, the method 100 may further include an optional step: releasing the configured at least one of a parameter or a resource for the RRC idle mode uplink transmission. The word "release" used herein generally refers to the UE emptying relevant stored information. The release of the configured at least one of a parameter or a resource for the RRC idle mode uplink transmission may be implemented implicitly (i.e., without explicit signaling), or may be implemented explicitly (i.e., requiring explicit signaling). For example, the release of the configured at least one of a parameter or a resource can be implemented in any of the following ways:

a) Releasing the configured at least one of a parameter or a resource after a predefined number of RRC idle mode uplink blank transmissions. Throughout the text, "blank transmission" refers to that no data is transmitted on the relevant resources.

b) Releasing the configured at least one of a parameter or a resource after the timing alignment timer for managing the timing advance expires.

c) Releasing the configured at least one of a parameter or a resource by transmitting release signaling by the base station.

Optionally, the method 100 may further include an optional step: after a predetermined number of transmissions on the RRC idle mode configuration uplink resources have failed, initiating a PRACH procedure to establish or resume the RRC connection, so as to transmit the uplink data in the RRC connected mode. In some systems, from the perspective of the UE, the configured resources for the RRC idle mode uplink transmission are specific to a certain UE, and a RRC idle mode uplink transmission is considered successful only after the UE has received ACK signaling for this uplink transmission, or otherwise, this uplink transmission is considered unsuccessful. In other systems, from the perspective of the UE, the configured resources for the RRC idle mode uplink transmission are shared by multiple UEs. The UE needs to perform a contention resolution procedure when it initiates a transmission on the configured shared uplink resource. Only if the UE succeeds in the contention, the uplink transmission is considered to be successful, otherwise, the uplink transmission is considered unsuccessful.

FIG. 2 schematically shows a flowchart of operations on the UE side of the method 100 for RRC idle mode uplink transmission according to an embodiment of the disclosure.

As shown, in step S110, at least one of a parameter or a resource for RRC idle mode uplink transmission is configured for a user equipment, UE.

In step S120, uplink data transmitted by the UE in the RRC idle mode is received according to the configured at least one of a parameter or a resource.

FIG. 3 schematically shows a flowchart of operations on the UE side of the method 100 for RRC idle mode uplink transmission according to an embodiment of the disclosure.

As shown, in step S210, at least one of a parameter or a resource configuration for RRC idle mode uplink transmission is received.

In step S220, uplink data is transmitted in the RRC idle mode according to the configured at least one of a parameter or a resource.

It is easy to see that step S1 in FIG. 1 corresponds to step S110 of FIG. 2 and step S210 of FIG. 3, and step S2 of FIG. 1 corresponds to step S120 of FIG. 2 and step S220 of FIG. 3. For details of the operations shown in FIGS. 2 and 3, reference may be made to the description of FIG. 1, which will not be described in detail here.

FIG. 4 schematically shows a block diagram of a base station 10 according to an embodiment of the disclosure. As shown, the base station 10 includes a transmitting unit 12 and a receiving unit 14. The transmitting unit 12 and a receiving unit 14 may be referred to as a transceiver. Those skilled in the art will appreciate that the transmitting unit 12 and the receiving unit 14 may be implemented separately, or together as a single component. It should also be understood that the base station 10 may also include other functional units necessary to perform its functions, such as various processors, memories, radio frequency signal processing units, baseband signal processing units, other physical downlink channel transmission processing units, and the like. The processor may control general operations of the base station 10. The processor may execute functions of a protocol stack required by or included in a particular communication standard. According to various embodiments of the disclosure, the processor may control the base station to perform operations. However, detailed descriptions of these well-known elements will be omitted for the sake of brevity.

The transmitting unit 12 is configured to transmit a message to the user equipment, UE. The receiving unit 14 is configured to receive a message from the UE.

The transmitting unit 12 and the receiving unit 14 can cooperate with each other to implement the operation of the method 100 on the base station side shown in FIG. 2. Particularly, the transmitting unit 12 may be configured to: configure, for the UE, at least one of a parameter or a resource for RRC idle mode uplink transmission, separately or cooperating with the receiving unit 14. The receiving unit 14 may be configured to: receiving uplink data transmitted by the UE in the RRC idle mode according to the configured at least one of a parameter or a resource. It is easy to be understood that the transmitting unit 12 and the receiving unit 14 can cooperate with each other to implement other optional operations of the method 100 on the base station side.

FIG. 5 shows a block diagram of a user equipment, UE, 20 according to an embodiment of the disclosure. As shown, the UE 20 includes a transmitting unit 22 and a receiving unit 24. The transmitting unit 22 and a receiving unit 24 may be referred to as a transceiver. Those skilled in the art will appreciate that the transmitting unit 22 and the receiving unit 24 may be implemented separately, or together as a single component. It should also be understood that the UE 20 may also include other functional units necessary to perform its functions, such as various processors, memories, radio frequency signal processing units, baseband signal processing units, other physical uplink channel transmission processing units, and the like. The processor may control general operations of the UE 20. The processor may execute functions of a protocol stack required by or included in a particular communication standard. According to various embodiments of the disclosure, the processor may control the UE to perform operations. However, detailed descriptions of these well-known elements will be omitted for the sake of brevity.

The transmitting unit 22 is configured to transmit a message to the base station. The receiving unit 24 is configured to receive a message from the base station.

The transmitting unit 22 and the receiving unit 24 can cooperate with each other to implement the operation of the method 100 on the UE side shown in FIG. 3. Particularly, the receiving unit 24 may be configured to: receive at least one of a parameter or a resource configuration for the RRC idle mode uplink transmission, separately or cooperating with the transmitting unit 22. The transmitting unit 22 may be configured to: transmit uplink data in the RRC idle mode according to the configured at least one of a parameter or a resource. It is easy to be understood that the transmitting unit 22 and the receiving unit 24 can cooperate with each other to implement other optional operations of the method 100 on the UE side.

The base station according to the disclosure is an entity for communicating with user equipment, which generally refers to an evolved node B (eNB) or a next generation base station. The user equipment described in the disclosure may refer to a terminal or an access terminal or a station or a Mobile station or the like. The disclosure is particularly applicable to IoT UEs such as MTC UEs and NB-IOTs, and uplink data transmissions of these UEs are generally not time critical.

The Base station 10 and the UE 20 in accordance with embodiments of the disclosure may be configured to perform the method 100 described above. For the specific operations of the base station 10 and the UE 20, reference may be made to the description of the foregoing method 100, and details are not provided herein again.

FIG. 6 schematically illustrates a block diagram of a computing system that can be used to implement the base station 10 or the user equipment 20 of the disclosure, according to an embodiment of the disclosure.

As shown in FIG. 6, the computing system 600 includes a processor 610, a computer readable storage medium 620, an output interface 630, and an input interface 640. The computing system 600 can perform the method 100 described above with respect to FIGS. 1-3 to support the RRC idle mode uplink transmission.

Particularly, the processor 610 may include at least one of, for example, a general-purpose microprocessor, an instruction set processor, a related chipset, a dedicated microprocessor (e.g., an application specific integrated circuit (ASIC)), and the like. The processor 610 may also include an onboard memory for caching purposes. The processor 610 may be a single processing unit or multiple processing units for performing different actions of a method described with respect to FIGS. 1-3.

The computer readable storage medium 620, for example, may be any medium that can contain, store, communicate, propagate or transmit instructions. For example, a readable storage medium may include, but is not limited to, an electronic, magnetic, optical, electromagnetic, infrared, or semiconductor system, apparatus, device, or propagation medium. Specific examples of the readable storage medium include at least one of: an magnetic storage device such as an magnetic tape or a hard disk (HDD); an optical storage device such as a compact disk (CD-ROM); an memory such as a random access memory (RAM) or a flash memory; a wired/Wireless communication link.

The computer readable storage medium 620 may contain a computer program 621 that may include code/computer executable instructions that, when executed by the processor 610, cause the processor 610 to perform, for example, method flows described above with respect to FIGS. 1-3 and any variations thereof.

The computer program 621 may be configured to have computer program codes thereon, which, for example, include a computer program module. For example, in an example embodiment, the codes in the computer program 621 may include one or more program modules, including, for example, module 621A, and module 621B, It should be noted that the division manner and number of modules are not fixed, and those skilled in the art may use suitable program modules or program module combinations according to actual situations. When these program module combinations are executed by the processor 610, it cause the processor 610 to be able to perform, for example, method flows described above with respect to FIGS. 1-3 and any variations thereof.

In accordance with an embodiment of the disclosure, the processor 610 may utilize the output interface 630 and the input interface 640 to perform method flows described above with respect to FIGS. 1-3 and any variations thereof.

The following describes the main aspects involved in the RRC idle mode uplink transmission. The configuration of at least one of the parameter or the resource for the RRC idle mode uplink transmission herein is generally a semi-static configuration, i.e., a semi-persistent scheduling (SPS), instead of dynamic scheduling, so the configuration is hereinafter referred to as "Pre-configuration." Since the RRC idle mode uplink transmission is performed on the pre-configured uplink resources and belongs to a semi-persistent scheduling, such transmission on the pre-configured uplink resources is also referred to as UL SPS hereinafter. However, it should be understood that the disclosure is not limited to a specific terminology, and that the transmission on the pre-configured RRC idle mode uplink resources may also be named by other names without affecting the essence and scope of the solution to be protected by the disclosure.

Moreover, in this document, for the sake of simplicity and ease of explanation, some new terms are named in the form of "function+existing term." For example, various DCIs are mentioned herein, such as release DCI, retransmission scheduling DCI, and the like. These new terms are named for simplicity and represent the DCI for a certain purpose or function. For example, the release DCI refers to the DCI used to carry the release signaling, the retransmission scheduling DCI refers to the DCI used to schedule one retransmission, the scheduling DCI of an Msg5 refers to the DCI used to schedule the Msg5, and so on. It should be understood that these specific terminology names are not limiting. Those skilled in the art can give other names to similar technical features without affecting the essence and scope of the aspects to be protected by the disclosure.

In addition, all the implementable solutions related to data transmission on the pre-configured uplink resources proposed herein can be appropriately extended and applied to the 5G new radio (NR) system, and all implementable solutions can be superimposed on 5G concepts such as the beam and the bandwidth part (BWP), those skilled in the art can extend the proposed solution so as to apply it to the 5G system.

UL SPS Process in the RRC Idle Mode

Embodiment 1 (Introducing a Larger SPS Period, Configuring UL SPS Via UE-Specific RRC Signaling)

This embodiment describes a method in which UE in the RRC idle mode performs the UL SPS transmission. In this embodiment, the UE needs to perform the following process 700 as shown in FIG. 7:

In step S710, the UE receives, in the RRC connected mode, a pre-configuration of the RRC idle mode UL SPS. For example, at least one of the parameter or the resource configuration of the RRC idle mode UL SPS is received via the UE-specific RRC signaling. Furthermore, the timing alignment timer (TimeAlignmentTimer) of the UE for managing the TA is configured to be infinite.

In step S720, the UE changes from the RRC connected mode to the RRC idle mode. When the RRC connection is released, the RRC idle mode UL SPS configuration received in S710 and the TA value should be preserved, which are hold and used for the RRC idle mode UL SPS.

In step S730, the UE monitors activation/deactivation signaling for the RRC idle mode UL SPS resources via the system broadcast information or the paging channel.

In step S740: if the UE detects the activation signaling for the RRC idle mode UL SPS resources, and the uplink data arrives at UE, the UE transmits the uplink data on the pre-configured SPS resource.

At step S750: if the UE detects the deactivation signaling for the RRC idle mode UL SPS resources, the UE stops transmitting data on the SPS resources.

Process 700 can be seen as a variant embodiment of the operations of method 100 on the UE side. In this embodiment, the UE first needs to enter the RRC connected mode to report to the eNB that it has the ability to support RRC idle mode UL SPS transmission. The UE may also need to report certain characteristics of the IOT service, including the service period, the traffic volume, and the like, and the eNB configures the UL SPS parameters/resources of the UE in the RRC idle mode based on this auxiliary information.

The UL SPS parameter configuration in the RRC idle mode includes one or more of the following configurations: a RNTI value for scrambling SPS PUSCH retransmission scheduling DCI, open loop power control parameters of SPS PUSCH, the period of SPS PUSCH (or the transmission time interval of SPS PUSCH), the transmission time offset of the SPS PUSCH, a demodulation reference signal (DMRS) related parameter configuration of the SPS PUSCH, the number of HARQ processes for the SPS PUSCH, a parameter configuration relevant to a physical downlink control channel carrying the retransmission scheduling DCI for SPS PUSCH, and the like. In the above parameters, the open loop power control parameter may not be specifically configured, instead the power control parameter of an Msg3 is reused, or the transmit power of the RRC idle mode UL SPS directly refers to the transmit power of PRACH or the Msg3 in the PRACH procedure in which the UE has recently succeeded in a contention; the DMRS-related parameters may not be specifically configured, instead the DMRS-related configuration of the Msg3 is reused (see RRC signaling PUSCH-ConfigCommon); the relevant parameters of the physical downlink control channel for carrying the retransmission scheduling DCI may not be specifically configured, instead the relevant configuration of the physical downlink control channel for scheduling an Msg3 retransmission and an Msg4 is reused (for MTC UE, see the MPDCCH configuration in RRC signaling PRACH-ConfigSM; for NB-IOT UE, see the NPDCCH configuration in NPRACH-ConfigSIB-NB).

The UL SPS resource configuration in the RRC idle mode includes one or more of the following configurations: frequency domain resources of the SPS PUSCH, the Modulation and Coding Scheme of the SPS PUSCH, and the number of repetitions of the SPS PUSCH.

In an existing LTE system, the maximum SPS transmission time interval is 640 subframes, and the IOT service characteristic is considered to be a small data packet (one transport block of the physical layer can transmit all the data) with a large period (the period may be measured in hours), the SPS period value configured here will introduce a larger value than the existing system, even in minutes or hours. The SPS period and the SPS transmission time offset may jointly determine the transmission time of each SPS PUSCH.

In this embodiment, the UE is a stationary IOT UE, and the TA used by the UE to transmit the PUSCH is substantially unchanged. The UE reports its own "stationary" feature to the eNB, and the eNB configures the TimeAlignmentTimer of the TA to be infinity according to the "stationary" feature, so that the TA value received in the RRC connected mode can be hold and used for the RRC idle mode uplink transmission. When the UE releases the RRC connection and enters the RRC idle mode, the TA value and the UL SPS configuration received in the RRC connected mode still need to be reserved, and the eNB side also reserves the related parameter configuration of the UE.

In an example of the embodiment, the UL SPS resources for the RRC idle mode, which were configured by the eNB in the RRC connected mode to the IOT UE, are not available. For example, the eNB allows the pre-configured UL SPS resources to be used by the UE in the RRC idle mode only when the network load is low, or only part of UEs in the RRC idle mode is allowed to use the pre-configured UL SPS resources at a specific time. The eNB may activate/deactivate these UL SPS resources via system broadcast information or paging information.

In another example of the embodiment, the UL SPS resources for the RRC idle mode, which were configured by the eNB in the RRC connected mode to the IOT UE, are available, that is, the eNB will not signal whether these SPS resources are available or not, and the UE in the RRC idle mode does not need to monitor the activation/deactivation signaling for the UL SPS resources. The UE may directly transmit data on the UL SPS resources as long as the uplink data arrives. If no uplink data arrives, the PUSCH does not need to be sent on the UL SPS resource.

In an example of the embodiment, the UL SPS resource configuration in the RRC idle mode includes multiple transmission block size (TBS) values, similar to early data transmission (EDT) in the R-15 efeMTC system. The purpose of providing multiple TBS values is to reduce the number of padding bits in the MAC PDU at the UE. The UE can select an appropriate TBS value for the transmission according to the uplink data packet size. The multiple TBSs use the same frequency domain resource scheduling and different numbers of repetitions. The number of repetitions indicated in the UL SPS resource configuration corresponds to the maximum TBS value, and the number of repetitions corresponding to other TBS values can be implicitly calculated according to the criterion of keeping the same rate, for example, $RepN\_1=(TBS\_1/TBS\_2)*RepN\_2$, where $RepN\_1$ is the number of repetitions corresponding to the TBS value of $TBS\_1$, and $RepN\_2$ is the number of repetitions corresponding to the TBS value of $TBS\_2$.

In this embodiment, the cell in which the UE camps in the RRC idle mode is the same cell as the cell in which the RRC idle mode UL SPS configuration is received in the RRC connected mode. Since the UE is relatively static, the UE hardly initiates the cell reselection in the RRC idle mode, and the camped cell is also substantially unchanged, but it is not excluded that in some special cases, the UE will reselect cell to and be camped on other cells in the RRC idle mode.

In an example, the UE that receives, in the RRC connected mode, the UL SPS configuration for the RRC idle mode cannot initiate a cell reselection after entering the RRC idle mode, that is, the cell camped in the RRC idle mode is never changed.

In another example, the UE that receives, in the RRC connected mode, the UL SPS configuration for the RRC idle mode may initiate a cell reselection after entering the RRC idle mode, and should notify the network of its behavior when being reselected to another cell, so that the original cell can release its UL SPS configuration in the RRC idle mode.

For example, the UE receives, in the RRC connected mode, the UL SPS configuration for the RRC idle mode in the first cell. If the UE is reselects to a second cell in the RRC idle mode according to cell reselection rules, a feasible method is: the UE establishes a RRC connection in the second cell to inform the network that the UE had received, in the RRC connected mode, an UL SPS configuration in the RRC idle mode in the first cell, and the second cell notifies the first cell to release UL SPS configuration in the RRC idle mode of the corresponding UE by the signaling interaction between base stations. Another feasible method is: before reselected to the second cell, the UE should establish a RRC connection in the first cell to request the network to release its own UL SPS configuration in the RRC idle mode.

In an example, the UE that receives, in the RRC connected mode, the UL SPS resource configuration for use in the RRC idle mode may initiate a cell reselection procedure according to the cell reselection criterion of the existing system. In a tracking area (TA), the UE does not need to report its reselection behavior to the network when the UE is reselected from the cell that configures the RRC idle mode UL SPS resources to another cell.

In the above example, the UL SPS resources for use in the RRC idle mode are reserved resources for all cells in a tracking area, and all cells in a tracking area will exchange configuration information of the RRC idle mode UL SPS resources. When a cell configures, in a RRC connection state, RRC idle mode UL SPS resources for a certain UE, all cells in the TA where this cell is located will reserve the RRC idle mode UL SPS resources, so even if the UE in the RRC idle mode performs a cell reselection, the UE still assumes that the previously configured RRC idle mode UL SPS resources are valid.

Embodiment 2 (Using the Existing SPS Period, Requesting UL SPS by Using the PRACH Procedure)

This embodiment describes a method in which UE in the RRC idle mode performs the UL SPS transmission. In this embodiment, the UE needs to perform the following process 800 as shown in FIG. 8:

In step S810, when uplink data arrives at the UE in the RRC idle mode, the UE initiates a contention-based PRACH procedure to request an UL SPS transmission in the RRC idle mode. For example, information for requesting the UL SPS transmission is carried in the random access message 1 (Msg1, PRACH) or the random access message 3 (Msg3, PUSCH) at the UE.

In step S820, the UE receives, from an eNB, response signaling to the UL SPS request in the PRACH procedure, for example, the response signaling to the UL SPS request is carried in the random access message 2 (Msg2, RAR) (corresponding to the request by the UE in the Msg1) or the random access message 4 (Msg4) (corresponding to the request by the UE in the Msg3) at the eNB. The response signaling may accept the UL SPS request, or may reject the UL SPS request. If the UL SPS request is accepted, the parameter/resource configuration of the UL SPS is received in the scheduling DCI of at least one of the Msg2, the Msg4, or the random access message 5 (Msg5).

In step S830, if the contention for the PRACH procedure is successful and the request of the UL SPS is accepted, the UE starts a data transmission on the UL SPS resources at a specific time after the PRACH procedure, and transmits the SPS PUSCH of the RRC idle mode based on the TA received in the RAR.

In step S840, the UE releases the UL SPS resource, that is, stops the UL SPS transmission, and empties the parameter and resource configuration information of the UL SPS. The UE may release the UL SPS resources in an implicit manner, for example, release the SPS resources after a predefined number of SPS blank transmissions (see RRC parameter implicitReleaseAfter), or release the SPS resources after the TimeAlignmentTimer of the TA expires; or the UE may release the UL SPS resources in an explicit manner, i.e., the UL SPS resources are not released until the explicit release signaling from the eNB is received, for example, the explicit release signaling is carried by the ACK DCI of the SPS, or the deactivation DCI format of the existing system is reused.

Process 800 can be seen as another variant embodiment of the operations of method 100 on the UE side. In this embodiment, the purpose of the initiation of PRACH by the UE in the RRC idle mode is not for establishing/resuming the RRC connection, but for requesting the UL SPS transmission in the RRC idle mode. In the PRACH procedure, the signaling related to establishing/resuming the RRC connection does not need to be transmitted, and only the signaling related to the UL SPS and the signaling required for the contention resolution are required to be transmitted, that is, the UE returns to the RRC idle mode after completing the PRACH procedure, and starts the UL SPS transmission in the RRC idle mode based on the UL SPS parameter/resource configuration received in the PRACH procedure.

In an example, the request information of the UL SPS transmission is carried in the Msg1 at the UE, and then the eNB may respond to the UL SPS request in the Msg2 (RAR) at the earliest. Here the group of PRACHs for requesting the UL SPS transmission and the group of PRACHs for establishing/resuming the RRC connection are separately configured, and there is no overlap between the two groups of PRACHs, and the two groups of PRACHs can be divided in time domain, frequency domain or code domain. In another example, the RRC signaling for requesting the UL SPS transmission is carried in the Msg3, and then the eNB may respond to the UL SPS request in the Msg4 at the earliest.

In this embodiment, if the eNB accepts the UL SPS request, the eNB will further configures the parameters/resources of the UL SPS. In an example, the eNB configures parameters of the UL SPS (including parameters such as SPS transmission time interval) and resources (including information such as the frequency domain resources, the MCS, and the number of repetitions) in the Msg4 by the RRC signaling. In another example, the eNB configures parameters of the UL SPS (including parameters such as SPS transmission time interval) in the Msg4 by the RRC signaling, and further configures resources of the UL SPS (including information such as the frequency domain resources, the MCS, and the number of repetitions) by the scheduling DCI of the Msg5.

In this embodiment, the UL SPS parameter configuration may not include the RNTI value for scrambling the SPS retransmission scheduling DCI, but reuse the Temporary C-RNTI value configured in the RAR; the UL SPS parameter configuration may not include the open loop power control parameter, but reuse the power control parameter of the Msg3, or the transmit power of the RRC idle mode UL SPS may directly refer to the transmit power of the PRACH or the Msg3; the UL SPS parameter configuration may not include the DMRS related configuration, but reuse the DMRS-related configuration of the Msg3; the UL SPS parameter configuration may not include the relevant configuration of the physical downlink control channel for carrying the SPS retransmission scheduling DCI, but reuse the relevant configuration of the physical downlink control channel for scheduling an Msg3 retransmission and an Msg4.

In an example of this embodiment, if the eNB rejects the UL SPS request, the UE falls back to the normal PRACH procedure in the current PRACH procedure, that is, the purpose of the PRACH procedure is to establish/resume the RRC connection. For example, if the eNB rejects the UL SPS request, the Msg4 will include the relevant configuration of the RRC connection, so that the UE enters the RRC connected mode to transmit uplink data.

In another example, if the eNB rejects the UL SPS request, the UE re-initiates the normal PRACH procedure to establish/resume the RRC connected mode to transmit uplink data; or attempts a predefined number of UL SPS requests, and if multiple attempts are unsuccessful, the normal PRACH procedure is re-initiated to establish/resume the RRC connected mode to transmit uplink data. In an example of the embodiment, the eNB configures the UL SPS resources by using the scheduling DCI of the Msg5. The resources used by the Msg5 are the UL SPS resources, and the scheduling DCI of the Msg5 and the DCI for scheduling an Msg3 retransmission and an Msg4 use the same scrambling RNTI and the same physical downlink control channel search space. If succeeding in the contention for the PRACH procedure, the UE shall monitor the scheduling DCI of the Msg5 within a predefined time window after the Msg4 or after the HARQ-ACK feedback of the Msg4. This window is measured, for example, in the number of subframes, or in the number of occurrences of the physical downlink control channel search space. After the scheduling DCI of the Msg5 has been detected, the Msg5 is the first UL SPS transmission, and the transmission time of the next UL SPS is delayed by one SPS transmission time interval.

In another example of this embodiment, the eNB configures the UL SPS resources by the Msg4, for example, by a dedicated RRC signaling. If the Msg4 indicates the success in the contention for the PRACH procedure, there is a predefined time relationship between the first UL SPS transmitted by the UE and the Msg4 or the HARQ-ACK of the Msg4, for example, the first UL SPS transmitted by the UE is located in the 5th subframe after the Msg4, and the transmission time of the next UL SPS is delayed by one SPS transmission time interval.

In this embodiment, the UE manages the TA by using the timeAlignmentTimerCommon value configured in the SIB2. When the timeAlignmentTimerCommon expires, the UE considers that the TA is invalid. Regardless of whether the data transmission is completed or not, the UL SPS transmission will be terminated, and the parameter and resource information of the UL SPS will be emptied. If the UE needs to continue the transmission of data, the UE should re-initiate the PRACH procedure to continue to request the RRC idle mode UL SPS transmission.

In an example of the embodiment, after the UE completes the data transmission on the UL SPS resources, the SPS resource implicit release mechanism of the existing system may be reused, that is, after a predefined number (implicitReleaseAfter) of SPS blank transmission, the UE releases the SPS resources.

In an example of the embodiment, the UE releases the SPS resources by receiving explicit SPS resource release signaling, and the release signaling is carried in the ACK DCI of the SPS, that is, the DCI may simultaneously carry the ACK information of the SPS PUSCH and the release information of the SPS PUSCH resources. Here, the ACK DCI is DCI for specifically indicating that the SPS PUSCH is successfully received, and can reuse the ACK DCI format specified for the early termination feature in the R-15 standard, the reserved bits therein being used to indicate the release information of the SPS resources.

In another example of this embodiment, the UE releases the SPS resources by receiving explicit SPS resource release signaling which reuses the UL SPS deactivation DCI format of the existing system. The UE monitors DCI within a predefined time window after the transmission of the SPS PUSCH. If the received DCI presents the indication field feature of the SPS release DCI, i.e., if a specific indication field is set to a specific value, the UE interprets the DCI according to the release DCI format, and the SPS resources will be released.

In an example of the embodiment, the UE receives the reconfiguration information of the SPS resources by the DCI during the RRC idle mode UL SPS transmission process. The DCI format for the SPS resource reconfiguration can reuse the activation DCI format for the SPS resources of the existing system. The UE monitors DCI within a predefined time window after the transmission of the SPS PUSCH. If the received DCI presents the indication field feature of the SPS reconfiguration DCI, i.e., if a specific indication field is set to a specific value, the UE interprets the DCI according to the reconfiguration DCI format, and the UL SPS transmission will be done based on the reconfigured resources.

In another example, the UE receives the reconfiguration information of the SPS resources by the DCI in the RRC idle mode UL SPS transmission process, similar to the case where the release signaling for the SPS resources is carried by the ACK DCI of the SPS PUSCH, the ACK DCI may also carry the reconfiguration signaling for the SPS resources, that is, one DCI carries both the ACK information and the reconfiguration information of the uplink resources at the same time.

In an example of the embodiment, the UE monitors DCI with a predefined size in a corresponding time window every time the SPS PUSCH is transmitted during the RRC idle mode UL SPS transmission process. The DCI can be interpreted into multiple formats of DCI. Such multiple format DCI is distinguished by setting a specific flag field or a specific field to a specific value. For example, when the DCI is interpreted as a retransmission scheduling DCI, the DCI is used to schedule the retransmission of the PUSCH; when the DCI is interpreted as ACK DCI, the DCI indicates that the PUSCH transmission succeeds; when the DCI is interpreted as a resource release DCI, the DCI is used to release the pre-configured uplink resources; and when the DCI is interpreted as a resource reconfiguration DCI, the DCI is used to reconfigure the uplink resources.

In a variant of this embodiment, the eNB cannot reject the UL SPS request of the UE, i.e. the eNB must configure corresponding UL SPS parameters and resources after receiving the UL SPS request of the UE. For example, as long as RRC signaling was carried in the Msg3 for requesting the UL SPS resources at the UE, the eNB may configure the UL SPS resources to the UE by the scheduling DCI of at least one of the Msg4 or the Msg5.

Embodiment 3 (HARQ Procedure for RRC Idle Mode Pre-Configured Uplink Transmission)

This embodiment describes a method in which an UE in the RRC idle mode performs a HARQ procedure for a pre-configured uplink transmission (the transmission on pre-configured uplink resources). In this embodiment, the UE needs to perform the following steps:

Step 1: The UE transmits a PUSCH on the pre-configured uplink resources.

Step 2: The UE monitors an ACK DCI scrambled with a pre-configured RNTI value, a retransmission scheduling DCI or a DCI indicating the fallback to the RACH/EDT in a pre-configured physical downlink channel search space within a pre-configured time window after transmitting the PUSCH;

Step 3: If the UE detects the ACK DCI, the UE should stop the DCI monitoring and return to a sleep mode;

Step 4: If the UE detects the DCI indicating the fallback to the RACH/EDT, the UE should stop the DCI monitoring and initiate a RACH/EDT procedure to transmit uplink data;

Step 5: If the UE detects the retransmission scheduling DCI, the UE continue to monitor the ACK DCI, the retransmission scheduling DCI or the DCI indicating the fallback to the RACH/EDT after transmitting PUSCH retransmissions. If the ACK DCI is detected, the process goes to Step 3; if the DCI indicating the fallback to the RACH/EDT is detected, the process goes to Step 4; and if the retransmission scheduling DCI is detected, Step 5 will be repeated, until the ACK DCI or the DCI indicating the fallback to the RACH/EDT is detected, or until the time window expires and the UE returns to the sleep mode.

In this embodiment, the ACK DCI, the retransmission scheduling DCI and the DCI indicating the fallback to the RACH/EDT have the same DCI size, i.e. the UE monitors only the DCIs with one certain size to reduce the number of blind decodings of the DCI.

Optionally, according to the TBS value indicated by the DCI, whether the DCI indicates an ACK, a retransmission scheduling or a fallback to the RACH/EDT can be differentiated. If the TBS value indicated by the DCI is the same as that used for the pre-configured uplink transmission, the DCI indicates a retransmission scheduling. If the TBS value indicated by the DCI is different from that used for the pre-configured uplink transmission, and the TBS is a predefined value other than TBS values configurable for the pre-configured uplink transmission, the DCI indicates the ACK or the fallback to the RACH/EDT. Different TBS values can be used for the ACK and the fallback to the RACH/EDT.

Optionally, reserved values of some DCI fields of the existing system DCI format are used to indicate the ACK or the fallback to the RACH/EDT. For example, a reserved value of the resource assignment field and/or the MCS field is used to indicate the ACK or the fallback to the RACH/EDT. Different reserved values can be used for the ACK and the fallback to the RACH/EDT.

For MTC, in the CE Mode A, the field indicating the resource block assignment has 11 reserved values. In CE Mode B, the MCS field has 5 reserved values. For NB-IOT, the subcarrier indication field has 45 reserved values, and the MCS field has 5 reserved values. The above reserved values all can be used to indicate the ACK and the fallback to the RACH/EDT.

Optionally, the ACK DCI, the retransmission scheduling DCI or the DCI indicating the fallback to the RACH/EDT mentioned above all contain a field indicating the timing advance adjustment (TA update). This DCI field is used to adjust the uplink TA of the UE. For example, the size of the field is 6 bits, the granularity of adjustment is 16 sample symbols, NTA,new=NTA,old+(TA−31)×16, where TA=0, 1, 2, . . . , 63. That is, in the HARQ procedure of the UE's pre-configured uplink transmission, the base station may adjust the TA of the UE through a DCI, and the adjusted TA is used for retransmissions of the pre-configured uplink transmission in the current HARQ procedure and for the subsequent pre-configured uplink transmission.

Optionally, the ACK DCI, the retransmission scheduling DCI or the DCI indicating the fallback to the RACH/EDT mentioned above do not contain the new data indicator (NDI) field, because there is a retransmission scheduling DCI rather than a new-transmission scheduling DCI for the pre-configured uplink transmission, and then it is unnecessary to determine whether the DCI indicates a retransmission or a new transmission according to whether the value of the NDI is toggled or not.

Optionally, the ACK DCI, the retransmission scheduling DCI or the DCI indicating the fallback to the RACH/EDT mentioned above do not contain a field indicating the HARQ process number (HPN) domain, because the system specifies that the number of the HARQ processes for a pre-configured uplink transmission is 1.

Optionally, the ACK DCI, the retransmission scheduling DCI or the DCI indicating the fallback to the RACH/EDT mentioned above do not contain a downlink assignment index (DAI) field, a CSI request field and a SRS request field, because these DCI fields are meaningless for pre-configured uplink transmissions.

Optionally, the pre-configured uplink transmission supports the feedback function of the HARQ ACK. If the base station correctly decodes the pre-configured uplink transmission, a DCI indicating an ACK is transmitted to the UE. The UE, after receiving the ACK DCI, stops the DCI monitoring, and returns to the sleep mode.

For MTC, the ACK DCI may use the DCI formats 6-0A and 6-0B (for CE Mode A and CE Mode B respectively) introduced in the Rel-15 system for ACK feedback.

For NB-IOT, the design may refer to that of the ACK DCI in the MTC system, indicating the ACK by using the DCI format N0 of the existing systems. That is, reserved values of certain DCI fields are used to indicate the ACK. For example, the subcarrier field is used to indicate a reserved value 63, i.e., the bit field being configured as 1 1 1 1 1 1, or the MCS field is used to indicate a reserved value 15, i.e., the bit field being configured as 1 1 1 1.

Optionally, the pre-configured uplink transmission supports the HARQ retransmission scheduling function. If the base station does not correctly decode the pre-configured uplink transmission, the retransmission scheduling DCI is transmitted to the UE to dynamically schedule the retransmission of the PUSCH. The UE, after receiving the retransmission scheduling DCI, should transmit a retransmission of the pre-configured uplink transmission. The retransmission scheduling DCI may indicate the time-frequency domain resources, the MCS, the number of repetitions and the redundancy version number for retransmitting the PUSCH, and may also adjust at least one of the transmission timing advance (TA) or the transmission power for retransmitting the PUSCH.

Optionally, the system has no limit on the maximum number of retransmissions of the pre-configured uplink transmission. The UE can empty the HARQ buffer only when it receives the ACK DCI, when it is indicated to fall back to the RACH/EDT or after the time window expires. Optionally, the system has a limit on the maximum number of retransmissions of the pre-configured uplink transmission. The UE should empty the HARQ buffer when the maximum number of retransmissions has been reached.

Optionally, the pre-configured uplink transmission supports the fallback to the RACH/EDT. If the base station cannot correctly decode the pre-configured uplink transmission for some reasons, for example the base station cannot correctly decode the pre-configured uplink transmission by using the HARQ retransmision combining due to the large error in the TA used by the UE, the base station may instruct the UE to fall back to the RACH/EDT via a DCI, and then the UE should, after receiving the DCI, retransmit the data carried in the pre-configured uplink transmission by the RACH/EDT. The MAC layer of the UE should be able to support the fallback to the RACH/EDT during the HARQ procedure of the pre-configured uplink transmission to retransmit the data.

Here, the fallback to the RACH means that the UE initiates a contention-based random access procedure, and transmits data after establishing a RRC connection with the base station; while the fallback to the EDT means that the UE initiates an early data transmission (EDT) procedure and transmits data by using the Msg3. The premise of using EDT is that the data can be transmitted completely using the maximum TBS allowed by the EDT.

Optionally, if the UE does not detect the ACK DCI within a pre-configured time window, or if the UE detects the retransmission scheduling DCI but does not have enough time to transmit a retransmission within the pre-configured time window, the UE considers that the pre-configured uplink transmission fails and that it should fall back to the RACH/EDT to retransmit the data.

Optionally, if the UE does not detect the ACK DCI within a pre-configured time window, or if the UE detects the retransmission scheduling DCI but does not have enough time to transmit a retransmission within the pre-configured time window, the UE considers that the pre-configured uplink transmission fails and that the UE will retransmit the data on the pre-configured uplink resources in the next period. Here, the data at the UE has at least one of a low delay requirement or the period of pre-configured uplink resource is short.

Optionally, if the UE does not detect the ACK DCI within a pre-configured time window, or if the UE detects the retransmission scheduling DCI but does not have enough time to transmit a retransmission within the pre-configured time window, the UE considers that the pre-configured uplink transmission fails and that the UE will retransmit the data on other pre-configured uplink resources available recently. Here, the UE has a plurality of pre-configured uplink resources, which have the same period and different time domain locations.

In this embodiment, the pre-configured time window starts N subframes after transmitting the PUSCH, N is a value predefined by the system, and the time of N subframes is reserved for decoding the PUSCH and preparing the transmission of the DCI by the base station. The time window is measured in subframes or milliseconds, or in periods of the physical downlink control channel search space.

Optionally, before the end of the pre-configured time window, if the UE detects the retransmission scheduling DCI but does not have enough time to transmit the PUSCH retransmission, the UE should continue to transmit the PUSCH retransmission and monitor at least one of the corresponding ACK DCI or the retransmission scheduling DCI after the end of the time window. If the UE transmits a PUSCH retransmission but does not have enough time to detect at least one of the corresponding ACK DCI or the retransmission scheduling DCI, the UE should continue to monitor the corresponding DCI after the end of the time window. That is, the time window can be appropriately extended due to the occurrence of certain events.

After the end of the time window, the UE monitors the DCI corresponding to the PUSCH retransmission, which should be based on a predefined point of time or on a small time window. For example, the UE monitors the DCI at the Nth subframe after transmitting the PUSCH retransmission, or within the Nth~(N+M)th subframe after transmitting the PUSCH retransmission. Here, N and M are values predefined by the system. If the UE fails to detect any DCI in the extended time window, or detects the ACK DCI, the UE should stop the DCI monitoring and return to the sleep mode; if the UE detects the retransmission scheduling DCI, the UE continues to transmit the PUSCH retransmission and continues to monitor the DCI at the predefined point of time or within the small time window, until the maximum number of retransmissions of the PUSCH is reached or the ACK DCI is detected.

Optionally, after the pre-configured time window ends, the UE must stop the DCI monitoring and return to the sleep mode. For example, before the end of the time window, even if the UE detects the retransmission scheduling DCI but does not have enough time to transmit the PUSCH retransmission, the UE should return to the sleep mode after the end of the time window, without having to transmit the PUSCH retransmission. Before the end of the time window, even if the UE transmits a PUSCH retransmission but does not have enough time to detect the corresponding at least one of ACK DCI or retransmission scheduling DCI, the UE should return to the sleep mode after the end of the time window, without having to continue the DCI monitoring. That is, the time window will not be extended due to the occurrence of any events.

The above embodiments may be extended so that UE monitors more DCIs. In an implementation, the UE monitors an ACK DCI scrambled with a pre-configured RNTI value, a retransmission scheduling DCI, a DCI indicating the fallback to the RACH/EDT, a DCI indicating at least one of a pre-configured uplink resource reconfiguration or a pre-configured uplink resource releasing in a pre-configured physical downlink channel search space within a pre-configured time window after transmitting the PUSCH.

The above DCI indicating a pre-configured uplink resource releasing is used to release the pre-configured uplink resources at the UE. The UE should release the pre-configured uplink resources after detecting this DCI. Optionally, the UE transmits ACK information for the release of the pre-configured uplink resources to the base station, which, for example, carried by the PUCCH. Optionally, reserved values of some DCI fields are used to indicate the release of the pre-configured uplink resources.

The above DCI indicating the pre-configured uplink resource reconfiguration is used to update the pre-configured uplink resources stored by the UE, and the updated pre-configured uplink resources are used for the subsequent pre-configured uplink transmission. The DCI updates only at least one of the frequency domain resource, the MCS/TBS or the number of repetition of the pre-configured uplink resources. The time domain locations and period of the pre-configured uplink resources remain unchanged. Optionally, in addition to updating at least one of the frequency domain resource, the MCS/TBS or the number of repetition, the DCI may also update at least one of the time domain locations or period of the pre-configured uplink resources.

Optionally, the DCI indicating the pre-configured uplink resource reconfiguration also includes ACK information. That is, the DCI is used to indicate the ACK and the pre-configured uplink resource reconfiguration, and the reconfigured uplink resources are used for the subsequent pre-configured uplink transmission.

Optionally, new data indicator (NDI) field is used to distinguish whether the DCI indicates the ACK and the pre-configured uplink resource reconfiguration, or a NACK and a retransmission scheduling. For example, when the NDI indicates a value of 0, the DCI indicates the NACK and the retransmission scheduling, and information such as the resource allocation, the MCS/TBS, the number of repetitions and the like contained in the DCI is used for the retransmission of the pre-configured uplink transmission; when the NDI indicates a value of 1, the DCI indicates the ACK and the pre-configured uplink resource reconfiguration, and information such as the resource allocation, the MCS/TBS, the number of repetitions and the like contained in the DCI is used for the subsequent pre-configured uplink transmission.

Optionally, the DCI indicating the pre-configured uplink resource reconfiguration also includes the NACK information and the retransmission scheduling. That is, the DCI is used to indicate the NACK, the retransmission scheduling, and the pre-configured uplink resource reconfiguration, and information such as the resource allocation, the MCS/TBS, the number of repetitions and the like contained in the DCI is used not only for the retransmission of the pre-configured uplink transmission, but also for the subsequent pre-configured uplink transmission.

Parameter/Resource Configuration of the RRC Idle Mode UL SPS

The UE needs to receive some basic SPS parameter configurations before performing the UL SPS transmission. For example, in the UL SPS mechanism of the existing LTE system (only for the RRC connected mode), the basic parameters configured by the eNB using the UE-specific RRC signaling include: SPS C-RNTI value (semiPersistSchedC-RNTI), which is used for scrambling the activation DCI, the deactivation DCI, and the retransmission scheduling DCI of the SPS; SPS transmission time interval (semiPersistSchedIntervalUL), which is the time interval between two adjacent SPS transmissions; power control parameter (p0-Persistent), which is used for the open loop power control of the SPS PUSCH; the number of blank SPS transmissions for the implicit release (implicitReleaseAfter), that is, if the UE has no data to transmit on the implicitReleaseAfter numbers of UL SPS resources, the UE will automatically stop the transmission of the SPS and release the SPS resources; the number of UL HARQ processes for the SPS transmission (numberOfConfUlSPS-Processes-r13), that is, the UE may transmit the SPS on one or more HARQ processes. Except for the above basic parameters, the UE also needs to receive the SPS resources semi-statically scheduled by the eNB, wherein the SPS resources are indicated in the SPS activation DCI, including scheduling information such as the allocated frequency domain resources, the MCS, and the number of repetitions. The UE may start the UL SPS transmission based on the SPS resources and the above basic parameters.

If the UE performs a similar RRC idle mode UL SPS, it is also required to obtain similar SPS parameters and SPS resource configurations. Since the UE in the RRC idle mode does not establish an RRC connection with the eNB, the manner in which the UE receives the SPS parameter configuration and the SPS resources will be different from the UL SPS mechanism in the RRC connected mode. Several implementations for the UE to receive the SPS parameter configuration and the SPS resources will be given below.

Embodiment 1 (Receiving the UL SPS
Configuration in the Connected Mode and Saving it
for Use in the Idle Mode)

This embodiment describes a method for a UE to receive an RRC idle mode UL SPS parameter/resource configuration, the SPS parameter configuration includes parameters such as an RNTI value for scrambling a SPS retransmission scheduling DCI, a number of HARQ processes used for SPS transmission, a transmission time interval of the SPS, and an open loop power control; the SPS resource configuration includes information such as the frequency domain resource allocation, the MCS, and the number of repetitions. In this embodiment, the UE receives, in the RRC connected mode, the parameter/resource configuration in the RRC idle mode UL SPS by using UE-specific RRC signaling, and after the UE releases the RRC connection and enters the RRC idle mode, the UE still saves the parameter/resource configuration of the UL SPS and uses it for a RRC idle mode uplink transmission.

In an example of the embodiment, the signaling for configuring the RRC idle mode UL SPS parameters and the RRC signaling for configuring the RRC connected mode UL SPS parameters are the same, and the eNB may also use a dedicated message in the configuring to indicate the UL SPS parameter be used only for the RRC idle mode, only for the RRC connected mode or both for the RRC idle mode and the RRC connected mode. When the UL SPS can be used for the RRC idle mode, the UL SPS resources need to be additionally configured.

In another example of this embodiment, the signaling for configuring the RRC idle mode UL SPS parameter and the RRC signaling for configuring the RRC connected mode UL SPS parameter are different RRC signaling, i.e., the eNB configures UL SPS parameters respectively for the RRC connected mode and the RRC idle mode, and the values configured for parameters such as the corresponding SPS C-RNTI value and the SPS transmission time interval may be different.

In an example of the embodiment, the eNB can release the UL SPS parameters and the SPS resources in the RRC idle mode only when the UE enters the RRC connected mode again, that is, the UE needs to empty the configuration information of the UL SPS, or to reconfigure the UL SPS parameter and/or SPS resources. One method is triggering by the eNB. For example, the eNB finds that the network load is too heavy, and it is desirable to release or reconfigure the RRC idle mode UL SPS configuration. The eNB wakes up the UE in the RRC idle mode by paging, and the UE initiates a PRACH procedure to enter the RRC connected mode. The other method is triggered by the UE. For example, the UE finds that the uplink service characteristics have changed. Then the UE initiates a PRACH procedure to establish a RRC connection and report the service characteristics. Then the eNB will release or reconfigure the RRC idle mode UL SPS configuration.

In another example of the embodiment, the eNB releases the UL SPS parameters and the SPS resources for the RRC idle mode, which was pre-configured in the RRC connected mode, by using broadcast information or paging information. When the UE in the RRC idle mode receives the release signaling by reading the broadcast information or the paging information, the UE needs to empty the configuration information of the UL SPS. In an example, the release signaling is configured for all UEs in the RRC idle mode of a cell, that is, all UEs in the RRC idle mode that have the UL SPS configuration should empty the relevant configuration information. In another example, the release information may be configured for a specific group of UEs, such as a group of UEs which are the same in the last four numbers of the UE IDs, or a group of UEs for a particular service. In another example, the release signaling may be configured for each coverage enhancement Level (CE level). For example, the four CE levels supported by the existing eMTC system can independently configure the release signaling.

In an example of this embodiment, the UE receives, in the RRC connected mode, a UL SPS configuration for the RRC idle mode. The UL SPS configuration has a predefined validity period, and the UE must release the UL SPS configuration after the expiration of the validity period, i.e., empty the relevant configuration information. The predefined validity period may be a fixed value written in the system standard, or be broadcast by the cell system information, or be included in the UL SPS configuration. The validity period may be started from the time when the UE receives the UL SPS configuration, or from the time when the UE changes to the RRC idle mode. The validity period can be measured in hours or in days.

In an example, as long as it is still in the validity period and the UE still resides in the cell, the UE can use the UL SPS configuration until the validity period expires. In another example, as long as it is within the validity period, even if the UE performs a cell reselection, if no tracking area (TA) change occurs, the UE may use the UL SPS configuration until the expiration of the validity period. If a tracking area change occurs, the UE considers that the UL SPS configuration is invalid and that the UL SPS configuration must be released.

In an example, as long as it is within the validity period of the RRC idle mode UL SPS configuration, the UL SPS configuration is considered valid before the next RRC connection establishment, and the UL SPS configuration is considered invalid after the next RRC connection establishment. That is, during the validity period of the UL SPS configuration, as long as the UE enters the RRC connected mode, the UL SPS configuration will be considered invalid.

In another example, the UL SPS configuration is considered valid regardless of whether the UE has re-entered the RRC connected mode, as long as it is within the validity period of the RRC idle mode UL SPS configuration.

Embodiment 2 (Initiating a PRACH Procedure in the Idle Mode to Obtain a UL SPS Configuration)

This embodiment describes a method for a UE to receive an RRC idle mode UL SPS parameter/resource configuration, the SPS parameter configuration includes parameters such as an RNTI value for scrambling a SPS retransmission scheduling DCI, a number of HARQ processes used for SPS transmission, a transmission time interval of the SPS, and an open loop power control; the SPS resource configuration includes scheduling information such as the frequency domain resource allocation, the MCS, and the number of repetitions. In this embodiment, the UE receives the parameter/resource configuration of the RRC idle mode UL SPS by the Msg4 (PDSCH) of the PRACH procedure.

Embodiment 2 differs from Embodiment 1 is that the UE receives the RRC idle mode UL SPS configuration in the PRACH procedure, at which time no RRC connection is established between the UE and the eNB. The PRACH procedure here is to request the RRC idle mode UL SPS, rather than establish or resume an RRC connection as in a normal PRACH procedure.

In this embodiment, when uplink data arrives at the UE in the RRC idle mode, the UE initiates a contention-based PRACH procedure. Different from the normal PRACH purpose (establishing or resuming the RRC connection), the PRACH is used to request the RRC idle mode UL SPS. The request information is reported to the eNB in the Msg3 (PUSCH), then the eNB will configure the UL SPS for the UE in the Msg4, including at least one of the UL SPS parameters or the UL SPS resources. If the Msg4 indicates that the PRACH contention is successful (i.e., the Msg4 includes information for the contention such as the UE ID reported by the UE in the Msg3), and if the Msg4 has the configured UL SPS, the UE starts the UL SPS after receiving the Msg4 or after transmitting the HARQ-ACK of the Msg4. There is a predefined time relationship between the first UL SPS and the Msg4 or the HARQ-ACK of the Msg4.

In an example of the embodiment, the Msg4 only configures the parameters of the UL SPS, and the resources of the UL SPS is indicated by one DCI in a predefined time window after the Msg4, that is, the Msg5 resources indicated by the scheduling DCI of the Msg5 is the SPS resource. The DCI format may re-use the existing UL SPS activation DCI format.

In an example of the embodiment, the UL SPS request information of the UE is carried by an Msg3, and the eNB configures the UL SPS in an Msg4. The specific process is as shown in FIG. 9:

S910: The UE in the RRC idle mode initiates a PRACH procedure to request a RRC idle mode UL SPS transmission when uplink data arrives. First, the UE transmits an Msg1 to the eNB, that is, randomly selects a PRACH preamble in a group of PRACHs and transmits it.

S920: The eNB transmits an Msg2 to the UE, where the Msg2 includes a random access response (RAR) corresponding to the above PRACH preamble and the RAR includes a resource scheduling of the Msg3.

S930: The UE transmits an Msg3 (PUSCH) to the eNB, where the Msg3 includes request information of the RRC idle mode UL SPS in addition to the necessary signaling for the PRACH contention resolution, such as UE ID.

S940: The eNB transmits an Msg4 (PDSCH) to the UE, where in addition to information for contention resolution, such as the UE ID reported by the UE in the Msg3, the Msg4 further includes at least one of response information for the UL SPS request or related configuration information of the UL SPS transmission.

S950: If the Msg4 indicates that the PRACH contention is successful, and the UL SPS request is accepted, the UE starts the UL SPS transmission at a predefined time point after the Msg4 or the HARQ-ACK of the Msg4; or receives the UL SPS resources by the scheduling DCI of the Msg5, and transmits the Msg5 as the first UL SPS.

S960: The UE transmits uplink data on the UL SPS resources until the data transmission is completed or the UL SPS resources are released.

In another example of the embodiment, the UL SPS request information of the UE is carried by an Msg1, and the eNB configures the UL SPS in an Msg2. The specific process is shown in FIG. 10:

S1010: The UE in the RRC idle mode initiates a contention-based PRACH procedure to request the RRC idle mode UL SPS when uplink data arrives. Firstly, the UE transmits the Msg1 to the eNB, and the Msg1 carries the UL SPS request information, that is, the UE randomly selects a PRACH preamble in a group of PRACHs dedicated to requesting the UL SPS and transmit it.

S1020: The eNB transmits the Msg2 to the UE, where the Msg2 includes an RAR corresponding to the above PRACH preamble, and in addition to the resource scheduling information of the Msg3, the RAR further includes the response information for the UL SPS request. If the UL SPS request is accepted, the Msg3 resources will be the SPS resources.

S1030: The UE transmits an Msg3 (PUSCH) to the eNB. If the UL SPS request is accepted, the Msg3 includes necessary information such as a UE ID for contention resolution and data that may be transmitted; if the UL SPS request is not accepted, it falls back to the normal PRACH procedure.

S1040: The eNB transmits an Msg4 (PDSCH) to the UE, where the Msg4 includes information for contention resolution, such as the UE ID reported by the UE in the Msg3.

S1050: If the Msg4 indicates that the PRACH contention is successful, and the UL SPS request is accepted, the UE starts the UL SPS transmission at a predefined time point after the Msg4 or the HARQ-ACK of the Msg4.

S1060: The UE periodically transmits uplink data on the UL SPS resources until the data transmission is completed or the UL SPS resources are released.

Embodiment 3 (Receiving the UL SPS Configuration by System Broadcast Information, which can Also be Received in Conjunction with the Assistance of Other Signaling)

This embodiment describes a method for a UE to receive an RRC idle mode UL SPS parameter/resource configuration, the SPS parameter configuration includes parameters such as an RNTI value for scrambling a SPS retransmission scheduling DCI, a number of HARQ processes used for SPS transmission, a transmission time interval of the SPS, and an open loop power control; the SPS resource configuration includes scheduling information such as the frequency domain resource allocation, the MCS, and the number of repetitions. In this embodiment, the UE receives at least one of the parameter configuration or the resource configuration of the RRC idle mode UL SPS by reading the system broadcast information.

In an example of this embodiment, the UL SPS parameters/resource configuration broadcast by the eNB in the system information applies to all the UEs in the RRC idle mode. In another example, the UL SPS parameter/resource configuration broadcast by the eNB in the system information is only applicable to a specific group of UEs in the RRC idle mode, that is, the eNB configures the UL SPS respectively for different values of an indicator. For example, similar to the existing PRACH configuration, for different CE levels, corresponding UL SPS parameters/resources are configured respectively; or for different groups of UEs, corresponding UL SPS parameters/resources are configured respectively; or for different groups of UEs, corresponding UL SPS parameters/resources are configured respectively in different CE levels.

In an example of the embodiment, the eNB configures one or a set of SPS parameters/resources of the RRC idle mode UL SPS in the system broadcast information, where the UL SPS resources here are periodic resources, and the transmission time of each UL SPS can be determined based on the configured SPS period (similar to the SPS transmission time interval of the existing system) and the SPS transmission time offset.

In an example of the embodiment, the UE in the RRC idle mode can start the UL SPS at any time as long as the uplink data arrives. Since the UL SPS resources are configured by the system broadcast information, the UL SPS resources are shared by all the UEs in the RRC idle mode. The UE needs a contention resolution when the resources are used. For example, when the UE transmits data on the UL SPS resources, the UE carries the signaling for contention resolution, e.g. Information such as the UE ID. The UE may receive corresponding contention resolution signaling after transmitting the UL SPS. If the UE ID contained in the contention resolution signaling is the same as the UE ID reported by the UE in the UL SPS, the UE succeeds in the contention.

In another example, the UL SPS resources can be used only after being activated. The UE in the RRC idle mode can start the UL SPS only after the SPS resources are activated even if the uplink data arrives. For example, if the eNB activates a certain UL SPS resource for a specific UE by a Paging message, the UL SPS resource is dedicated to the UE, that is, there is no collision interference. The eNB may also activate a certain UL SPS resource for a specific group of UEs by a Paging message. Then, the UL SPS resource is shared by the group of UEs, that is, there may be a collision interference, and the contention resolution is still required when the SPS resource is used.

In an example of the embodiment, the eNB only broadcasts the parameter configuration of the RRC idle mode UL SPS in the system information, and the UL SPS resources may be configured in other manners. For example, the resources of the RRC idle mode UL SPS are configured by the Paging DCI. If the UE initiates the PRACH procedure to request the RRC idle mode UL SPS, the eNB may configure the resources of the RRC idle mode UL SPS by using the RAR grant, the Msg4 (physical downlink shared channel (PDSCH)), or the scheduling DCI of the Msg5.

In an example of the embodiment, there is a predefined relationship between the RRC idle mode UL SPS period configured for the UE and the Paging period of the UE. For example, the UL SPS period is the same as the Paging period in default, or the UL SPS period is configured as multiples of the Paging period. In addition, there is also a predefined relationship between the RRC idle mode UL SPS transmission time configured for the UE and the Paging reception time of the UE. For example, the location of the first subframe of the UL SPS is the 4th subframe after the last subframe of the Paging. Or the location of the first subframe of the UL SPS is configured as the nth subframe after the last subframe of the Paging, wherein n is within a predefined range, for example, 4~8. The above characteristics may also be used in an embodiment in which the RRC idle mode UL SPS is configured by other signaling methods.

Embodiment 4 (Parameter Configuration for RRC Idle Mode Pre-Configured Uplink Transmission)

This embodiment describes the parameter configuration for the RRC idle mode pre-configured uplink transmission (the transmission on pre-configured uplink resources). In order to support the RRC idle mode pre-configured uplink transmission, UE needs to receive one or more of the following parameter configurations:

Enabling or Disabling of the RRC Idle Mode Pre-Configured Uplink Transmission by the Base Station When the parameter is configured as being "enable" or "true," the UE having pre-configured uplink resources (PURs) may transmit data on the pre-configured uplink resources, i.e., the UE considers that the pre-configured uplink resources are enabled; or otherwise, even if the UE has the pre-configured uplink resources, the UE cannot transmit data on the pre-configured uplink resources, i.e., the UE considers that the pre-configured uplink resources are disabled.

Preferably, the base station broadcasts, in the cell system information, the configuration for the enabling/disabling of the RRC idle mode pre-configured uplink transmission. Optionally, the base station configures the enabling/disabling of the RRC idle mode pre-configured uplink transmission via UE-specific RRC signaling. Optionally, the base station configures the enabling/disabling of the RRC idle mode pre-configured uplink transmission via a physical layer DCI. Optionally, the base station configures the enabling/disabling of the RRC idle mode pre-configured uplink transmission via a paging message.

Whether the UE can Skip the Transmission on the Pre-Configured Uplink Resources or Not When the parameter is configured as being "true," if the UE has no uplink data to be transmitted at a certain moment, the UE may skip the transmission on the pre-configured uplink resources for this period; or otherwise, the UE cannot skip the transmission on the pre-configured uplink resources for this period even if the UE has no uplink data to be transmitted, and instead, the UE should transmit a PUSCH with 0 MAC SDU, which is constituted by padding bits.

Preferably, whether the UE can skip the pre-configured uplink transmission or not is broadcast and configured in the cell system information. Optionally, whether the UE can skip the pre-configured uplink transmission or not is configured via UE-specific RRC signaling.

Validity Period of the Pre-Configured Uplink Resources

When the parameter is configured, the pre-configured uplink resources are valid only during the configured validity period. After the validity period, the UE should release the pre-configured uplink resources.

The validity period of the pre-configured uplink resources is measured in absolute time (subframe/radio frame/second) or in the number of periods of the pre-configured uplink resources.

Optionally, the validity period of the pre-configured uplink resources starts from the reception of the configuration information for the pre-configured uplink resources by the UE. Optionally, the validity period of the pre-configured uplink resources starts from the first time that the UE enters the RRC idle mode after receiving the pre-configured uplink resources. Here, UE receives the configuration information for the pre-configured uplink resources via UE-specific RRC signaling in the RRC connected mode.

Optionally, this parameter is optionally configured. If this parameter is not configured by the network, the UE should use a predefined default value for the validity period of the pre-configured uplink resources. In one example, the default value is 1 minute or 1 hour. In another example, the default value is a predefined number of periods of the pre-configured uplink resources. For example, the predefined number is one period, i.e., the pre-configured uplink resources are used only once, and the pre-configured uplink transmission is a one-time transmission.

Preferably, the validity period of the pre-configured uplink resources is configured via UE-specific RRC signaling. Optionally, the validity period of the pre-configured uplink resources is configured via the cell system information broadcast.

The Period of the Pre-Configured Uplink Resources

When this parameter is configured, the pre-configured uplink resources are periodically configured, and the pre-configured uplink transmission is a periodic transmission, and this periodic transmission is terminated after releasing the pre-configured uplink resources.

The period of the pre-configured uplink resources is measured in absolute time (subframe/radio frame/second).

Optionally, this parameter is optionally configured. If this parameter is not configured by the network, the UE should use a predefined default value for the period of the pre-configured uplink resources. For example, the default value is 10 seconds or 1 minute. Optionally, this parameter is optionally configured. If this parameter is not configured by the network, the UE determines by default that the pre-configured uplink resources are used only once, i.e., the UE determines by default that the pre-configured uplink transmission is a one-time transmission.

Preferably, the period of the pre-configured uplink resources is configured via UE-specific RRC signaling. Optionally, the period of the pre-configured uplink resources is configured via the cell system information broadcast.

Controlling the Number of Blank Transmissions for Implicitly Releasing the Pre-Configured Uplink Resources (implicitReleaseAfter)

At a certain moment, if the UE has no uplink data arrived, the UE may skip the transmission on the pre-configured uplink resources of the current period. However, if the number of the consecutive skips of the pre-configured uplink transmissions by the UE reaches a configured value (implicitReleaseAfter), the UE should release by default the pre-configure uplink resources and stop the pre-configured uplink transmission. Even if there is uplink data arrived at the UE later, the UE cannot transmit data on the pre-configured uplink resources.

The parameter implicitReleaseAfter can be configured only when the above parameter 2 (the UE skips the pre-configured uplink transmissions) is not configured. That is, the parameter 2 and the parameter 5 are mutually exclusive, and the base station can only select and configure one of them, or select neither of them.

If the parameter 2 is configured, the UE may skip the pre-configured uplink transmissions, and the system has no limit on the number of consecutive skips of the pre-configured uplink transmissions. If the parameter 5 is configured, the UE may also skip the pre-configured uplink transmissions, and the system applies a limit on the number of consecutive skips of the pre-configured uplink transmissions. If the number of consecutive skips of the pre-configured uplink transmissions reaches the configured value, the UE should determine by default that the pre-configured uplink resources are released. If neither of parameters 2 and 5 is configured, the UE cannot skip the pre-configured uplink transmission. The UE should transmit a PUSCH containing 0 MAC SDU even if there is no data arrived.

Preferably, the implicitReleaseAfter is configured via UE-specific RRC signaling. Optionally, the implicitReleaseAfter is configured via the cell system information broadcast.

The Maximum Number of the Consecutive Skips of the Pre-Configured Uplink Transmissions by the UE At a certain moment, if the UE has no uplink data arrived, the UE may skip the transmission on the pre-configured uplink resources of the current period. However, the number of the consecutive skips of the pre-configured uplink transmissions by the UE cannot exceed a configured maximum number. If there is no uplink data arrived at the UE after the number of the consecutive skips of the pre-configured uplink transmissions by the UE reaches the configured maximum number, the UE should transmit a PUSCH containing 0 MAC SDU.

Parameter 6 is similar to parameter 5, except: the UE may implicitly release the pre-configured uplink resources when the parameter 5 is configured; while the UE cannot implicitly release the pre-configured uplink resources when the parameter 6 is configured.

This parameter can be configured only when the above parameter 2 (the UE skips the pre-configured uplink transmissions) is not configured. That is, the parameter 2 and the parameter 6 are mutually exclusive, and the base station can only select and configure one of them, or select neither of them.

If the parameter 2 is configured, the UE may skip the pre-configured uplink transmission, and the system has no limit on the number of consecutive skips of the pre-configured uplink transmissions; if the parameter 6 is configured, the UE may also skip the pre-configured uplink transmissions, and the system applies a limit on the number of consecutive skips of the pre-configured uplink transmissions. If the number of consecutive skips of the pre-configured uplink transmissions reaches a configured value, even if there is no uplink data arrived, the UE should transmit a PUSCH containing 0 MAC SDU; if neither of parameters 2 and 6 is configured, the UE cannot skip the pre-configured uplink transmission and the UE should transmit a PUSCH containing 0 MAC SDU even if there is no data arrived.

Preferably, the maximum number of the consecutive skips of the pre-configured uplink transmissions by the UE is configured via UE-specific RRC signaling. Optionally, the maximum number of the consecutive skips of the pre-configured uplink transmissions by the UE is configured via the cell system information broadcast.

timeAlignmentTimer in the RRC Idle Mode

The timeAlignmentTimer timer is used for maintaining a TA in the RRC idle mode. This timer is used to control how long the TA is considered by the UE as being valid. If the timeAlignmentTimer expires, the UE should determine that the TA is invalid. This parameter may also be referred to as the validity period of a TA in the RRC idle mode.

Optionally, after the UE determines that the TA is invalid, the UE should discard transmitting data on the pre-configured uplink resources, and fall back to the RACH/EDT to transmit data and obtain a new TA, and the TA obtained in the RAR of the RACH/EDT procedure is used as an updated TA.

Optionally, after the UE determines that the TA is invalid, the UE should transmit a UE-specific PRACH preamble, initiate a non-contention-based two-step RACH procedure, obtain an updated TA in the RAR, and transmit data on the pre-configured uplink resources by using the updated TA.

Optionally, this parameter is optionally configured. If this parameter is not configured by the network, the UE should use a predefined default value for the timeAlignmentTimer in the RRC idle mode. Optionally, this parameter is optionally configured. If this parameter is not configured by the network, the timeAlignmentTimer in the RRC connected mode will be reused by the UE to the RRC idle mode. For example, the UE reuses the timeAlignmentTimer configured via the cell system information broadcast or via the UE-specific RRC signaling in the existing system to the RRC idle mode.

Preferably, the timeAlignmentTimer in the RRC idle mode is configured via UE-specific RRC signaling. Optionally, the timeAlignmentTimer in the RRC idle mode is configured via the cell system information broadcast.

Pre-Configured RNTI Value

The pre-configured RNTI value is used to generate the initialization seed of the scrambling sequence for the pre-configured uplink transmission (PUSCH). In addition, the pre-configured RNTI value is used to scramble the CRC of the DCI being monitored during the HARQ procedure of the pre-configured uplink transmission.

Preferably, the pre-configured RNTI value is configured via UE-specific RRC signaling. Optionally, the pre-configured RNTI value is configured via the cell system information broadcast.

Power Control Parameters

The power control parameters should contain at least the configuration of the nominal power P0, i.e., at least the following two parameters: the system nominal power p0-NominalPUSCH, and the UE-specific offset p0-UE-PUSCH. Optionally, the power control parameters further comprise a configuration of the pathloss compensation factor $\alpha$.

Preferably, the power control parameters are configured via UE-specific RRC signaling. Optionally, the power control parameters are configured via the cell system information broadcast.

Frequency Domain Resource Location

For MTC, the frequency domain resource location should contain a narrowband location and frequency domain resource allocation information within the narrowband. For NB-IOT, the frequency domain resource location should contain a carrier location and frequency domain resource allocation information within the carrier. Frequency domain resource allocation refers to a time-frequency resource block within one subframe, i.e., the scheduling unit in time domain is one subframe. In order to support coverage extension, the PUSCH can be repeatedly transmitted, that is, the frequency domain resources indicated by the base station can be repeated multiple times in the time domain.

Optionally, the frequency domain resource allocation of the pre-configured uplink transmission uses a new allocation method, that is, a frequency domain allocation method different from the dynamically scheduled PUSCH. The former provides far less allocation possibilities than the latter, i.e., the former provides only limited allocation possibilities and cannot traverse all allocation possibilities. For example, for the MTC, the pre-configured uplink transmission supports only the one-PRB allocation in one narrow band, and it does not support an allocation of more than one PRB. For the NB-IOT, the pre-configured uplink transmission supports only the one-subcarrier allocation in one carrier, and it does not support an allocation of more than one subcarrier.

Optionally, for the MTC, the granularity of the frequency domain resource allocation of the pre-configured uplink transmission may be based on subcarriers, that is, the pre-configured uplink transmission may use the Sub-PRB allocation mode introduced in the Rel-15 system.

Preferably, the frequency domain resource location is configured via UE-specific RRC signaling. Optionally, the frequency domain resource location is configured via the cell system information broadcast.

Time Domain Resource Location

The time domain resource location here is the location of the starting subframe of the pre-configured uplink transmission.

Optionally, the time domain resource location indicates a radio frame location and subframe location information within the radio frame. Optionally, the time domain resource location indicates only the radio frame location information, and the pre-configured uplink transmission starts from the first subframe of the radio frame by default.

Optionally, the foregoing radio frame location information is indicated by an Offset, and the radio frame that satisfies (SFN*10)% Period=Offset is the radio frame where the starting subframe of the pre-configured uplink transmission is located, where SFN is the system frame number, Period is the period of pre-configured uplink transmission with the unit of millisecond (or subframe), and % is the modulus operation. If the Period is greater than 10.24 seconds, the first radio frame, which satisfies the above calculation, after the UE enters the RRC idle mode after obtaining the pre-configured uplink resources is the radio frame where the starting subframe of the pre-configured uplink transmission is located, and the radio frame locations of other periods are followed in order.

Optionally, the pre-configured uplink transmission is a one-time transmission, i.e., aperiodic. The above radio frame location information is indicated by a time offset and a SFN value, or simply by a time offset. For the former, the radio frame location is the radio frame whose first SFN value after a certain time offset is a configured value. For the latter, the radio frame location is the first radio frame after a certain time offset. The above time offset may use the time point where the UE receives allocation signaling for the pre-configured uplink resources as a reference point, or use the time point where the UE enters the RRC idle mode as a reference point.

Optionally, the time domain resource location and the period of the pre-configured uplink transmission are jointly indicated. For example, the system standard specifies a table of the jointly indicated period and time domain resource location, and the UE determines, according to the table and the indicated value, the period of the pre-configured uplink transmission and the location of the starting subframe of each period.

Preferably, the time domain resource location is configured via UE-specific RRC signaling. Optionally, the time domain resource location is configured via the cell system information broadcast.

MCS or TBS

Optionally, if the amount of data arrived at the UE cannot be transmitted completely by the TBS indicated by or the maximum TBS allowed by the pre-configured uplink transmission, the UE should discard transmitting data on the pre-configured uplink resources, and fall back to the RACH/EDT procedure to transmit data. Here, the fallback to the RACH means that the UE initiates a contention-based random access procedure, and transmits data after establishing a RRC connection with the base station; while the fallback to the EDT means that the UE initiates an early data transmission (EDT) procedure and transmits data by using the Msg3. The premise of using the EDT is that the amount of arrived data can be transmitted completely by the maximum TBS allowed by the EDT.

Optionally, if the amount of data arrived at the UE cannot be transmitted completely by the TBS indicated by or the maximum TBS allowed by the pre-configured uplink transmission, the UE may transmit part of the data on the pre-configured uplink resources, and transmit at least one of a buffer status report (BSR) of the MAC layer or a RRC Connection Request message of the RRC layer at the same time to request to establish a RRC connection, and then receive the configuration message of the RRC connection establishment from the base station, and enter the RRC connected mode to transmit remaining data.

Optionally, if the amount of data arrived at the UE cannot be transmitted completely by the TBS indicated by or the maximum TBS allowed by the pre-configured uplink transmission, the UE may transmit part of the data on the pre-configured uplink resources, and transmit at least one of a buffer status report (BSR) of the MAC layer or a new data resource request message of the RRC layer at the same time to request resources for transmitting new data, and then receive a new data scheduling DCI from the base station so as to transmit remaining data by dynamic scheduling.

Optionally, the base station configures multiple TBSs for the pre-configured uplink transmission, and each TBS uses a different number of repetitions. The large TBS uses a larger number of repetitions, and the small TBS uses a smaller number of repetitions. The UE selects a suitable TBS and the number of repetitions thereof according to the amount of the actually arrived data. The criterion for selecting the TBS is that all the data can be carried, and that padding bits of the MAC layer are the least. That is, the UE itself decides the TBS for the pre-configured uplink transmission.

Optionally, the base station blindly decodes the PUSCH based on the assumption of multiple TBSs. Optionally, the UE informs the base station of the TBS information that is actually used for the pre-configured uplink transmission. For example, the TBS information is carried by the PUSCH in a Piggyback manner (that is, the actually used TBS information is mapped to part of REs of the pre-configured uplink resources in a predefined manner after being coded and modulated, and these REs are rate-matched by the PUSCH), or carried in a manner that part of REs are punctured by the PUSCH (that is, the actually used TBS information is mapped to part of REs of the pre-configured uplink resources in a predefined manner after being coded and modulated, and these REs are punctured by the PUSCH), or carried by the PUSCH (for example, the last 1-2 bits of a transport block are used to carry the actually used TBS information), or carried by different DMRS sequences, or carried by different CRC masks.

Preferably, the MCS or the TBS is configured via UE-specific RRC signaling. Optionally, the MCS or the TBS is configured via the cell system information broadcast.

The Number of Repetitions

Optionally, the base station configures multiple TBSs for the pre-configured uplink transmission, and each TBS uses a different number of repetitions. The large TBS uses a larger number of repetitions, and the small TBS uses a smaller number of repetitions. The UE selects a suitable TBS and the number of repetitions thereof according to the amount of the actually arrived data. The criterion for selecting the TBS is that all the data can be carried, and that the padding bits of the MAC layer are the least. The base station needs to blindly detect the TBS and the number of repetitions actually used by the UE in the pre-configured uplink transmission.

Optionally, the base station configures multiple numbers of repetitions for the pre-configured uplink transmission, each of which corresponding to a different coverage level. The UE may select a corresponding number of repetitions according to its coverage level (i.e. RSRP level), and the base station needs to blindly detect the number of repetitions actually used by the UE in the pre-configured uplink transmission.

Optionally, the base station configures one number of repetitions for the pre-configured uplink transmission. The UE should discard transmitting data on the pre-configured uplink resources and fall back to the RACH/EDT procedure to transmit data, when the coverage level of the UE changes, or the RSRP change of the UE goes beyond a predefined threshold.

Optionally, the base station configures one number of repetitions for the pre-configured uplink transmission. The number of repetitions actually used by the UE for the pre-configured uplink transmission may be less than the number of repetitions configured by the base station, when the coverage level of the UE decreases, or the RSRP of the UE increases and goes beyond a predefined threshold. For example, the number of repetitions actually used may be ½ or ¼ of the pre-configured number of repetitions, that is, the UE may use the pre-configured number of repetitions, or ½ or ¼ of the pre-configured number of repetitions for transmitting data on the pre-configured uplink resources.

Optionally, the base station configures one number of repetitions for the pre-configured uplink transmission. The UE should discard transmitting data on the pre-configured uplink resources and fall back to the RACH/EDT procedure to transmit data, when the coverage level of the UE increases, or the RSRP of the UE decreases to less than a predefined threshold.

Here, the fallback to the RACH means that the UE initiates a contention-based random access procedure, and transmits data after establishing a RRC connection with the base station; while the fallback to the EDT means that the UE initiates an early data transmission (EDT) procedure and transmits data by using the Msg3. The premise of using the EDT is that the amount of arrived data can be transmitted completely by the maximum TBS allowed by the EDT.

Optionally, the base station blindly decodes the PUSCH based on the assumption of multiple numbers of repetitions. Optionally, the UE informs the base station of the information of the numbers of repetitions that is actually used for the pre-configured uplink transmission. For example, the information of the numbers of repetitions is carried by the PUSCH in a Piggyback manner (that is, the actually used information of the numbers of repetitions is mapped to part of REs of the pre-configured uplink resources in a predefined manner after being coded and modulated, and these REs are rate-matched by the PUSCH), or carried in a manner that part of REs are punctured by the PUSCH (that is, the actually used information of the numbers of repetitions is mapped to part of REs of the pre-configured uplink resources in a predefined manner after being coded and modulated, and these REs are punctured by the PUSCH), or carried by the PUSCH (for example, the last 1-2 bits of a transport block are used to carry the actually used information of the numbers of repetitions), or carried by different DMRS sequences, or carried by different CRC masks.

Preferably, the number of repetitions is configured via UE-specific RRC signaling. Optionally, the number of repetitions is configured via the cell system information broadcast.

Frequency Hopping Indication

The pre-configured uplink transmission supports a frequency hopping mode. When frequency hopping indication information is configured, the frequency hopping mode is enabled for the pre-configured uplink transmission.

Preferably, the frequency hopping indication is configured via UE-specific RRC signaling. Optionally, the frequency hopping indication is configured via the cell system information broadcast.

PUSCH DMRS

The DMRS configuration for the pre-configured uplink transmission should include at least PUSCH group assignment information (groupAssignmentPUSCH) and cyclic shift information (cyclicShift).

The pre-configured uplink transmission can transparently support the use of space division multiplexing (SDM) among multiple UEs. In an implementation, the base station may allocate the same time-frequency domain resources to multiple UEs and allocate an orthogonal DMRS to each UE, i.e., configuring different cyclic phases of the same DMRS sequence, thereby transparently implementing MU-MIMO. The base station simultaneously decodes data of these UEs by using multiple receiving antennas.

Optionally, this parameter is optionally configured. If this parameter is not configured by the network, the UE should use the DMRS configuration information included in the PUSCH-ConfigCommon in the existing system for the DMRS of the pre-configured uplink transmission.

Preferably, the PUSCH DMRS is configured via UE-specific RRC signaling. Optionally, the PUSCH DMRS is configured via the cell system information broadcast.

PUSCH Orthogonal Cover Code (OCC)

The pre-configured uplink transmission supports the use of code division multiplexing (CDM) among a plurality of UEs, i.e., the base station allocates the same time-frequency resources to a plurality of UE, and allocates a different OCC for each UE.

Optionally, the PUSCH supports a CDM between two UEs, with two corresponding OCC codes [1 1] and [1 −1]. The number of repetitions of the pre-configured uplink transmission should be in multiples of 2. If the number of repetitions of the pre-configured uplink transmission is 1, the default CDM cannot be used, and the base station does not need to allocate a corresponding OCC.

Optionally, the PUSCH supports a CDM among four UEs, with four corresponding OCC codes [1 1 1 1], [1 −1 1 −1], [1 1 −1 −1] and [1 −1 −1 1]. The number of repetitions of the pre-configured uplink transmission should be in multiples of 4. If the number of repetitions of the pre-configured uplink transmission is less than 4, the default CDM cannot be used, and the base station does not need to allocate a corresponding OCC.

Optionally, the number of OCCs available for the PUSCH is related to the number of repetitions of the pre-configured uplink transmission. For example, when the number of repetitions of the pre-configured uplink transmission is configured in multiples of 2, but does not meet a multiple of 4, the number of available OCCs is 2, and when the number of repetitions of the pre-configured uplink transmission is configured in multiples of 4, the number of available OCCs is 4.

Optionally, the OCCs for the PUSCH are used at the subframe level. For example, if the OCCs are [1 −1], each two adjacent sub-frames of the PUSCH correspond to the OCCs, wherein the first sub-frame is multiplied by 1, and the second subframe is multiplied by −1, and the data symbol streams transmitted by the two subframes should be identical. That is, the PUSCH transmitted by the two subframes should use the same code redundancy version (RV), i.e., RV should be the same within at least 2 subframes or its multiples, for example, the RV change pattern is [0033221100332211].

Optionally, the OCCs for the PUSCH are used at the SC-FDMA symbol level. For example, if the OCCs are [1 −1], each two adjacent SC-FDMA symbols of each subframe of the PUSCH correspond to the OCCs, wherein the first symbol is multiplied by 1, and the second symbol is multiplied by −1, and the data symbols mapped by the two symbols should be identical. That is, the granularity for PUSCH repeated transmission is a symbol, and a complete PUSCH transmission needs to occupy 2 subframes, and the change period of RV is at least 2 subframes or multiples thereof.

According to a conventional mapping, there are 14 mapped symbols [S-0 S-1 S-2 S-3 S-4 S-5 S-6 S-7 S-8 S-9 S-10 S-11 S-12 S-13] in one subframe for the PUSCH, herein, S-j refers to a data steam mapped to the jth symbol. In order to use the OCC at the symbol level, the mapping pattern corresponding to the PUSCH is [S-0 S-0 S-1 S-1 S-2 S-2 S-3 S-3 S-4 S-4 S-5 S-5 S-6 S-6] in the first subframe, and is [S-7 S-7 S-8 S-8 S-9 S-9 S-10 S-10 S-11 S-11 S-12 S-12 S-13 S-13] in the second sub-frame.

Optionally, the OCCs for the PUSCH are used at the slot level. For example, if the OCCs are [1 −1], two slots of each subframe of the PUSCH correspond to the OCCs, wherein the first slot is multiplied by 1, and the second slot is multiplied by −1, and the data symbols mapped by the two slots should be identical. That is, the granularity for PUSCH repeated transmission is a slot, and a complete PUSCH transmission needs to occupy 2 subframes, and the RV change should be in the granularity of 2 subframes or multiples thereof.

According to a conventional mapping, there are 2 mapped slots [T-0 T-1] in one subframe for the PUSCH, where T-0 and T-1 respectively refer to data streams mapped to these two slots. In order to use the OCC at the slot level, the mapping pattern corresponding to the PUSCH is [T-0 T-0] in the first subframe, and is [T-1 T-1] in the second sub-frame.

Preferably, the orthogonal cover code of the PUSCH is configured by UE-specific RRC signaling. Optionally, the orthogonal cover code of the PUSCH is configured via the cell system information broadcast.

Signature of the PUSCH Non-Orthogonal Multiple Access (NOMA)

The pre-configured uplink transmission supports the use of non-orthogonal multiple access technology among a plurality of UEs, i.e., the base station allocates the same time-frequency resources to a plurality of UE, and allocates a different signature for each UE.

Preferably, the signature of the PUSCH is configured via UE-specific RRC signaling. Optionally, the signature of the PUSCH is configured via the cell system information broadcast.

Physical Downlink Control Channel Search Space

The physical downlink control channel search space is used to support the HARQ procedure of the pre-configured uplink transmission. The UE should monitor an ACK DCI, a retransmission scheduling DCI or a DCI indicating the fallback to the RACH/EDT based on a pre-configured physical downlink control channel search space within a pre-configured time window after transmitting the PUSCH on the pre-configured uplink resources.

Optionally, this parameter is optionally configured. If this parameter is not configured by the network, for the HARQ procedure of the pre-configured uplink transmission, the UE uses the physical downlink control channel search space which is configured for monitoring a random access response (RAR). It is the Type2-MPDCCH CSS for the MTC. Optionally, this parameter is optionally configured. If this parameter is not configured by the network, for the HARQ procedure of the pre-configured uplink transmission, the UE uses the physical downlink control channel search space which is configured for monitoring a paging. It is the Type1-MPDCCH CSS for the MTC.

Preferably, the physical downlink control channel search space for the HARQ procedure of the pre-configured uplink transmission is configured by UE-specific RRC signaling. Optionally, the physical downlink control channel search space for the HARQ procedure of the pre-configured uplink transmission is configured by the cell system information broadcast.

Time Window for Pre-Configuring the HARQ Procedure of a Uplink Transmission

The pre-configured uplink transmission supports the HARQ function, and the UE should monitor at least one of a corresponding ACK or a retransmission scheduling DCI within a pre-configured time window after transmitting the PUSCH. After the time window ends, the UE should stop the DCI monitoring and return to the sleep mode.

Optionally, the time window is measured in absolute time. Optionally, the time window is measured in periods of the physical downlink control channel search space.

Optionally, this parameter is optionally configured. If this parameter is not configured by the network, for the HARQ procedure of the pre-configured uplink transmission, the UE uses the time window which is configured for monitoring a random access response (RAR). Optionally, this parameter is optionally configured. If this parameter is not configured by the network, the UE should use a default value for this parameter.

Preferably, the time window for the HARQ procedure of the pre-configured uplink transmission is configured by UE-specific RRC signaling. Optionally, the time window for the HARQ procedure of the pre-configured uplink transmission is configured by the cell system information broadcast.

Number of HARQ Processes for the Pre-Configured Uplink Transmission

The pre-configured uplink transmission supports the use of multiple HARQ processes.

Optionally, the UE is configured with pre-configured uplink resources with a period of T_Period milliseconds, and the number of HARQ processes for the pre-configured uplink transmission is Num_proces. The UE determines the HARQ process number to be used according to the transmitting time of the pre-configured uplink transmission, for example, according to the following equation: HARQ Process ID=[floor(CURRENT_TTI/T_Period)] Num_process, where CURRENT_TTI=[(SFN*10)+subframe number].

Optionally, the UE is configured with multiple pre-configured uplink resources, where the multiple pre-configured uplink resources have the same period, each pre-configured uplink resource uses a different HARQ process, and the UE determines the HARQ process number to be used according to the pre-configured uplink resource number.

Optionally, the number of HARQ processes supported by the pre-configured uplink transmission of the system is greater than 1. However, some UEs are able to support only one HARQ process, and then the DCI for which the UE monitors indicates that the HARQ process number should be set to 0.

Optionally, this parameter is optionally configured. If this parameter is not configured by the network, the number of HARQ processes defaults to 1

Preferably, the number of HARQ processes for the pre-configured uplink transmission is configured via UE-specific RRC signaling. Optionally, the number of HARQ processes for the pre-configured uplink transmission is configured via the cell system information broadcast.

Maximum Number of Retransmissions of the Pre-Configured Uplink Transmission

The pre-configured uplink transmission supports the HARQ retransmission, and the maximum number of retransmissions is configured by the base station.

Optionally, this parameter is optionally configured. If this parameter is not configured by the network, the maximum number of retransmissions is, by default, the maximum number of retransmissions of the Msg3 configured by the broadcast in the cell system information. Optionally, this parameter is optionally configured. If this parameter is not configured by the network, the maximum number of retransmissions uses a default value, for example, 5.

Preferably, the maximum number of retransmissions of the pre-configured uplink transmission is configured via UE-specific RRC signaling. Optionally, the maximum number of retransmissions of the pre-configured uplink transmission is configured via the cell system information broadcast.

Optionally, there may multiple pre-configured uplink resources, i.e., there may multiple at least one of above parameter 4, 10, 11, 12, 13, 14, 15, 16 or 17. The multiple of pre-configured uplink resources may be configured with different periods, or the multiple of pre-configured uplink resources use the same period. The UE may transmit uplink data based on the multiple of pre-configured uplink resources, i.e. the multiple of pre-configured uplink resources are all activated. Or, the UE can select only part (e.g., one) of the multiple of pre-configured uplink resources to transmit uplink data, i.e., activating only part (e.g., one) of the multiple of pre-configured uplink resources.

Activation/Deactivation of UL SPS Resources in RRC Idle Mode

Since the UL SPS is based on the pre-configured uplink resources, in actual applications, in order to effectively control the resource usage efficiency, the UL SPS resources can be used only after being activated, that is, the parameter/resource configuration and the resource activation of the UL SPS can be separated. The UL SPS resources are activated only when the UE has data to transmit. For example, in the existing LTE UL SPS system, when the UE receives a SPS activation DCI scrambled by the SPS C-RNTI, it means that the UL SPS was activated. For the UE in the RRC idle mode, even if the UE receives the configuration of the UL SPS parameters/resources, it does not mean that the UL SPS can be started immediately, and the UL SPS can be activated by the eNB according to at least one of the network load condition or the uplink service data arrival status of the UE, or the UL SPS is requested to be activated by the UE.

The activation signaling for the RRC idle mode UL SPS is classified into two types according to different trigger sources: one is triggering by the eNB, for example, when the intra-cell load is low, the eNB will activate the RRC idle mode UL SPS which was configured previously (for example, by the UE-specific RRC signaling configuration in the RRC connected mode), such as activating the UL SPS by the system broadcast information or the paging information; the other is triggering by the UE, for example, when uplink data arrives at the UE in the RRC idle mode, the PRACH procedure is initiated to request the UL SPS transmission in the RRC idle mode, and the request information for activating the UL SPS may be carried by an Msg1 or an Msg3. Correspondingly, the eNB may activate the UL SPS by an Msg2 or an Msg4.

In the existing LTE SPS transmission mechanism, DCI scrambled with SPS C-RNTI may be used to activate and deactivate SPS resources. If the UE receives the deactivation DCI of the SPS, it needs to stop the SPS transmission and release SPS resources. Additionally, in the existing LTE SPS transmission mechanism, in addition to the explicit release method of the deactivation DCI, an implicit release method is also supported. After the UE had consecutively experienced a predefined number of SPS blank transmissions, the SPS resources are released in default. Here the predefined number (see RRC parameter implicitReleaseAfter) is notified to the UE by the eNB in the parameter configuration of the SPS. "Blank transmission" throughout the specification means that there is no data transmission on the UL SPS resources. These two deactivation methods can ensure the effective use of system resources, and the SPS resources can be released in time when the data transmission of the UE is completed.

For the RRC idle mode UL SPS, if the SPS resources are occupied by a certain UE solely, in order to effectively use the system resources, the deactivation mechanism is also required. If the SPS resources are shared by multiple UEs, since the possibility that the multiple UEs have no data transmission at the same time is not great, the resource use efficiency can be guaranteed, and then the deactivation mechanism may not be needed. However, from the perspective of network resource utilization, the eNB may reconfigure the SPS resources or directly release the shared SPS resources for a group of UEs. For the deactivation mechanism of the RRC idle mode UL SPS, in addition to the method of the LTE system, a new method can also be introduced, which will be explained one by one below.

Embodiment 1 (Initiating a PRACH Procedure in the Idle Mode to Request to Configure the UL SPS Resources)

This embodiment describes a method for RRC idle mode UL SPS resource configuration. In this embodiment, a UE in an RRC idle mode initiates a contention-based PRACH procedure to request an UL SPS in an RRC idle mode, if the eNB accepts the UL SPS request in the PRACH procedure, and the UE succeeds in the contention for the PRACH procedure, the UE may start the RRC idle mode UL SPS after completing the PRACH procedure. The purpose of the contention-based PRACH procedure is to request the RRC idle mode UL SPS. In the contention-based PRACH procedure, signaling interactions between the UE and the eNB are mainly used for PRACH contention resolution and the UL SPS parameter/resource configuration in the RRC idle mode. After the contention-based PRACH procedure is completed, there is no RRC connection established or resumed between the UE and the eNB, and the UE will continue to return to the RRC idle mode and initiate the UL SPS transmission in the RRC idle mode.

The solution of this embodiment is classified into two types according to the carrying manner of the UL SPS request signaling: one is that the UL SPS request information in the RRC idle mode is carried in the Msg1 (PRACH) at the UE, and the eNB can respond to the request in the RAR at the earliest, where the PRACH group here and the normal PRACH group are divided in time domain, frequency domain or code domain, that is, the eNB configures two groups of PRACH in the system broadcast information, one group for establishing or resuming the RRC connection, and the other group for requesting the RRC idle mode UL SPS; the other one is that the UL SPS request information in the RRC idle mode is carried in the Msg3 (PUSCH) at the UE, and then the eNB can respond to the request in the Msg4 (PDSCH) at the earliest. If the UL SPS request of the UE is accepted and the UE succeeds in the contention for the PRACH procedure, the UE starts the UL SPS transmission at a predefined time point after the Msg4 (or after the HARQ-ACK of the Msg4), or may monitor the scheduling DCI of the Msg5 within a predefined time window after the Msg4 and start the UL SPS transmission in the Msg5, i.e. the Msg5 is the first UL SPS transmission.

The solution of this embodiment is classified into two types according to whether the UL SPS request signaling can be rejected or not: one is that the eNB can reject the UL SPS request, and if the request is rejected, the PRACH procedure initiated by the UL SPS request will fall back to the normal PRACH procedure (the purpose is to establish or resume the RRC connection), or the PRACH procedure will be re-initiated to establish or resume the RRC connection; the other is that the eNB cannot reject the UL SPS request, that is, the PRACH procedure must further configure the parameters/resources of the UL SPS, for example, configuring the UL SPS parameters in the Msg4 by RRC signaling, and configuring the SPS resources in the scheduling DCI of the Msg5.

In the SPS of the existing LTE system, when configuring the UL SPS parameters, the eNB needs to indicate the SPS C-RNTI value which is used for the activation DCI, the deactivation DCI and the retransmission scheduling DCI of the SPS. For the RRC idle mode UL SPS, an RNTI value is also required for at least the retransmission scheduling DCI of the SPS. For such an embodiment in which the UL SPS is requested based on the PRACH procedure, the eNB does not need to additionally configure the RNTI value for the RRC idle mode UL SPS, and the temporary C-RNTI value indicated in the RAR may be directly used for the retransmission scheduling DCI of the SPS in the RRC idle mode.

In an example of the embodiment, when uplink data arrives at the UE in the RRC idle mode, the UL SPS request information in the RRC idle mode is carried in the Msg1 (PRACH) at the UE, and the eNB responds to the UL SPS request in the RAR. The UL SPS response signaling in the RAR is 1-bit dedicated information, and the 1 bit may be included in the RAR grant, or may be a reserved bit in the RAR. When the indicated value is 1, it indicates that the eNB accepts the UL SPS request; and when the indicated value is 0, it indicates that the eNB rejects the UL SPS request, then the PRACH procedure will be changed to a normal PRACH procedure for the purpose of establishing or resuming the RRC connection, or the PRACH procedure is terminated here, and the UE re-initiates a PRACH procedure to establish or resume the RRC connection.

Additionally, when the UL SPS request is accepted, the resources indicated by the RAR grant are the SPS resources (including information such as the frequency domain resources, the MCS, and the number of repetitions), that is, the Msg3 resources and the SPS resources are the same. The Msg3 may carry the uplink data of the UE in addition to the necessary signaling such as the UE ID for the contention resolution. However, the Msg3 is not the first UL SPS transmission, that is, there is no inevitable time relationship between the Msg3 and the latest SPS transmission, and the requirement of one SPS transmission time interval is not satisfied. If the UL SPS request of the UE is accepted and the UE succeeds in the PRACH contention, the UL SPS may be started after the PRACH procedure, and there is a predefined time relationship between the time of the first UL SPS transmission and the Msg4 (or the HARQ-ACK of the Msg4), for example, the UL SPS is started in the 4th subframe after the Msg4 (or the HARQ-ACK of the Msg4).

In another example of the embodiment, the eNB configures multiple sets of UL SPS parameters/resources in the system broadcast information. When the UL SPS request information in the RRC idle mode is carried in the Msg1 at the UE, the eNB indicates in the RAR which set of UL SPS configurations the UE uses, such that, although the UL SPS resource information is broadcast, it is still possible to dedicate the broadcasted UL SPS resources to a certain UE by the control of the eNB to avoid collision interference. In this variant, the UL SPS response signaling in the RAR is N bits. When they are indicated as 0, it indicates that the eNB rejects the UL SPS request; and when the indicated value is a value other than 0, it indicates that the eNB accepts the UL SPS request, and the value indicates a certain set of UL SPS parameters/resource configurations.

In an example of this embodiment, the UE in the RRC idle mode receives the parameter/resource configuration of the UL SPS by the system broadcast information. In another example, the UE in the RRC idle mode receives the parameter/resource configuration of the UL SPS by the RAR. In yet another example, there is no dedicated signaling for configuring UL SPS parameters/resources, for example, the SPS transmission time interval is written in the system standard, the RNTI value used to scramble the SPS retransmission scheduling DCI uses the temporary C-RNTI value allocated in the RAR, and the SPS resources reuse the Msg3 resources.

In an example of the embodiment, when uplink data arrives at the UE in the RRC idle mode, the UE initiates a contention-based PRACH procedure, and carries the UL SPS request information in the RRC idle mode in the Msg3 (PUSCH), and the eNB responds to the UL SPS request in the Msg4 (PDSCH). The Msg4 may carry 1-bit UL SPS response signaling. When the indicated value is 1, it indicates that the eNB accepts the UL SPS request; and when the indicated value is 0, it indicates that the eNB rejects the UL SPS request, then the PRACH procedure will fall back to the normal PRACH procedure for the purpose of establishing or resuming the RRC connection, in which case, the Msg4 includes the basic RRC connection configuration in addition to the necessary signaling such as the UE ID for contention resolution.

In an example of this embodiment, the UE in the RRC idle mode receives the UL SPS parameter and resource configuration by the Msg4. In an example, the UE in the RRC idle mode receives the UL SPS parameter configuration by the system broadcast information, and receives the UL SPS resource configuration by the Msg4. In an example, the UE in the RRC idle mode receives the UL SPS parameter configuration by the Msg4, and receives the UL SPS resource configuration by the scheduling DCI of the Msg5.

In an example of the embodiment, the eNB accepts, in the Msg4, the UL SPS request in the RRC idle mode, and configures the RRC idle mode UL SPS resources by the scheduling DCI of the Msg5. The DCI format may reuse the UL SPS activation DCI format of the existing LTE system, and be scrambled by using the Temporary C-RNTI value. If the eNB accepts the UL SPS request in the Msg4 and the UE succeeds in the PRACH contention, the UE monitors the UL SPS resource configuration DCI in the RRC idle mode (i.e., the scheduling DCI of the Msg5) within a predefined time window after the Msg4 (or the HARQ-ACK of the Msg4). If the UE detects the resource configuration DCI in the window, the Msg5 is the first UL SPS. If the UE does not detect the resource configuration DCI in the window, the current UL SPS request fails, and the UE may attempt a next UL SPS request, or the UE may discard the RRC idle mode UL SPS, directly initiate a PRACH request to establish or resume the RRC connection, and enter the RRC connected mode to transmit the uplink data.

Embodiment 2 (Initiating a Two-Step PRACH Procedure in the Idle Mode to Request to Configure the UL SPS Resources)

This embodiment describes a method for RRC idle mode UL SPS resource configuration. In this embodiment, a UE in an RRC idle mode initiates a two-step PRACH procedure to request an UL SPS transmission in an RRC idle mode, if the UE succeeds in the contention for two-step PRACH procedure, the UE may start the UL SPS transmission in the RRC idle mode after completing the PRACH procedure.

The purpose of the two-step PRACH procedure is to request the RRC idle mode UL SPS. In the two-step PRACH procedure, signaling interactions between the UE and the eNB are mainly used for PRACH contention resolution and the UL SPS parameter/resource configuration in the RRC idle mode. After the PRACH procedure is completed, there is no RRC connection established or resumed between the UE and the eNB, and the UE will return to the RRC idle mode and perform the UL SPS transmission in the RRC idle mode according to the configuration received during the two-step PRACH procedure.

In this embodiment, the two-step PRACH procedure for requesting the RRC idle mode UL SPS mainly includes the following steps:

Step 1: The UE transmits a PRACH preamble and a physical uplink channel, and the physical uplink channel mainly carries a small data packet including information such as a UE ID, and may be a physical uplink shared channel (PUSCH), or a physical uplink control channel (PUCCH), or a physical uplink channel specifically designed for the two-step PRACH procedure. The PRACH preamble and the physical uplink channel are consecutive in time, and the PRACH preamble is in front of the physical uplink channel carrying the information such as the UE ID.

Step 2: The UE receives a random access response (RAR) within a corresponding predefined time window, and the RAR includes one or more of the following: time advance (TA), Temporary C-RNTI value, information for contention resolution such as UE ID, RRC idle mode UL SPS at least one of a parameter or a resource configuration. If the UE ID included in the RAR is the same as the UE ID reported by the UE in Step 1, it indicates that the UE succeeds in the contention for the two-step PRACH procedure, and the UE may start the UL SPS transmission at a predefined time point after the RAR, for example, starting the UL SPS transmission in the 6th subframe after the RAR.

In an example, the PDSCH includes at most one above RAR, and the RNTI value which is used to scramble the DCI for scheduling the RAR is implicitly derived from the PRACH preamble used in Step 1 and the time-frequency domain location of the PRACH according to a predefined rule. In another example, the PDSCH includes at most N RARs, and the value of N is much smaller than the maximum number of PRACH preambles available on one PRACH time-frequency resource. The RNTI value which is used to scramble the DCI for scheduling the RAR is implicitly derived from the group of PRACH preambles used in Step 1 and the time-frequency domain location of the PRACH according to a predefined rule.

Embodiment 3 (Activating/Deactivating SPS Resources by Paging)

This embodiment describes a method for activating/de-activating the RRC idle mode UL SPS resources. In this embodiment, the eNB activates/deactivates the RRC idle mode UL SPS resources by Paging, and the activation/deactivation signaling may be directed to all UEs, a group of UEs, or a specific UE in the RRC idle mode in a cell.

In this embodiment, the UE receives, in the RRC connected mode, the parameter/resource configuration in the RRC idle mode UL SPS, and after the UE releases the RRC connection and enters the RRC idle mode, the UE still saves the configuration of the UL SPS and uses it for the RRC idle mode. In another example, the UE receives the UL SPS parameter/resource configuration in the RRC idle mode by the system broadcast information.

In an example of the embodiment, the validity period of the activation signaling for the SPS resource is one Paging period, that is, the UE in the RRC idle mode can use the SPS resources only within the Paging period for which the SPS resources are activated. In another example, the validity period of the activation signaling for the SPS resource is a predefined number of Paging periods. In still another example, the validity period of the activation signaling for the SPS resources is not limited, and the UE may use the SPS resources after receiving the activation signaling for the SPS resources until the deactivation signaling for the SPS resource is received.

In an example of this embodiment, there is a predefined time relationship between the first available UL SPS and the Paging carrying the activation signaling for the SPS resources. For example, the first available UL SPS is in the 4th subframe after the Paging, and the three subframes reserved therebetween are used for the decoding of the paging and the preparation of the SPS PUSCH transmission. The transmission time of the subsequent UL SPS is determined according to the transmission time of the first UL SPS and the SPS transmission time interval. In another example, there is no inevitable time relationship between the first available UL SPS and the Paging. The transmission time of each UL SPS can be determined according to the configured SPS period and the SPS transmission time offset, and the first available UL SPS cannot be earlier than the 4th subframe after Paging.

In an example of this embodiment, when the Paging indicates that the UL SPS resources are activated, if no uplink data arrives at the UE when the Paging is received, the UE cannot transmit the UL SPS during this Paging period. The UL SPS cannot be started even if uplink data arrives at the UE within this Paging period, that is, the first UL SPS actually transmitted must be the first available UL SPS in this Paging period. In another example, when the Paging indicates that the UL SPS resources are activated, if no uplink data arrives at the UE when the Paging is received, the UE may determine the transmission times of all UL SPSs within this Paging period according to the transmission time of the first UL SPS. The UL SPS can be started as long as uplink data arrives at the UE within this Paging period, that is, the first UL SPS actually transmitted can be any UL SPS in this Paging period.

In an example of this embodiment, the activation/deactivation signaling for the RRC idle mode UL SPS resources is carried by Paging PDSCH. There are two methods of carrying: one is similar to the system information update notification (systemInfoModification), applies to all UEs in the RRC idle mode, and may also be applicable only to a group of UEs corresponding to the paging occasion; the other is for a specific UE, for example, it is indicated in a Paging record that the UL SPS of an UE in the RRC idle mode is activated or deactivated. The Paging record here is different from the existing paging record in purposes, i.e. the purpose of the existing paging record is to wake up the UE in the RRC idle mode so as to enter the RRC connected mode, while the purpose of the Paging record is to activate the UL SPS resources for the UE in the RRC idle mode.

In another example of this embodiment, the activation/deactivation signaling for the RRC idle mode UL SPS resources is carried in the Paging DCI, similar to that the existing Paging DCI is used to directly indicate the system information update notification. The SPS activation signaling applies all UEs in the RRC idle mode, and may also be applicable only to a group of UEs corresponding to the paging occasion. The implementation method of carrying the activation/deactivation signaling for the RRC idle mode UL SPS resources by the Paging DCI may include the following:

The first method is to introduce a dedicated indication field to the existing Paging DCI, including Paging DCI for regular paging and Paging DCI for directly indicating system information update. For example, 1 bit is added to indicate whether the RRC idle mode UL SPS is activated or not.

The second method is to use one existing reserved bit in the Paging DCI which is used for directly indicating the system information update to indicate whether the RRC idle mode UL SPS is activated or not.

The third method is to reuse the existing Paging DCI format, but the interpretation of the DCI field is different from the existing Paging DCI. For example, when a certain reserved bit of the DCI indicates a certain value, or a certain field of the existing Paging DCI indicates a certain reserved value, the Paging DCI is interpreted in accordance with the activation/deactivation DCI of the UL SPS resources, and at this time, there is no Paging PDSCH corresponding to the Paging DCI, and the DCI is used to indicate the UL SPS resource information in the RRC idle mode including information such as the frequency domain resources, the MCS, and the number of repetitions; otherwise, the DCI is interpreted in accordance with the existing Paging DCI.

The fourth method is to introduce a new Flag field to the existing Paging DCI. When the Flag indicates a value of 0, the DCI is interpreted in accordance with the existing Paging DCI; when the Flag indicates a value of 1, the Paging DCI is interpreted in accordance with the activation/deactivation DCI of the UL SPS, and at this time, there is no Paging PDSCH corresponding to the Paging DCI. The DCI is similar to the SPS activation DCI of the existing LTE system. The difference is that the UL SPS transmission is activated here by a downlink DCI indicating the UL SPS resource information in the RRC idle mode, including information such as the frequency domain resources, the MCS, and the number of repetitions.

The fifth method is to introduce a new DCI format for activating the RRC idle mode UL SPS. The payload of the activated DCI after padding is the same as the payload of the existing Paging DCI in size, and uses the same control channel search space as the existing Paging DCI. The differences are that the activation/deactivation DCI is scrambled by using a dedicated RNTI of the RRC idle mode UL SPS, and that there is no PDSCH corresponding to the DCI. The DCI is similar to the SPS activation DCI of the existing LTE system, except that the UL SPS transmission is activated by using a downlink DCI, and the DCI indicates the UL SPS resource information in the RRC idle mode, including information such as the frequency domain resources, the MCS, and the number of repetitions.

Embodiment 4 (Activating/Deactivating SPS Resources by System Broadcast Information)

This embodiment describes a method for activating/de-activating the RRC idle mode UL SPS resources. In this embodiment, the eNB activates/deactivates the RRC idle mode UL SPS resources in the system broadcast information, and the activation/deactivation signaling is directed to all UEs or a specific group of UEs in the RRC idle mode in a cell.

In this embodiment, the UE receives, in the RRC connected mode, the UL SPS configuration for the RRC idle mode including the parameter and resources configuration of the UL SPS by using UE-specific RRC signaling, and after the UE releases the RRC connection and enters the RRC idle mode, still saves the configuration of the UL SPS and uses it for the RRC idle mode. The UL SPS resources here are a periodic resources, and the transmission time of each UL SPS is determined according to the configured SPS period and the SPS transmission time offset.

When uplink data arrives at the UE in the RRC idle mode, even if the parameter and resource configuration of the UL SPS have been received, it is necessary to obtain a grant from the network before using the UL SPS resources. For example, the eNB configures resource grant information (1 bit) of the RRC idle mode UL SPS in the system broadcast information. When the indicated value is "false," it indicates that the UE in the RRC idle mode cannot use the pre-configured UL SPS resources to transmit data; and when the indicated value is "true," it indicates that the UE in the RRC idle mode can use the pre-configured UL SPS resources to transmit data.

In an example of the embodiment, the eNB configures the activation/deactivation signaling of the RRC idle mode UL SPS resources for different CE levels respectively. In another example, the eNB configures the activation/deactivation signaling of the RRC idle mode UL SPS resources for different groups of UEs respectively, for example by grouping the UEs by a certain number of bits of the UE ID.

Embodiment 5 (Releasing SPS Resources by the ACK DCI of the SPS)

This embodiment describes a method for releasing the RRC idle mode UL SPS resources. In this embodiment, the eNB informs the UE to release the SPS resources by explicit signaling, and the explicit signaling is carried by the ACK DCI of the SPS.

In this embodiment, the UE may release the SPS resources by receiving explicit SPS resource release signaling. For example, the release signaling is carried in the ACK DCI of the SPS. Here the ACK DCI is the DCI specifically used to indicate that the SPS PUSCH has been successfully received, and can reuse the ACK DCI format specified in the R-15 standard for the early termination feature, wherein the reserved bits can be used to indicate the release of SPS resources.

Embodiment 6 (Implicitly Release SPS Resources when the TA Timer Expires)

This embodiment describes a method for releasing the RRC idle mode UL SPS resources. In this embodiment, after the TimeAlignmentTimer for managing the TA expires, the UE should stop the RRC idle mode UL SPS transmission, and release the SPS resources regardless of whether the uplink data transmission has been completed or not.

In this embodiment, the UE in the RRC idle mode requests the UL SPS transmission in the RRC idle mode by initiating the PRACH procedure. In the PRACH procedure, the UE receives the TA for the RRC idle mode UL SPS transmission by the RAR. Optionally, the UE may also receive the signaling of TA update by the DCI during the RRC idle mode UL SPS transmission process.

In an example, the TimeAlignmentTimer for managing the TA is referred to the timeAlignmentTimerCommon value indicated in SIB2. In another example, the TimeAlignment-Timer for managing the TA may also be specifically configured. For example, the eNB may configure TimeAlignmentTimerDedicated by the Msg4.

In this embodiment, the UE may receive the signaling of the TA update by the DCI during the RRC idle mode UL SPS transmission process. If the UE receives the signaling of the TA update and adjusts the TA, the TimeAlignmentTimerer will be restarted.

TA Acquisition for UL SPS in RRC Idle Mode

In the current LTE system, the UE in the RRC idle mode only needs to periodically monitor the paging RRC, and there is not any uplink transmission, that is, the UE in the RRC idle mode does not have any TA information. If the RRC idle mode UL SPS is introduced, the UE must receive one available TA, and embodiments of the specific implementation methods are provided as follows.

Embodiment 1 (TA can be Saved for the Idle Mode when the TimeAlignmentTimer in the Connected Mode is Configured to be Infinity)

This embodiment describes a method for the UE in the RRC idle mode to receive a TA for the UL SPS. In this embodiment, when the TimeAlignmentTimer is configured to be infinite in case the UE is in the RRC connected mode, even if the UE enters the RRC idle mode, the TA received in the RRC connected mode may still be saved and used for the UL SPS transmission in the RRC idle mode.

In this embodiment, due to the actual usage scenario of the IOT UE, the UE is substantially relatively static, and the TA used by the UE to transmit the physical uplink channel is also substantially unchanged. When the UE reports its own "stationary" characteristic to the eNB, the eNB may configures the TimeAlignmentTimer to be infinity according to the "stationary" characteristic, so that the TA received by the UE in the RRC connected mode can be used all the time. When the UE releases the RRC connection and enters the RRC idle mode, the TA is still saved and used for the RRC idle mode UL SPS transmission.

In this embodiment, if the eNB does not configure the TimeAlignmentTimer to be infinity for the UE, the eNB should not configure the UE with the RRC idle mode UL SPS transmission, and even if the eNB configures the UE with the RRC idle mode UL SPS transmission, the UE should not transmit the SPS PUSCH because there is no available TA, that is, a necessary condition for the eNB to configure the UL SPS transmission in the RRC idle mode is that the TimeAlignmentTimer for the UE must be configured to be infinity.

Embodiment 2 (Receiving TA Via the PRACH Procedure)

This embodiment describes a method in which the UE in the RRC idle mode receives a TA for UL SPS transmission, in which the UE needs to perform the following operations:
  Step 1: The UE in the RRC idle mode determines whether the saved TA is valid before transmitting the UL SPS. If the TimeAlignmentTimer expires, the TA is considered invalid. If the TimeAlignmentTimer has not expired, the TA is considered valid.
  Step 2: If the UE considers that the TA is invalid, the PRACH preamble is transmitted by using the existing TA, and the corresponding RAR or TA verification DCI is monitored to obtain the latest TA.

In an example, the TimeAlignmentTimer is configured by the cell system information broadcast, and the TimeAlignmentTimer is dedicated to the TA management of the RRC idle mode UL SPS transmission, rather than the TimeAlignmentTimerCommon broadcast by the existing system. In another example, the TimeAlignmentTimer is configured by the UE-specific RRC signaling, for example, included in the RRC idle mode UL SPS configuration information. In yet another example, TimeAlignmentTimer reuses the TimeAlignmentTimerCommon configuration of the existing system.

In this embodiment, the UE in the RRC idle mode verifies the validity of the TA by the non-contention-based PRACH procedure and receives the latest TA. The non-contention-based PRACH procedure has only two steps. In an example, the two-step PRACH procedure includes PRACH (Msg1) and RAR (Msg2). In another example, the two-step PRACH procedure includes PRACH (Msg1) and TA Verification DCI (Msg2).

For the two-step PRACH procedure including PRACH (Msg1) and RAR (Msg2), the RAR can reuse the RAR design in the existing system. The difference from the RAR of the existing system is that there is no Msg3 scheduling corresponding to the RAR, mainly for providing the UE with TA Command information to adjust the TA so as to transmit the PUSCH on the pre-configured resources.

In an example, some of the fields in the UL Grant included in the RAR are set to reserved values. For example, the fields such as the MCS, the TBS, and the like may be set as reserved values. Because the RAR does not schedule the corresponding Msg3 but the TPC field in the RAR should be reserved for adjusting the transmit power of the UL SPS, only some fields in the TA Command, Temporary C-RNTI and UL Grant are interpreted. In another example, the UL Grant field included in the RAR is set to a reserved value as a whole, that is, only the TA Command and Temporary C-RNTI fields are interpreted by the UE. In another example, the UL Grant field and the Temporary C-RNTI value included in the RAR are all set to reserved values, that is, only the TA Command field is interpreted by the UE.

In an example, the time window for monitoring the RAR to receive the TA is configured by a dedicated signaling broadcast of a cell system information block instead of the ra-ResponseWindowSize of the existing system. That is, the RAR window is only used for the TA verification procedure, and the configured value is generally smaller than the configured value of ResponseWindowSize of the normal PRACH procedure. The advantage of this example is that by reducing the RAR window, the time of the TA acquisition process can be reduced to reduce the UE power consumption, and the UE can quickly obtain the TA for the RRC idle mode UL SPS transmission.

For the two-step PRACH procedure including PRACH (Msg1) and TA Verification DCI (Msg2), the TA verification DCI is DCI dedicated to indicating update information of the TA. The DCI includes at least an 11-bit TA command field. Optionally the TA verification DCI may also include a TPC command field for adjusting the transmit power of the UL SPS.

In an example, the CRC of the TA verification DCI is scrambled by the RA-RNTI, and the RA-RNTI is the same as the RA-RNTI value used for the PDCCH of the RAR. That is, the RA-RNTI value is related to the transmitted PRACH preamble and the time-frequency domain location of the PRACH.

In another example, the TA verification DCI uses the same RNTI value as the DCI that schedules the UL SPS retransmission, i.e., scrambling the CRC using the SPS-RNTI. Optionally, the SPS-RNTI value is configured by UE-specific RRC signaling (included together in the RRC idle mode UL SPS configuration information). The RRC idle mode UL SPS resources here are UE-specific. Optionally, the SPS-RNTI value is calculated implicitly based on a predefined rule. For example, the SPS-RNTI value is calculated from the time-frequency domain locations of the UL SPS resources, where the RRC idle mode UL SPS resources are shared by multiple UEs.

Additionally, after transmitting the PRACH, the UE monitors the TA Verification DCI in a predefined or pre-configured time window. The length of the time window is a value specified by the system standard, or its configuration is broadcast in the cell system information. If the UE does not detect the TA Verification DCI in the time window, the UE considers that the PRACH transmission fails, and may increase the PRACH transmit power to initiate a new TA verification procedure once more.

In an example, the downlink control channel search space for monitoring the TA Verification DCI is the downlink control channel search space for monitoring the RAR, and is configured by the cell system information broadcast.

In another example, the downlink control channel search space for monitoring the TA Verification DCI is a downlink control channel search space for monitoring the retransmission scheduling DCI of the RRC idle mode UL SPS, and is configured by the cell system information broadcast, or configured by the UE-specific RRC signaling (included together in the RRC idle mode UL SPS configuration information).

In an example, the PRACH preamble for the TA verification procedure is specific to the UE. Here, the UL SPS resources are specific to the UE, and are configured by UE-specific RRC signaling. When the network configures the UL SPS resources, the UE configures the UE-specific PRACH preamble. The PRACH preamble is specific to the UE, and is only used for the TA verification procedure before the RRC idle mode UL SPS transmission.

In another example, the PRACH preamble for the TA verification procedure is specific to the UL SPS resources. Here, the UL SPS resources are shared by a group of UEs or all UEs in the RRC idle mode in a cell, and the contention resolution is needed in the use of the shared UL SPS resources by the UE (For specific contention resolution, refer to the following description about the use of the shared UL SPS resources). The shared UL SPS resources are configured by the cell system information broadcast, and each UL SPS resource corresponds to a dedicated PRACH preamble. The PRACH preamble is only used for the TA verification procedure before the UL SPS transmission. The PRACH preamble can be configured by explicit signaling, or implicitly calculated based on predefined criteria. For example, the PRACH preamble is calculated according to the time-frequency domain location of the corresponding UL SPS resource.

Embodiment 3 (Carrying TA Update Via DCI)

This embodiment describes a method for the UE in the RRC idle mode to receive the TA for the UL SPS. In this embodiment, the UE in the RRC idle mode receives the signaling of the TA update by the DCI during the UL SPS transmission, where the DCI has a field dedicated to the TA update, and the DCI may be ACK DCI of the SPS, a retransmission scheduling DCI, a resource reconfiguration DCI, or a resource release DCI.

In an example of this embodiment, considering that the moving speed of the UE is small and the TA variation range is small, the TA range estimated by the eNB based on the SPS PUSCH and its DMRS is sufficient, even if this TA range is smaller than the TA range estimated based on the PRACH. In this example, the UE receives the signaling of the TA update by the DCI during the RRC idle mode UL SPS transmission process. Due to the limitation of the DCI field size, the TA range which can be adjusted based on the signaling of the TA update is small.

In another example, considering that the moving speed of the UE is large, the TA range estimated by the eNB based on the SPS PUSCH and its DMRS is insufficient, and the eNB may notify the UE to transmit other physical uplink signals/channels by the DCI so as to assist the eNB to detect a larger TA range. For example, the transmission of PRACH or SRS is triggered by the DCI. In this example, the UE may receive the signaling of the UE update by the DCI or the RAR during the RRC idle mode UL SPS transmission process, and the eNB may trigger the PRACH procedure by using the PDCCH order of the existing system, then the UE may receive the signaling of the TA update by the RAR in the PRACH procedure, and the signaling of the TA update can adjust a larger TA range.

In an example of the embodiment, the UE in the RRC idle mode monitors the ACK DCI of the PUSCH in a predefined time window after each time the PUSCH is transmitted on the SPS resources. The ACK DCI here is the DCI specifically used to indicate that the SPS PUSCH has been successfully received, and can reuse the ACK DCI format specified in the R-15 standard for the early termination feature, wherein some reserved bits can be used to indicate the TA update. Similarly, some reserved bits of the SPS retransmission DCI, SPS resource reconfiguration DCI, or SPS resource release DCI may also be used to indicate the TA update, for example, using bits of the indicated fields such as at least one of the NDI or the HARQ process number.

In an example of this embodiment, the time window is predefined by the predefined time window transmission time interval. The TA-indicated fields included by the above DCI have a size of 6 bits, i.e. indicating the TA update value ranged 0~63, then the new TA value is calculated as follows: TAnew=NTAold+(TA−31)×16. In another example, the TA-indicated fields included in the above DCI have a size of 3 or 4 bits, i.e. indicating the TA update value ranged 0~7 or 0~15, then the new TA value is calculated respectively as follows: TAnew=NTAold+(TA−4)×16, TAnew=NTAold+(TA−8)×16.

Embodiment 4 (Criterion for Judging Whether the TA is Valid, and MAC Layer TA Maintenance Procedure)

This example describes a criterion by which the UE configured with pre-configured uplink resources (PUR) in the RRC idle mode judges whether the TA is valid, and a method of the MAC layer for an uplink TA maintenance procedure.

The pre-configured uplink transmission in the RRC idle mode (the transmission on the pre-configured uplink resources) must transmit the PUSCH based on an valid TA. If the UE does not have a valid TA, the UE cannot transmit the PUSCH on the pre-configured uplink resources. The criterion for judging whether the TA is valid should apply one or more of the following:

When the TimeAlignmentTimer in the RRC idle mode is not at run time, the TA is considered invalid.

If it is out of the TA validity period in the RRC idle mode, the TA is considered invalid.

When the serving cell (the camping cell in the RRC idle mode) changes, the TA is considered invalid.

When the change of a measured RSRP value of the serving cell (the camping cell in the RRC idle mode) exceeds a predefined threshold, the TA is considered invalid.

When the change of a measured RSRP value of one or more neighboring cells exceeds a predefined threshold, the TA is considered invalid.

When the change of time difference of arrival (TDOA) of signals from at least two base stations exceeds a predefined threshold, the TA is considered invalid.

When the UE has a tag indicating a stationary feature, the TA is considered valid.

When cell system information indicates that the cell radius is less than a predefined threshold, the TA is considered valid.

In this embodiment, the MAC entity has a configurable timeAlignmentTimer timer for the RRC idle mode, and the timeAlignmentTimer timer is used to control how long the MAC entity can consider the camping cell in the RRC idle mode as being time aligned in uplink.

Optionally, the RRC idle mode timeAlignmentTimer is configured via the cell system information broadcast, and uses a parameter configuration different from that for the RRC connected mode timeAlignmentTimer. Optionally, the RRC idle mode timeAlignmentTimer is configured by UE-specific RRC signaling. For example, the UE obtains a RRC idle mode timeAlignmentTimer configuration in the RRC connected mode, and the timeAlignmentTimer may be included in a series of parameter configurations of the PUR.

When the RRC idle mode timeAlignmentTimer does not run, a MAC entity cannot perform any uplink transmission in the RRC idle mode except the PRACH, comprising a transmission on pre-configured uplink resources.

The maintenance procedure of the MAC entity for the RRC idle mode TA includes at least one of the following:

When a TA Command provided by the physical layer is received in the RRC idle mode (The TA Command is carried by a physical layer DCI)
  a) Use this TA Command
  b) Start or restart the timeAlignmentTimer in the RRC idle mode When a TA Command MAC CE is received in the RRC idle mode
  a) Use this TA Command
  b) Start or restart the timeAlignmentTimer in the RRC idle mode When a TA Command in the RAR is received in RRC idle mode
  a) Use this TA Command
  b) Start or restart the timeAlignmentTimer in the RRC idle mode
  c) If the contention resolution of the RACH procedure is unsuccessful, stop running the timeAlignmentTimer in the RRC idle mode.

When a TA Command in the RAR is received in RRC idle mode
  a) If the random access preamble was not selected by the MAC entity, i.e. the corresponding RACH procedure is contention-free
    i. Use this TA Command
    ii. Start or restart the timeAlignmentTimer in the RRC idle mode
  b) Otherwise, if the RRC idle mode timeAlignmentTimer does not run
    i. Use this TA Command
    ii. Start or restart the timeAlignmentTimer in the RRC idle mode
    iii. If the contention resolution of the RACH procedure is unsuccessful, stop running the timeAlignmentTimer in the RRC idle mode.
  c) Otherwise, ignore this TA Command When the camping cell in the RRC idle mode changes
  a) Stop running the timeAlignmentTimer in the RRC idle mode When the change of a measured RSRP value of the camping cell in the RRC idle mode exceeds a threshold, for example, a threshold of N dB
  a) Stop running the timeAlignmentTimer in the RRC idle mode
  b) Notes: Preferably, N is a predefined value, i.e. a value specified by the system standard, such as N=5; alternatively, N is a configurable value, and configured by the cell system information broadcast. Optionally, the above changes in RSRP are limited to a predefined time window.

When the change of a measured RSRP value of one or more neighbor cells (cells other than the camping cell) exceeds a threshold, for example, a threshold of M dB
  a) Stop running the timeAlignmentTimer in the RRC idle mode
  b) Notes: Similar to the above N, preferably, M is a predefined value, i.e. a value specified by the system standard, such as M=8; alternatively, M is a configurable value, and configured by the cell system information broadcast. Optionally, the above changes in RSRP are limited to a predefined time window.

When the change of measured TDOA value of signals from at least two base stations exceeds a threshold
  a) Stop running the timeAlignmentTimer in the RRC idle mode When the tag indicating the stationary is received, and the timeAlignmentTimer in the RRC idle mode expires
  a) Restart the timeAlignmentTimer in the RRC idle mode (i.e., the timeAlignmentTimer is set as infinite, and never expires)

When the timeAlignmentTimer in the RRC idle mode expires
  a) Empty all HARQ buffers
  b) Optionally, release the pre-configured uplink resources in the RRC idle mode For a UE configured with RRC idle mode pre-configured uplink resources, the TA received by the UE in the RRC connected mode can be saved and used for the RRC idle mode. After the configuration information for the pre-configured uplink transmission is received by the UE, and when the UE first changes from the RRC connected mode to the RRC idle mode, the TA received in the RRC connected mode is called an initial TA in the RRC idle mode.

Optionally, the timeAlignmentTimer managing the initial TA in the RRC idle mode starts to run upon the UE enters the RRC idle mode.

Optionally, the timeAlignmentTimer managing the initial TA in the RRC idle mode starts to run upon the UE receives the TA Command, i.e., the timeAlignmentTimer running in the RRC connected mode continues its running when the UE enters the RRC idle mode.

Optionally, the timeAlignmentTimer managing the initial TA in the RRC idle mode uses a configured value of the timeAlignmentTimer in the RRC connected mode.

Optionally, the timeAlignmentTimer managing the initial TA in the RRC idle mode uses a configured value of the timeAlignmentTimer in the RRC idle mode.

Optionally, the timeAlignmentTimer for the RRC idle mode and the timeAlignmentTimer for the RRC connected mode are respectively configured, i.e., they may be configured with different values.

Optionally, the timeAlignmentTimer for the RRC idle mode and the timeAlignmentTimer for the RRC connected mode use the same configured value by default, i.e. the base station needs not to additionally configure the timeAlignmentTimer in the RRC idle mode.

The initial TA in the RRC idle mode should follow the above TA maintenance procedure and the rules for determining the validity. When the initial TA is invalid, the UE may obtain an updated TA via the RACH/EDT procedure. The updated TA should also follow the above TA maintenance procedure and the rules for determining the validity. The timeAlignmentTimer that manages the subsequently-updated TA starts to run when the TA Command is obtained, and is based on the configured value of the timeAlignmentTimer in the RRC idle mode.

Fallback Mechanism for UL SPS in RRC Idle Mode

Embodiment 1 (Fallback Mechanism when a PRACH Procedure is Initiated to Request the UL SPS and the Request is Rejected)

This embodiment describes a method for the RRC idle mode UL SPS fallback mechanism. In this embodiment, when uplink data arrives at the UE in the RRC idle mode, the UE initiates a contention-based PRACH procedure to request the UL SPS transmission. For example, information requesting the UL SPS transmission is carried in the Msg1 or the Msg3 at the UE, and the eNB responds to the request signaling by using the Msg2 (corresponding to the Msg1 carrying the request information) or the Msg4 (corresponding to the Msg3 carrying the request information). Considering the actual load status of the network, the eNB may reject the UL SPS request, and then, when the eNB rejects the UL SPS request, the UE needs to fall back to the normal mode of the existing system, that is, entering the RRC connected mode to transmit uplink data.

In an example of this embodiment, if the eNB rejects the UL SPS request of the UE, the UE falls back to the normal PRACH procedure in the current PRACH procedure (for the purpose of establishing/resuming the RRC connection), and enters the RRC connected mode to transmit uplink data. For example, if the eNB rejects the UL SPS request in the Msg4, the Msg4 will include relevant RRC signaling for establishing/resuming the RRC connection; or, if the eNB rejects the UL SPS request in the Msg2, then the Msg3 will further include relevant RRC signaling for request to establish/resume the RRC connection, and the Msg4 will include relevant RRC signaling for establishing/resuming the RRC connection; or, the UE and the eNB will further establish/resume the RRC connection by at least one of the Msg5 or the Msg6.

In another example of this embodiment, if the eNB rejects the UL SPS request of the UE, the UE re-initiates the normal PRACH procedure to establish/resume the RRC connection, or attempts a predefined number of PRACH procedures to request the UL SPS transmission, and if the UL SPS request of the UE is rejected in multiple PRACH procedures, the UE re-initiates the normal PRACH procedure to establish/resume the RRC connection, and enters the RRC connected mode to transmit uplink data.

Embodiment 2 (Fallback Mechanism when Multiple UL SPS Transmissions Fail)

This embodiment describes a method for the RRC idle mode UL SPS fallback mechanism. In this embodiment, when the UE in the RRC idle mode transmits uplink data by the UL SPS and fails, the UE will fall back to the mechanism of the existing system. For example, after a predefined number of UL SPS transmissions fail, the UE will stop the UL SPS transmission, initiate the normal PRACH procedure to establish/resume the RRC connection, and enter the RRC connected mode to transmit uplink data, in order to ensure the reliability of the uplink data transmission.

In this embodiment, the UE may trigger a fallback mechanism after multiple consecutive UL SPS transmission failures, where the number of consecutive UL SPS transmission failures is a predefined value, and a specific value of it may be specified in the standard, e.g., 4, or may be configured by the eNB using system broadcast information or included in the parameter configuration of the UL SPS.

In an example of this embodiment, if the UE transmits the UL SPS unsuccessfully, the UE may consecutively increase the transmit power according to a predefined step size when attempting the next UL SPS transmission. In another example, if the UE transmits the UL SPS unsuccessfully, the UE may not increase the transmit power when attempting the next UL SPS transmission, that is, the transmit powers of all SPS PUSCH must be consistent.

In an example of this embodiment, the UE in the RRC idle mode monitors the ACK DCI of the PUSCH within a predefined time window after the SPS PUSCH, the ACK DCI being DCI indicating that the SPS PUSCH has been successfully received. If the UE doesn't receive the ACK DCI within the predefined time window, the UE considers that the SPS PUSCH transmission failed, and then the UE may initiate a retransmission at the next SPS opportunity. If the UE initiates multiple SPS retransmissions but fails, the UE shall discard the UL SPS transmission, initiate a normal PRACH procedure to establish/resume the RRC connection, and enter the RRC connected mode to transmit uplink data.

In another example of the embodiment, the RRC idle mode UL SPS resources are shared resources, and multiple UEs may use the same SPS resources to transmit uplink data at the same time, so the UE needs a contention resolution mechanism when using the UL SPS resources. For example, when the UE transmits data on the UL SPS resources, information for contention resolution such as the UE ID is carried. After transmitting the PUSCH or its retransmission, the UE will receive DCI or PDSCH indicating whether it succeeds in the contention within a predefined time window. Similar to the Msg4 in the existing PRACH process, the DCI or the PDSCH may include information for contention resolution, such as the UE ID. If the UE ID included in the DCI or the PDSCH is the same as the UE ID reported in the previous SPS PUSCH, the UE considers that it succeeds in the contention, that is, the SPS PUSCH is successfully transmitted. If the UE fails in multiple consecutive UL SPS contentions, the UE should discard the UL SPS transmission, initiate a normal PRACH procedure to establish/resume the RRC connection, and enter the RRC connected mode to transmit uplink data.

Embodiment 3 (Instructing the Fallback of the UL SPS by DCI)

This embodiment describes a method for instructing the fallback of the RRC idle mode UL SPS by DCI. In this embodiment, the UE needs to perform the following operations:

Step 1: the UE in the RRC idle mode transmits a PUSCH on the pre-configured uplink resources;

Step 2: The UE monitors DCI scrambled by a pre-configured RNTI value in a predefined or pre-configured time window after transmitting the PUSCH. The DCI is used to schedule the retransmission of the UL SPS, or instruct to fall back the UL SPS transmission to EDT or the regular PRACH procedure.

In this embodiment, when the base station fails to decode the UL SPS, the base station may instruct, by DCI, the UE to use other transmission methods to transmit data. That is, the UL SPS transmission may fall back to the other transmission methods. For example, the DCI may instruct to fall back the UL SPS transmission to EDT (assuming the base station supports EDT transmission) or to enter the RRC connected mode to transmit uplink data.

In this embodiment, when the DCI received by the UE instructs the fallback of the UL SPS, the UE should determine by default that the previous UL SPS transmission fails, and transmit the previous data to the base station using a fallback transmission method. The fallback operation is only for the current UL SPS transmission, and in the next UL SPS transmission opportunity, if there is data to be transmitted, the UL SPS can still be used to transmit data.

In an example, the UE determines, by itself, to which transmission method the UL SPS transmission falls back. The UE determines whether the UL SPS transmission falls back to the EDT or the RRC connected mode according to the TBS value of the UL SPS actually transmitted previously. If the actually transmitted TBS value is smaller than the maximum TBS value of the EDT allowed by the cell, the UE performs an EDT operation. If the actual transmitted TBS value is greater than the maximum TBS value of the EDT allowed by the cell, the UE will initiate a normal PRACH procedure to establish or resume the RRC connection.

In another example, the transmission method to which the UL SPS transmission falls back is explicitly instructed in the DCI.

In an example of the embodiment, the maximum TBS value of the UL SPS transmission is less than or equal to the maximum TBS value of the EDT transmission. When the UL SPS transmission fails, the base station may instruct, by DCI, to fall back the UL SPS transmission to the EDT. The difference between this example and the above example is that the DCI here can only instruct the fallback of the UL SPS to the EDT, and the fallback of the UL SPS to the RRC connected mode cannot be instructed by the DCI.

In this embodiment, the DCI instructing the UL SPS fallback uses the same scrambling RNTI value as the DCI scheduling the UL SPS retransmission. The RNTI value is configured by UE specific RRC signaling, or is implicitly calculated based on a predefined rule, for example, calculated based on the time-frequency domain position of the used UL SPS resource.

Additionally, the DCI instructing the UL SPS fallback has the same payload size as the DCI scheduling the UL SPS retransmission. In one example, the two DCIs are distinguished by a 1-bit flag field. If the indicated value of the flag field is 0, the DCI is interpreted in the format scheduling the UL SPS retransmission. If the indicated value of the flag field is 1, the DCI is interpreted in the format instructing the UL SPS fallback. In another example, the two DCIs are implicitly distinguished by a reserved value configuration of a certain DCI field. For example, when the indicated value of the resource allocation (RA) field is a reserved value, this DCI is used to instruct the fallback of the UL SPS.

How to Use the Shared UL SPS Resources

For the RRC idle mode UL SPS transmission, in one example, the UL SPS resources pre-configured by the eNB for the UE are shared by multiple UEs, such as the configured UL SPS resources are broadcast by the cell system information. In another example, the UL SPS resources pre-configured by the eNB for the UE is specific to a certain UE, for example, by the UE-specific RRC signaling in the RRC connected mode, or by the UL SPS resources configured by the scheduling DCI of the Msg2, the Msg4 or the Msg5 in the PRACH procedure.

If one UL SPS resource is shared by multiple UEs, a PUSCH collision may occur when multiple UEs simultaneously transmit data on this UL SPS resource. Similar to the PRACH collision, a contention resolution process should also apply to the PUSCH transmitted on the UL SPS resource shared in the RRC idle mode. For example, the information such as the UE ID is carried when the UE transmits data on the UL SPS resource, and then the UE monitors the corresponding contention resolution signaling. If the UE ID included in the contention resolution signaling is the same as the UE ID previously reported, it means that the UE succeeds in the contention.

Similar to the PRACH collision, in order to reduce the collision probability of the PUSCH, the eNB may pre-configure multiple UL SPS resources for the UE to randomly select. The larger the capacity of the UL SPS resources is, the lower the collision probability is. The multiple UL SPS resources may be divided in the manner of orthogonal multiple access, for example, by time domain, frequency domain, spatial domain, and the like; or may be divided in the manner of non-orthogonal multiple access, for example, by non-orthogonal codewords, non-orthogonal interleaving patterns, and the like. Each UL SPS resource is a periodic resource, and the period of each UL SPS resource should be the same.

In an example, the capacity of the UL SPS resources is extended by using different DMRS sequences. For example, when the PUSCH is transmitted on one time-frequency resource block in the RRC idle mode, different DMRS sequences may be used. The UE randomly selects one time-frequency resource block from the configured multiple time-frequency resource blocks, randomly selects one DMRS sequence from the configured multiple DMRS sequences, and transmits the PUSCH based on the selected time-frequency resource block and the selected DMRS sequence.

If it is defined that the PUSCH transmission can only use orthogonal multiple access, other than that the PRACH resources can be divided in the code domain (there are 64 PRACH preambles in the code domain), the PUSCH resources (i.e., the UL SPS described above) can be divided only in the time domain, the frequency domain or the spatial domain. The time domain division indicates that, for the multiple UL SPS resources, the SPS periods are the same, the frequency domain locations are the same, but the SPS time offset values are different. The frequency domain division indicates that, for the multiple UL SPS resources, the SPS periods are the same, the SPS time offset values are the same, but the frequency domain locations are different. The spatial domain division indicates that, for the multiple UL SPS resources, the SPS periods are the same, the SPS time offset values are the same, and the frequency domain locations are the same, but the cyclic shift values of the used DMRSs are different.

Embodiment 1 (Competition for the Shared UL SPS Resources)

This embodiment describes a method for the UE in the RRC idle mode to use the shared UL SPS resources by using a contention resolution. In this embodiment, the UE completes the contention resolution of the UL SPS resources using a two-step method. The first step: the UE randomly selects an UL SPS resource to transmit data, and the transmitted PUSCH includes information such as the UE ID in addition to the uplink data. The second step: the UE monitors the contention resolution signaling transmitted by the eNB, and if the UE ID included in the contention resolution signaling is the same as the UE ID reported in the first step, the UE is considered successful in the contention on the UL SPS resource.

The first step here is similar to the Msg3 of the PRACH procedure, and the second step is similar to the Msg4 of the PRACH procedure. Compared with the PRACH contention resolution process, only the Msg1 and the Msg2 are omitted. Between the first step and the second step, the UE may receive the retransmission scheduling DCI of the first step and perform a corresponding retransmission.

In an example of the embodiment, the contention resolution signaling is carried by the PDSCH, that is, the UE will monitor the DCI scrambled by the pre-configured RNTI value in the pre-configured physical downlink control channel search space after the UE transmits the PUSCH (the first step) on the UL SPS resource. If the DCI is the retransmission scheduling DCI of the PUSCH (the first step), the UE retransmits the PUSCH (the first step); and if the DCI is the scheduling DCI of the PDSCH (the second step), the UE receives the PDSCH (the second step). If the UE successfully decodes the PDSCH and the UE ID included in the PDSCH indicates that the UE succeeds in the contention, an ACK is sent on the corresponding PUCCH resource. Otherwise, nothing is needed.

Here, the related configuration (for example, the reference signal power and then the maximum number of repetitions, etc.) of the PDSCH (the second step) may be specifically configured, or the related configuration of the Msg2/Msg4 in the PRACH procedure may be reused, that is, configured by the system broadcast information. The related configuration (for example, the PUCCH resource and the number of repetitions, etc.) of the PUCCH for feeding back the HARQ-ACK of the PDSCH (the second step) may be specifically configured, or the related configuration of the corresponding PUCCH transmission of the Msg4 in the PRACH procedure may be reused, that is, configured by the system broadcast information.

In another example of this embodiment, the contention resolution signaling is carried by the DCI, that is, the UE will monitor the DCI scrambled by the pre-configured RNTI value in the pre-configured physical downlink control channel search space after the UE transmits the PUSCH (the first step). If the DCI is the retransmission scheduling DCI of the PUSCH (the first step), the UE retransmits the PUSCH (the first step); if the DCI is DCI directly indicating the contention resolution signaling, the UE further determines whether the UE ID included in the DCI is the same as the UE ID reported by the PUSCH (the first step). If they are the same, an ACK is sent on the corresponding PUCCH resource. Otherwise, nothing is needed.

Here, the DCI directly indicating the contention resolution signaling further includes an indicated field related to the corresponding HARQ-ACK resource, such as a HARQ-ACK resource offset. Similar to the method of carrying the contention resolution signaling by the PDSCH, the related configuration (including the PUCCH resource, the number of repetitions, etc.) of the PUCCH for feeding back the HARQ-ACK of the DCI (the second step) may be specifically configured, or the related configuration of the corresponding PUCCH transmission of the Msg4 in the PRACH procedure may be reused, that is, configured by the system broadcast information.

In an example, the DCI carrying the contention resolution signaling and the DCI used in the PUSCH (the first step) retransmission scheduling have the same payload size, but the DCI fields are interpreted differently, and the specifically used interpretation method is indicated by a flag field in the DCI. Due to the limitation of the DCI payload size, the DCI used for contention resolution may not contain the complete UE ID information, that is, only part of information of the UE ID is included. Therefore, the UE does not need to report the complete UE ID information in the PUSCH (the first step), and only the corresponding part of UE ID information needs to be reported. In order to avoid the case where the interference collision between UEs cannot be resolved by the contention, the eNB's pre-configured UL SPS resources cannot be used for different UEs which happen to have the same part of the UE ID information, that is, the UL SPS resources are not shared by all UEs, which can be shared by only a specific group of UEs.

In another example, the DCI carrying the contention resolution signaling and the DCI used in the PUSCH (the first step) retransmission scheduling have different payload sizes, that is, the UE needs to monitor DCIs of different payload sizes. The contention resolution DCI here may include the complete UE ID information, or may include only part of the UE ID information.

Embodiment 2 (Multiple SPS Resources can be Consecutively Occupied after Successful Competition)

This embodiment describes a method in which the UE in the RRC idle mode uses the shared UL SPS resources by the contention resolution. In this embodiment, the UE may consecutively use an UL SPS resource multiple times after the UE succeeds in the contention on the UL SPS resource. If the UE transmits data on an UL SPS resource and succeeds in the contention, the UE can directly transmit data in multiple subsequent periods of this UL SPS resource without contention resolution, that is, the transmitted PUSCH needs not to include information for contention resolution, such as UE ID and the like.

In an example of this embodiment, the UE may consecutively use the UL SPS resource in its subsequent periods a predefined number of times after the UE succeeds in the contention on the UL SPS resource. For example, the predefined number of times is specified in the system standard, or configured in the system broadcast information. After a predefined number of PUSCHs, the UL SPS resource shall be released regardless of whether the uplink data transmission is completed or not. If the uplink data transmission is not completed, the UE may re-initiate the contention of the UL SPS resource.

In another example of this embodiment, the UE may continue to use the UL SPS resource within a predefined duration of time after the UE succeeds in the contention on the UL SPS resource. For example, the predefined duration of time is specified in the system standard, or configured in the system broadcast information. After the predefined duration of time, the UL SPS resource shall be released regardless of whether the uplink data transmission is completed or not. If the uplink data transmission is not completed, the UE may re-initiate the contention of the UL SPS resource.

In still another example of the embodiment, the UE may continue to use the UL SPS resource after the UE succeeds in the contention on the UL SPS resource, until the uplink data transmission is completed and the UL SPS resource is released implicitly, or until the explicit release signaling for the UL SPS resource is received.

In an example of this embodiment, the UE may initiate a contention based occupation in each period of an UL SPS resource, that is, a two-step contention based process is directly initiated when transmitting data. In another example, the UE can initiate a contention based occupation only in a specific period of a UL SPS resource. For example, the contention based occupation can be initiated every 10 periods of the UL SPS resource. Once succeeding in the contention, the UE can use the following 9 periods of the UL SPS resource.

Embodiment 3 (Contention Resolution is Needed Every Time the SPS Resource is Used)

This embodiment describes a method in which the UE in the RRC idle mode uses the shared UL SPS resources by the contention resolution. In this embodiment, the UE needs a contention resolution every time the UE uses the UL SPS resource. For example, the UE uses the above two-step method in the contention each time the UE transmits data on the UL SPS resource. If the UE initiates a contention in a certain period of an UL SPS resource and successfully occupies it, the UE cannot directly use the next period of the UL SPS resource to transmit data, and still needs to initiate a contention based occupation. Here, the UE may initiate a contention based occupation at any period of the UL SPS resource.

PDSCH Reception During the RRC Idle Mode UL SPS Transmission Process

During the RRC idle mode UL SPS transmission process described above, i.e., during the transmission of the RRC idle mode uplink pre-configured resource, the UE mainly transmits uplink data and monitors the physical downlink control channel for supporting the HARQ function of the UL SPS, such as at least one of ACK DCI or retransmission scheduling DCI, etc., and a physical downlink control channel for supporting the UL SPS resource reconfiguration or release feature, such as UL SPS at least one of resource reconfiguration DCI or resource release DCI, etc. That is, the physical channels involved in the transmission process are only the physical uplink data channel (PUSCH) and the physical downlink control channel (PDCCH).

In fact, the UE may receive a physical downlink data channel (PDSCH) during the RRC idle mode UL SPS transmission process without increasing too much power consumption of the UE. The PDSCH may be used for assistance in the RRC idle mode UL SPS transmission, or for transmitting a small amount of downlink data of the UE. Here, the RRC idle mode UL SPS transmission process refers to a period of time from transmitting the PUSCH to monitoring the corresponding ACK/retransmission scheduling DCI, that is, within a predefined or pre-configured time window after the PUSCH is transmitted.

Embodiment 1 (PDSCH Reception in the RRC Idle Mode UL SPS Transmission Process)

This embodiment describes a method for receiving a PDSCH in an RRC idle mode UL SPS transmission process. In this embodiment, the UE needs to perform the following process:

Step 1: the UE in the RRC idle mode transmits a PUSCH on the pre-configured uplink resources;

Step 2: The UE monitors DCI for scheduling the PDSCH in a time window after transmitting the PUSCH, and further receives the dynamically scheduled PDSCH.

Optionally, the time window may be predefined, i.e. the length of the time window is specified by the system. Optionally, the time window may be pre-configured, i.e. the length of the time window is configured by the cell system information.

In this embodiment, in a period of an UL SPS resource, the UE in the RRC idle mode may receive one and only one PDSCH and one or more retransmissions thereof within a time window after transmitting the UL SPS. The maximum number of PDSCH retransmissions is configured by the cell system information. That is, the UE receives at most only one physical downlink transport block (TB) in the time window. The advantage is that monitoring the DCI of the PDSCH and receiving the PDSCH do not increase the power consumption of the UE performing the UL SPS transmission too much.

In this embodiment, the length of the time window is broadcasted and configured in the cell system information, and is measured in ms (for the MTC system) or in PDCCH periods (for the NB-IOT system). Within the time window, the UE in the RRC idle mode that initiates the UL SPS transmission will monitor one or more of the following DCIs: DCI for scheduling the PDSCH initial transmission and retransmission, ACK DCI for the UL SPS, DCI for scheduling the UL SPS retransmission, reconfiguration DCI for UL SPS resources, release DCI for UL SPS resources, DCI carrying the TA update, DCI carrying the contention resolution signaling, and the like. After the time window, the UE will return to the normal RRC idle mode, enter the sleep mode, and wake up periodically to monitor paging messages.

Preferably, the length of the time window is configured by the cell system information. Optionally, the length of the time window is configured by the UE-specific RRC signaling. Optionally, the length of the time window is implicitly calculated according to a predefined rule, for example, calculated according to the period of the UL SPS resource.

In this embodiment, preferably, the total duration of the time window is changed, and the UE can control the time window by a timer. The UE starts the timer in the Nth subframe after transmitting the UL SPS, where N is a fixed value specified in the system standard, for example, N=4, and the interval of the N−1 subframes is used for the processing time of the base station for the PUSCH and the transmission preparation time for the corresponding physical downlink channel. The initial value of the timer is the subframe length of the time window configured by signaling. During the running of the timer, if the UE detects the DCI that schedules the PDSCH initial transmission or retransmission, or detects the DCI that schedules the UL SPS retransmission, and the remaining time of the timer is less than a fixed value specified by the system, for example, 8 ms, the timer will be increased to 8 ms to meet the minimum time of a HARQ round trip process for the PDSCH or PUSCH.

Optionally, the total duration of the time window is fixed, that is, the time window has a predefined or pre-configured length in subframes, and the start time of the time window starts from the Nth subframe after the UL SPS is transmitted, where N is a fixed value specified in the system standard, such as N=4.

In this embodiment, the DCI for scheduling the PDSCH and the DCI for scheduling the UL SPS retransmission scheduling use the same RNTI value, i.e. the RNTI value for UL SPS transmission. Additionally, the DCI for scheduling the PDSCH has the same payload size as the DCI for scheduling the UL SPS retransmission scheduling, and a 1-bit flag field is used to distinguish whether the DCI is used for uplink scheduling or downlink scheduling.

In this embodiment, the PDSCH received by the UE in the RRC idle mode after transmitting the UL SPS is based on the pdsch-ConfigCommon of the existing system, that is, the higher layer signaling configuration parameters of the Msg4 are reused. The PDSCH supports the HARQ feature (i.e., the UE should report the corresponding ACK/NACK), and the PUCCH used for reporting the ACK/NACK should be based on the PUCCH-ConfigCommon of the existing system, that is, the higher layer signaling configuration parameters of the ACK transmission of the Msg4 are reused.

In this embodiment, the PDSCH is used to carry one or more of the following:

Configuration Information of the RCC Connection

Here, the PDSCH can be used to carry configuration information of an RRC connection, which acts similarly to the Msg4 in the PRACH procedure in the existing system. That is, after transmitting the UL SPS, the UE in the RRC idle mode can quickly enter the RRC connected mode by receiving the PDSCH carrying the configuration information of the RRC connection.

For example, in the RRC idle mode UL SPS transmission process, if the network finds that a paging message arrives at the UE, the base station changes the UE from the RRC idle mode to the RRC connected mode by the PDSCH. Or the uplink arrival data of the UE cannot be completely transmitted by the UL SPS, and the UE reports information such as the BSR or the RRC connection request to the base station. The base station then changes the UE from the RRC idle mode to the RRC connected mode by the PDSCH.

RLC Layer ACK for the UL SPS

Here, the PDSCH can be used to carry the RLC layer ACK of the corresponding UL SPS.

TA Command MAC CE

Here, the PDSCH can be used to carry the TA command MAC CE for adjusting the TA of the UE.

Reconfiguration or Release of UL SPS Resources

Here, the PDSCH can be used to carry RRC signaling that reconfigures or releases the UL SPS resources.

Downlink Data of the UE

Here, the PDSCH can be used to carry a small amount of downlink data of the UE. The system specifies the maximum downlink data amount that the PDSCH is allowed to carry. If the downlink data amount is less than or equal to this maximum value, the base station may transmit the downlink data of the UE by the PDSCH in the UL SPS transmission process. If the downlink data amount is greater than this maximum value, the base station can only establish a RRC connection to transmit the downlink data of the UE.

Signaling for Carrying Shared UL SPS Resource Contention Resolution

Here, the pre-configured UL SPS resources are shared by the UEs, and the PDSCH can be used to carry the contention resolution signaling in the contention process of the shared UL SPS resources described above.

Using CRS to Improve the Demodulation Performance of MPDCCH

For IOT UEs (including MTC UEs and NB-IOT UEs), coverage enhancement (CE) is an Major feature. The radio channel conditions experienced by the IOT UE are generally poor. The lower SINR level affects the accuracy of the downlink channel estimation on the UE side, and thus degrades the demodulation performance of the physical downlink channel. If the downlink channel estimation performance of the IOT UE can be effectively improved in the CE mode, it will do more with less for the improvement of the physical downlink channel demodulation performance, and even reduce the number of repetitions of the physical downlink channel, thereby saving system resources and reducing the power consumption of the IOT UE. Such a gain is more obvious when the CE level is higher.

In the Rel-16 LTE MTC, a method for improving the demodulation performance of the MTC physical downlink control channel (MPDCCH) by using CRS is to be standardized, that is, improving the channel estimation performance of the MPDCCH by using a cell reference signal (CRS). For example, the CRS and the DMRS of the MPDCCH is used together for channel estimation, that is, there is an Mapping relationship between the CRS antenna ports and the DMRS antenna ports of the MPDCCH. The mapping relationship here indicates that the signals transmitted by the CRS antenna port and the MPDCCH DMRS antenna port come from the same antenna port, and the UE can perform channel estimation based on this assumption in combination with all RSs of the CRS antenna port and the MPDCCH DMRS antenna port. The channel estimation performance is significantly improved due to an increase in RS density.

For example, the DMRS antenna port occupies 12 REs in each PRB. Since two DMRS antenna ports are multiplexed in the manner of CDM on the same RE, it can be understood that the number of actually effective REs is 6, and the CRS antenna port 0 or 1 occupies 8 REs in each physical resource block (PRB), and the CRS antenna port 2 or 3 occupies 4 REs in each PRB. If the CRS antenna port 0 or 1 is joined, the reference signal (RS) density of the original DMRS antenna port increases approximately by 133%. If the CRS antenna port 2 or 3 is joined, the RS density of the original DMRS antenna port increases approximately by 67%. The great improvement of the RS density can effectively improve the channel estimate performance of the MPDCCH.

For the MTC UE, the following embodiments provide specific implementation methods for improving the MPDCCH channel estimation performance by using the CRS, and the embodiments may also be extended to the NB-IOT UE.

Embodiment 1 (Mapping Relationship Between DMRS Ports and CRS Ports Configured by Higher Layer Signaling)

This embodiment describes a method for improving the MPDCCH channel estimation performance by using the CRS. In this embodiment, the MTC UE is configured with an Mapping relationship between the CRS antenna ports and the MPDCCH DMRS antenna ports by using higher layer signaling. The mapping relationship here represents that a certain DMRS antenna port actually comes from a certain CRS antenna port or is obtained by mixing a plurality of CRS antenna ports by a precoder. The possible mapping relationships are as follows:

The DMRS antenna ports {107, 108, 109, 110} correspond to the CRS antenna ports {0, 1, 2, 3} one by one, that is, the DMRS antenna port 107 corresponds to the CRS antenna port 0, the DMRS antenna port 108 corresponds to the CRS antenna port 1, the DMRS antenna port 109 corresponds to the CRS antenna port 2, and the DMRS antenna port 110 corresponds to the CRS antenna port 3.

The DMRS antenna ports {107, 108, 109, 110} all correspond to CRS antenna port 0.

The DMRS antenna ports {107, 108} correspond to the CRS antenna port 0, and the DMRS antenna ports {109, 110} correspond to the CRS antenna port 1.

The DMRS antenna ports {107, 109} correspond to the CRS antenna port 0, and the DMRS antenna ports {108, 110} correspond to the CRS antenna port 1.

Each of the DMRS antenna ports {107, 108, 109, 110} is constructed from the CRS antenna port {0, 1, 2, 3} by a precoder, but the precoders corresponding to each DMRS antenna port are different.

Each of the DMRS antenna ports {107, 108} is constructed from the CRS antenna port {0, 1} by a precoder, but the precoders corresponding to the DMRS antenna ports 107 and 108 respectively are different. Each of the DMRS antenna ports {109, 110} is constructed from the CRS antenna port {2, 3} by a precoder, but the precoders corresponding to the DMRS antenna ports 109 and 110 respectively are different.

Each of the DMRS antenna ports {107, 109} is constructed from the CRS antenna port {0, 1} by a precoder, but the precoders corresponding to the DMRS antenna ports 107 and 109 respectively are different. Each of the DMRS antenna ports {108, 110} is constructed from the CRS antenna port {2, 3} by a precoder, but the precoders corresponding to the DMRS antenna ports 108 and 110 respectively are different.

The above mapping relationships A and E are configured only when the number of CRS antenna ports is 4, and the mapping relationships C, D, F, and G are configured only when the number of CRS antenna ports is greater than or equal to 2.

For the above mapping relationships B, C, and D, when multiple DMRS antenna ports correspond to the same CRS antenna port, the UE may perform channel estimation together with the multiple DMRS antenna ports and the CRS antenna port. Compared to the case only one DMRS antenna port corresponds to one CRS antenna port, channel estimation performance can be further improved.

For the above mapping relationships E, F, and G, when a DMRS antenna port is constructed by a plurality of CRS antenna ports by a precoder, it indicates that multiplying the channel response estimated from the multiple CRS antenna ports by a precoder is equivalent to the channel response estimated from the DMRS antenna port. The advantage of this method is that the beamforming performance of the MPDCCH can be ensured when the channel estimation performance of the MPDCCH is improved by the CRS. If the CRS antenna port corresponds directly to the DMRS antenna port, since the CRS is a cell common reference signal and cannot be beamformed, the DMRS of the MPDCCH cannot be beamformed.

In an example, the precoder described above is explicitly configured by signaling, for example, by using a higher layer signaling configuration to construct a precoder of a DMRS antenna port using a CRS antenna port. In another example, the precoder is determined in an implicit manner. For example, a precoder is determined from a group of precoders by using predefined rule according to at least one of a C-RNTI value of the UE, a DMRS antenna port index number, or a subframe index number. In an example, when the MPDCCH is repeated, the precoder keeps consistent over a plurality of consecutive subframes to maintain a strong correlation of the channel responses on the plurality of subframes to improve channel estimation accuracy. When the MPDCCH is configured to be frequency-modulated in multiple narrowbands, each time the narrowband is switched, the corresponding precoder can also be changed once according to a predefined rule.

In an example of the embodiment, there is a default mapping relationship between the CRS antenna ports and the MPDCCH DMRS antenna ports, for example, one of the foregoing multiple mapping relationships. That is, no signaling configuration is required, but the MTC UE needs to configure, via the higher layer signaling, whether there is a default mapping relationship between the CRS antenna ports and the MPDCCH DMRS antenna ports. If the default mapping relationship is configured, the CRS can be used to improve the channel estimation of the MPDCCH. Otherwise, the CRS cannot be used to improve the MPDCCH channel estimation.

In an example of the embodiment, there is a default mapping relationship between the CRS antenna ports and the MPDCCH DMRS antenna ports (i.e., no signaling configuration is required), and the mapping relationship is related to the number of CRS antenna ports configured in the cell (i.e., different numbers of CRS antenna ports correspond to different mapping relationships).

In an example, if the number of CRS antenna ports is 1, the default DMRS antenna ports {107, 108, 109, 110} all correspond to the CRS antenna port 0; if the number of CRS antenna ports is 2, or if the number of CRS antenna ports is greater than or equal to 2 (i.e. 2 or 4), the default DMRS antenna ports {107,108} (or {107,109}) correspond to the CRS antenna port 0, and the DMRS antenna ports {109,110} (or {108,110}) correspond to CRS antenna port 1; and if the number of CRS antenna ports is 4, the default DMRS antenna ports {107, 108, 109, 110} correspond to the CRS antenna port {0, 1, 2, 3} one by one.

In another example, if the number of CRS antenna ports is 1, the default DMRS antenna port 107 corresponds to the CRS antenna port 0, and the other DMRS antenna ports have no mapping relationship with the CRS antenna ports; if the number of CRS antenna ports is 2, the default DMRS antenna port 107 corresponds to the CRS antenna port 0, the DMRS antenna port 108 corresponds to the CRS antenna port 1, and the other DMRS antenna ports have no mapping relationship with the CRS antenna ports; and if the CRS antenna port number is 4, the default DMRS antenna ports {107, 108, 109, 110} and the CRS antenna ports {0, 1, 2, 3} are mapped one by one.

In an example of the embodiment, the mapping relationship between the CRS antenna ports and the MPDCCH DMRS antenna ports can be configured as one of the above multiple mapping relationships by higher layer signaling. For example, the mapping relationship between the CRS antenna ports and the MPDCCH DMRS antenna ports is configured by the eNB as one of the above mapping relationships {B, C}, or as one of the above mapping relationships {B, D}, or as one of the above mapping relationship {B, C, D}.

In an example of the embodiment, the mapping relationship between the CRS antenna ports and the MPDCCH DMRS antenna ports can be configured by UE-specific RRC signaling or configured in the cell system information. However, the two signaling methods will not be used simultaneously. Configuring by the UE-specific RRC signaling indicates that the CRS is only used for the MPDCCH performance improvement of the UE-specific search space, and configuring by the cell system information indicates that the CRS can be used for the MPDCCH performance improvement of both common search space and the UE-specific search space simultaneously.

In another example of the embodiment, the mapping relationship between the CRS antenna ports and the MPDCCH DMRS antenna ports can be configured by UE-specific RRC signaling or configured in the cell system information. These two signaling methods can be configured separately, i.e., be configured simultaneously. The signaling configured by the UE-specific RRC signaling is only used for the MPDCCH performance improvement in the UE-specific search space, and the signaling configured by the cell system information is only used for the MPDCCH performance improvement in the common search space. In an example, when the two signaling methods are configured simultaneously, the configured mapping relationships must be the same. In another example, when the two signaling methods are configured simultaneously, the configured mapping relationships may be or may not be the same.

In an example of the embodiment, if the MTC UE is configured with the mapping relationship between the CRS antenna ports and the MPDCCH DMRS antenna ports by using the higher layer signaling, the MTC UE may also be configured with the power offset value between the CRS antenna ports and the DMRS antenna ports by the higher layer signaling. For example, 2 bits are used to indicate the 4 power offset values of the DMRS antenna ports relative to the CRS antenna ports: {0, 3, 6, 9} dB. In another example, the power offset values are the power offset of the DMRS antenna ports relative to the CRS antenna ports.

In another example of this embodiment, if the MTC UE is configured with the mapping relationship between the CRS antenna ports and the MPDCCH DMRS antenna ports by using the higher layer signaling, the MTC UE may determine by default that the CRS antenna ports and the DMRS antenna ports have the same transmit power, or that the transmit power of the DMRS antenna ports is 3 dB higher than that of the CRS antenna ports, without the need of signaling for indicating the relationship between the transmit powers of the CRS antenna ports and the DMRS antenna ports.

Embodiment 2 (Parameter Configuration of the Mapping Relationship Between DMRS Ports and CRS Ports)

This example describes a parameter configuration for improving the MPDCCH performance by using the CRS. In order to support the improvement of the channel estimation performance of the MPDCCH DMRS ports by using the CRS, the UE needs to receive one or more in the following parameter configuration:

Whether the CRS and MPDCCH DMRS have a predefined mapping relationship (i.e., a precoder)

When the parameter is configured as being "true," the CRS and the MPDCCH DMRS have a predefined mapping relationship. The predefined mapping relationship refers to a mapping relationship specified by the system. The UE may improve the channel estimation performance of the MPDCCH DMRS by using the CRS according to this mapping relationship without an indication in the form of signaling.

The mapping relationship between the CRS and a MPDCCH DMRS is represented by a precoding vector (or a precoder). Here, the precoder represents a generalized concept. Each element in the precoder can be set to 0, that is, an MPDCCH DMRS port can be mapped to one or more CRS ports by a precoder.

For example, the precoding vector indicating the mapping relationship between the CRS and a certain MPDCCH DMRS port may be $$\frac{1}{2}[1\ 1\ 1\ 1],$$

i.e. the MPDCCH DMRS port is mapped to CRS ports 0~3, and is constructed from four CRS ports. In particular, the precoding vector can also be [1 0 0 0], i.e., the MPDCCH DMRS port is mapped to CRS port 0 and is constructed by only CRS port 0, which also indicates that the MPDCCH DMRS port and the CRS port actually come from the same antenna port. In particular, the precoding vector can also be $$\frac{1}{\sqrt{2}}[1\ 1\ 0\ 0],$$

i.e., the MPDCCH DMRS port is mapped to CRS ports 0~1, and is constructed by only CRS ports 0 and 1.

Optionally, the mapping relationship between the CRS and different MPDCCH DMRS ports must use different precoders. Optionally, the mapping relationship between the CRS and different MPDCCH DMRS ports can use the same procoder. If the mapping relationships between two MPDCCH DMRS ports and the CRS respectively are the same, which indicates that the two MPDCCH DMRS ports actually come from the same antenna port.

Optionally, the mapping relationship between the CRS and the MPDCCH DMRS is unchanged in at least one of the time domain or the frequency domain by default. Being unchanged in the time domain means that a same precoder is used in each subframe, and the UE may average the radio channel response across subframes in the time domain to improve the channel estimation performance. Being unchanged in the frequency domain means that a same precoder is used in each PRB, and the UE may interpolate the radio channel response across PRBs in the frequency domain to improve the channel estimation performance.

Optionally, a precoder cycling is performed on the mapping relationship between the CRS and the MPDCCH DMRS in a predefined manner and according to a predefined granularity in at least one of the time domain or the frequency domain by default. The UE may optimize the channel estimation algorithm across subframes or PRBs according to the cycling granularity to improve the performance.

The predefined cycling granularity of the mapping relationship in at least one of the time domain or the frequency domain is M subframes or N PRBs, i.e., using the same mapping relationship in M consecutive subframes or N consecutive PRBs. The mapping relationship changes once every M subframes or every N PRBs, and M and N are a predefined values, for example, M=4, N=2. The predefined cycling may be that, in a predefined set of precoders, the precoders cycle in order. The codebook for reporting a precoding matrix indicator (PMI) in the existing systems, or part of it, may be used as the set of precoders for cycling, or the system may newly define a set of precoders.

When the mapping relationship cycles in both time domain and frequency domain, it is assumed that there is four precoders available for cycling, and that the MPDCCH occupies six PRBs. Then the cycling may be performed as shown in FIG. 11.

Optionally, when the mapping relationship is cycled, the precoder for at least one of the first subframe or the first PRB is determined by the DMRS port number. For example, the DMRS port 107 starts it cycling from the first precoder in the predefined set of precoders; the DMRS port 108 starts it cycling from the second precoder in the predefined set of precoders; the DMRS port 109 starts it cycling from the third precoder in the predefined set of precoders; and the DMRS port 110 starts it cycling from the fourth precoder in the predefined set of precoders.

Optionally, when the mapping relationship is cycled, each DMRS port corresponds to a predefined set of precoders, that is, different DMRS ports implement the cycling based on different predefined sets of precoders.

Optionally, when the mapping relationship is cycled, the precoder for at least one of the first subframe or the first PRB is determined by the DMRS port number and the subframe number. For example, P_i=(Subframe+Port) % N, where Subframe is the subframe number ranging from 0 to 9, Port is the DMRS port number represented by 107~109, or by 0~3, N is the total number of precoders predefined for cycling (i.e., the size of the set of precoders), and P_i is the number of an element in the set of precoders.

Optionally, when the mapping relationship is cycled, the precoder for at least one of the first subframe or the first PRB is determined by the DMRS port number, the subframe number and the physical cell ID. For example, P_i=(SubframeNumber+Port+PCI) % N, where SubframeNumber is the subframe number ranging from 0 to 9, Port is the DMRS port number represented by 107~109, or by 0~3, PCI is a physical cell ID, N is the total number of precoders in the predefined set of precoders, and P_i is the number of an element in the set of precoders.

When the MPDCCH is configured in the frequency hopping mode, optionally, the mapping relationship between the CRS and the MPDCCH DMRS keeps the same by default in the narrowbands for frequency hopping. Optionally, the mapping relationship between the CRS and the MPDCCH DMRS may be different in the narrowbands for frequency hopping, and there may be a predefined relationship.

Mapping relationship (i.e., precoder) between the CRS and the MPDCCH DMRS

Optionally, the base station respectively configures a corresponding precoder for each MPDCCH DMRS port.

Optionally, the base station configures a corresponding precoder only for the first MPDCCH DMRS port (i.e., port 107), and there is a predefined relationship between the precoders corresponding to other MPDCCH DMRS ports and the precoder corresponding to the first MPDCCH DMRS port.

Optionally, for localized MPDCCHs, the configurable mapping relationship between the CRS and the MPDCCH DMRS may use the precoders in the codebook for reporting a PMI in the existing systems, i.e., one MPDCCH DMRS port may be mapped to a plurality of CRS Ports. For example, there are 16 configurable precoders, and the system uses 4 bits to indicate which precoder is used by the UE.

Optionally, for distributed MPDCCHs, the configurable mapping relationship between the CRS and the MPDCCH DMRS may be [1 0 0 0], [0 1 0 0], [0 0 1 0] and [0 0 0 1], i.e., one MPDCCH DMRS port is only mapped to one CRS port. For example, there are 4 configurable precoders, and the system uses 2 bits to indicate which precoder is used.

The precoder cycling described in parameter 1 can also be used here, except that the precoder for the first subframe or the first PRB is received by explicit signaling, rather than implicitly.

Optionally, the mapping relationship (i.e., the precoder) between the CRS and the MPDCCH DMRS is configured by RRC layer signaling, for example, indicated by UE-specific RRC signaling or the cell system information.

Optionally, the mapping relationship (i.e., the precoder) between the CRS and the MPDCCH DMRS is configured by MAC layer signaling, for example, indicated by a MAC CE.

Optionally, the mapping relationship (i.e., the precoder) between the CRS and the MPDCCH DMRS is configured by physical layer signaling, for example, indicated by a DCI, where the DCI may be Cell Specific, UE Specific, or UE-group Specific.

Optionally, if the UE has reported the PMI, the UE should consider that the mapping relationship between the CRS and the MPDCCH DMRS uses the PMI newly reported by the UE by default, and the mapping relationship keeps unchanged in both the time domain and the frequency domain. If the UE did not report a PMI previously for a period of time, the UE should use the configured mapping relationship between the CRS and the MPDCCH DMRS.

Whether the mapping relationship (i.e., precoder) between the CRS and the MPDCCH DMRS is cycled in the frequency domain.

This parameter is used to indicate whether the mapping relationship between the CRS and the MPDCCH DMRS is cycled in the frequency domain. When this parameter is configured as being "true," the UE should consider that the mapping relationship between the CRS and the MPDCCH DMRS on all of PRBs (6 PRB) within a narrowband are the same, i.e., the PRB bundling has a granularity of 6 PRBs; otherwise, the UE should consider that the mapping relationship between the CRS and the MPDCCH DMRS is cycled PRB by PRB in a predefined manner.

Granularity (the number of PRBs) for the cycling of the mapping relationship (i.e., the precoder) between the CRS and the MPDCCH DMRS in the frequency domain This parameter is also called the PRB number for a PRB bundling of the mapping relationship between the CRS and the MPDCCH DMRS. The PRB bundling means that the DMRS uses the same precoder on multiple adjacent PRBs, that is, the CRS and the MPDCCH DMRS have the same mapping relationship on multiple adjacent PRBs. The UE may interpolate the radio channel response across PRBs to improve the channel estimation performance.

This parameter indicates that the MPDCCH DMRS uses the same precoder in N adjacent PRBs, i.e., the CRS and the MPDCCH DMRS have the same mapping relationship, where the configurable values of N may be at least one of 2, 3, 4, or 6. The UE may interpolate the radio channel response across N PRBs to improve the channel estimation performance.

Whether the mapping relationship (i.e., precoder) between the CRS and the MPDCCH DMRS is cycled in the time domain When this parameter is configured as being "true," the UE should consider that the mapping relationship between the CRS and the MPDCCH DMRS is cycled per subframe in time, or cycled according to a predefined granularity, for example, every 2 subframes; otherwise, the UE should consider that the mapping relationship between the CRS and the MPDCCH DMRS keeps unchanged in the time domain, i.e., the precoder of the MPDCCH DMRS keeps the same in all subframes, and the UE may average the radio channel response across subframes to improve the channel estimation performance.

Granularity (the number of subframes) for the cycling of the mapping relationship (i.e., the precoder) between the CRS and the MPDCCH DMRS in the time domain This parameter indicates that the CRS and the MPDCCH DMRS have the same mapping relationship and this mapping relationship cycles every N adjacent subframes, i.e., the MPDCCH DMRS uses the same precoder in N subframes, where the configurable values of N may be at least one of 2,3,4, or 6. The UE may interpolate the radio channel response across N subframes to improve the channel estimation performance.

Power Offset Value of the CRS from the MPDCCH DMRS

Optionally, this parameter is optionally configured. If this parameter is not configured by the network, the UE uses a predefined value, e.g., 0 dB, for the power offset of the CRS from the MPDCCH DMRS.

Whether the mapping relationship between the CRS and the MPDCCH DMRS is based on the reported PMI When this parameter is configured as being "true," the UE should use the latest reported PMI as the mapping relationship between the CRS and the MPDCCH DMRS. The CRS and the MPDCCH DMRS use a reported precoder in both the time domain and the frequency domain, until a next updated PMI report is applied. The system should specify that the UE uses the reported PMI for the CRS and the MPDCCH DMRS at the N-th sub-frame after the PMI report has been transmitted, e.g., N=4.

Optionally, the above parameters 1~8 are configured via UE-specific RRC signaling, and the UE applies the configured parameters to the configured UE-specific search space (USS) and Type® common search space (CSS) of the MPDCCH.

Optionally, the above parameters 1~8 are configured via UE-specific RRC signaling, and the UE applies the configured parameters to the MPDCCH USS only.

Optionally, the above parameters 1~8 are configured via UE-specific RRC signaling, and the UE applies the configured parameters to the MPDCCH Type® CSS only.

Optionally, the above parameters 1~8 are configured via UE-specific RRC signaling, and the UE applies the configured parameters to the MPDCCH USS and all CSSs, including Type0, Type1, Type1A, Type2, and Type2A CSSs.

Optionally, the above parameters 1~8 are configured via the cell system information broadcast, and the UE applies the configured parameters to the MPDCCH Type0 CSS only.

Optionally, the above parameters 1~8 are configured via the cell system information broadcast, and the UE applies the configured parameters to the MPDCCH Type1 CSS (for paging) and Type2 CSS (for RAR) only.

Optionally, the above parameters 1~8 are configured via the cell system information broadcast, and the UE applies the configured parameters to all MPDCCH CSSs, including Type0, Type1, Type1A, Type2, and Type2A CSSs.

Optionally, the above parameters 1~8 are configured for each MPDCCH search space respectively, and the configured parameters are only used for the corresponding MPDCCH search space.

Optionally, the above parameters 1~8 can be configured only when the number of CRS ports is configured as 4. That is, when the number of CRS ports is less than 4, the CRS cannot be used to improve the channel estimation performance of the MPDCCH DMRS.

Optionally, the above parameters 1~8 can be configured only when the number of CRS ports is configured as 2 or 4. That is, when the number of CRS ports is 1, the CRS cannot be used to improve the channel estimation performance of the MPDCCH DMRS.

Optionally, the above parameters 3 and 5 may be combined into one parameter. That is, the mapping relationship between the CRS and the MPDCCH DMRS is either the same in both the time domain and the frequency domain, or is cycled in a predefined manner and according to a predefined granularity in both the time domain and the frequency domain.

Optionally, the method of improving the MPDCCH DMRS performance by using the CRS can be applied to the non-MBSFN subframe only. That is, the above parameter configurations 1~8 can be used only for the non-MB SFN subframes. Regarding the MBSFN subframe, the UE should not assume there is a mapping relationship between the CRS and the MPDCCH DMRS.

Optionally, for a localized MPDCCH, the CRS and the MPDCCH DMRS may use the mapping relationship configured by the base station, or use the mapping relationships reported based the PMI among which the base station indicates which one to use. Regarding the former, the UE should use the mapping relationship configured by the base station for the CRS and the MPDCCH DMRS, and keep it the same in both the time domain and the frequency domain until the configuration information of a new mapping relationship is received. Regarding the later, the UE should use the latest reported PMI for the CRS and the MPDCCH DMRS, and keep it the same in both the time domain and the frequency domain until a next updated PMI report is applied.

The system should specify that the UE uses the reported PMI for the CRS and the MPDCCH DMRS at the N-th sub-frame after the PMI report has been transmitted, e.g., N=4.

For the localized MPDCCHs, the set of precoders, which can be configured by the mapping relationship between the CRS and the MPDCCH DMRS, may use the codebook for reporting a PMI in the existing systems or a part of it, i.e., one MPDCCH DMRS port may be mapped to a plurality of CRS Ports.

Optionally, for a distributed MPDCCH, the CRS and the MPDCCH DMRS should use a predefined mapping relationship cycling. That is, the set of precoders for cycling is specified in a specification, and the cycling granularity used for the mapping relationship in at least one of the time domain or the frequency domain should be configured by the base station. For example, the cycling granularity for the mapping relationship in the time domain may be configured as 4 sub-frames. That is, the mapping relationship changes every 4 subframes, and a same mapping relationship is used in the 4 sub-frames. The cycling granularity for the mapping relationship in the frequency domain may be configured as 2 PRBs. That is, the mapping relationship changes every 2 PRBs, and a same mapping relationship is used in the 2 PRBs.

For the distributed MPDCCHs, the set of precoders which may be used by the mapping relationship between the CRS and the MPDCCH DMRS may be [1 0 0 0], [0 1 0 0], [0 0 1 0] and [0 0 0 1], i.e., one MPDCCH DMRS port is only mapped to one CRS port.

Punching or Rate-Matching the REs of the CSI-RS

In order to allow the IOT UE (including the MTC UE and the NB-IOT UE) to coexist better with the LTE UE, the CSI-RS configuration for the LTE UE may also be notified to the IOT UE, so that the IOT UE may keep away from the RE location of the CSI-RS when receiving the PDSCH. Then the IOT UE has an more accurate understanding of the RE location used for an actual transmission of the PDSCH, and the decoding performance of the PDSCH can be improved. This design is more suitable for the non-BL/CE UE of the MTC system, because the non-BL UE itself can work in the mode of the normal LTE UE, and already has the capability for supporting the CSI-RS.

Embodiment 1 (Receiving CSI-RS Configuration Signaling for PDSCH Reception)

This embodiment describes a method for receiving a PDSCH based on the configuration information of the CSI-RS. In this embodiment, the UE needs to perform the following process:

Step 1: The UE receives configuration information of the CSI-RS;

Step 2: The UE performs puncturing or rate-matching processing on the REs of the CSI-RS according to the configuration information of the CSI-RS when receiving the PDSCH.

In one example, the CSI-RS configuration information described above is configured by the UE-specific RRC signaling. In another example, the CSI-RS configuration information described above is broadcast and configured in the cell system information.

In this embodiment, the UE comprises an MTC UE and an NB-IOT UE. The CSI-RS configuration information is only used to assist the reception of the PDSCH to improve the detection performance of the PDSCH, and the UE does not need to measure the CSI-RS. The CSI-RS configuration information is used to indicate the location of the CSI-RS subframe, the period of the CSI-RS, and the frequency domain pattern of the CSI-RS. The UE can determine the location of the REs of the CSI-RS according to the CSI-RS configuration information, and the UE punches or rate-matches the REs of the CSI-RS when receiving the PDSCH In an example, the UE performs puncturing on the REs of the CSI-RS when receiving the PDSCH. That is, the rate-matching of the PDSCH is based on the assumption that the REs of the CSI-RS are available, but the UE discards the received PDSCH signal on the REs of the CSI-RS.

In another example, the UE performs rate-matching on the REs of the CSI-RS when receiving the PDSCH. That is, the rate-matching of the PDSCH is based on the assumption that the REs of the CSI-RS are not available, and the UE considers that there is no PDSCH signal mapping on the REs of the CSI-RS.

In another example, the UE performs puncturing or rate-matching on the REs of the CSI-RS when receiving the PDSCH. For example, when the number of transmitting subframes of the PDSCH is 1, (i.e., the PDSCH is not repeatedly transmitted), the UE performs the rate-matching on the REs of the CSI-RS when receiving the PDSCH. When the number of the transmitting subframes of the PDSCH is greater than 1 (i.e., the PDSCH is repeatedly transmitted), the UE performs the puncturing on the REs of the CSI-RS when receiving the PDSCH.

The advantage of the above example is that when the PDSCH is repeatedly transmitted, there may be CSI-RSs on some PDSCH subframes, and there may be no CSI-RSs on some PDSCH subframes. The puncturing can facilitate the soft combining of the PDSCH signals on multiple subframes. The puncturing is preferred when the PDSCH is repeatedly transmitted. When the PDSCH is not repeatedly transmitted, the rate-matching based receiving can obtain better decoding performance than the puncturing based receiving.

The method and apparatus involved in the invention have been described above with respect to the preferred embodiments. The present invention provides a scheme for supporting RRC idle mode uplink transmission, which can save the signaling overhead for establishing a RRC connection and the dynamic scheduling signaling for each UL PUSCH transmission, and also avoids additional UE power consumption in the RRC connected mode, thereby improving the system transmission efficiency and reducing the UE power consumption.

Those skilled in the art will appreciate that the methods shown above are merely exemplary. The method of the present invention is not limited to the steps and order shown above. The base station and the user equipment shown above may include more modules, for example, may include available modules that may have been developed or will be developed in the future for the base station or the UE, and the like. Various identities shown above are merely illustrative rather than limiting, and the invention is not limited to these specific names that are examples of these identities. Many variations and modifications may be made by those skilled in the art in view of the teachings of the illustrated embodiments.

Those skilled in the art will appreciate that the disclosure includes a device that is directed to performing one or more of the operations described herein. These devices may be specially designed and manufactured for the required purposes, or may also include known devices in a general purpose computer. These devices have computer programs stored therein that are selectively activated or reconstructed. Such computer programs may be stored in a device (e.g., a computer) readable medium or in any type of mediums suitable for storing electronic instructions and respectively coupled to a bus, including but not limited to any types of disks (including floppy disk, hard disk, optical disk, CD-ROM, and magneto-optical disk), read-only memory (ROM), random access memory (RAM), erasable programmable read-only memory (EPROM), electrically erasable programmable read-only memory (EEPROM), flash memory, magnetic card or light card. That is, a readable medium includes any medium on which a device (e.g., a computer) can store or transmit information in a readable form.

Those skilled in the art will appreciate that each block of at least one of the structural diagrams, block diagrams or flow diagrams and combinations of blocks of at least one of the structural diagram, block diagram or flow diagram can be implemented by computer program instructions. Those skilled in the art will appreciate that these computer program instructions can be implemented by a general purpose computer, a professional computer, or a processor for other programmable data processing methods, such that the solutions disclosed in the block(s) of at least one of the structural diagram, block diagram, or flow diagrams are executed by the computer or the processor for other programmable data processing method.

Those skilled in the art can understand that the steps, measures, and solutions in various operations, methods, and flows discussed in the disclosure may be alternated, modified, combined, or deleted. Further, other steps, measures, and solutions in various operations, methods, and flows discussed in the disclosure may also be alternated, modified, rearranged, decomposed, combined, or deleted. Further, the steps, measures, and solutions in various operations, methods, and flows disclosed in the disclosure, together with those of the prior art, may be alternated, modified, rearranged, decomposed, combined, or deleted.

The above is only a part of the embodiments of the disclosure, and it should be noted that those skilled in the art can also make some improvements and refinements without departing from the principles of the disclosure, which should be regarded as the protection scope of this disclosure.

The invention claimed is:

1. A method performed by a user equipment (UE) in a wireless communication system, the method comprising:
　receiving configuration information associated with a preconfigured uplink resource (PUR) from a base station (BS);
　identifying that the configuration information includes a parameter ImplicitReleaseAfter, while the UE is in a radio resource control (RRC) idle mode; and
　if a number of consecutive occasions for the PUR have been skipped, releasing the configuration information associated with the PUR,
　wherein the parameter ImplicitReleaseAfter indicates the number of consecutive occasions for the PUR that can be skipped before the releasing of the configuration information.

2. The method of claim 1, wherein the receiving of the configuration information associated with the PUR comprises:
　receiving the configuration information associated with the PUR in an RRC connected mode; and
　storing the configuration information associated with the PUR when an RRC connection is released.

3. The method of claim 2, wherein the receiving of the configuration information associated with the PUR comprises:

receiving at least one of a parameter or a resource configuration for an RRC idle mode uplink transmission via user equipment (UE) specific RRC signaling in the RRC connected mode.

4. The method of claim 3, further comprising:
monitoring activation signaling in the RRC idle mode, the activation signaling being used to activate configured resources for the RRC idle mode uplink transmission; and
transmitting uplink data in the RRC idle mode on the activated configured resources.

5. The method of claim 2, further comprising:
receiving a timing advance (TA) in the RRC connected mode; and
storing the TA when the RRC connection is released, for use in transmitting uplink data in the RRC idle mode.

6. The method of claim 1, wherein the receiving of the configuration information associated with the PUR comprises:
requesting the PUR via a random access procedure.

7. The method of claim 6, wherein the requesting of the PUR via the random access procedure comprises:
transmitting request information which is carried by a random access message 3; and
receiving the configuration information associated with the PUR which is carried by a random access message 4.

8. The method of claim 6, wherein the requesting of the PUR via the random access procedure comprises:
transmitting request information which is carried by a random access message 3;
receiving the configuration information associated with the PUR which is carried by a random access message 4; and
receiving a resource configuration for the RRC idle mode which is carried by downlink control information (DCI) of a random access message 5.

9. The method of claim 6, further comprising:
receiving information indicating that the BS refuses to pre-configure the PUR for the RRC idle mode, which is carried by a random access message 4.

10. The method of claim 6, further comprising:
falling back to establish or resume an RRC connection, when the request is rejected during the random access procedure.

11. The method of claim 6, further comprising:
receiving a TA for the RRC idle mode which is carried by a random access message 2; or
receiving a TA for the RRC idle mode which is carried by DCI.

12. The method of claim 1, further comprising:
releasing a resource for the RRC idle mode.

13. The method of claim 1, wherein the releasing of the configuration information associated with the PUR comprises one of:
releasing the configuration information associated with the PUR after a timing alignment timer for managing a timing advance (TA) expires; or
releasing the configuration information associated with the PUR after receiving release signaling from the BS.

14. The method of claim 1, further comprising:
falling back to a random access procedure to establish or resume an RRC connection, after a predetermined number of transmissions on the RRC idle mode have failed.

15. The method of claim 1, wherein the PUR is semi-statically configured.

16. A user equipment (UE) in a wireless communication system, the UE comprising:
a transceiver; and
a controller coupled with the transceiver, and configured to:
receive configuration information associated with a preconfigured uplink resource (PUR), from a base station (BS),
identify that the configuration information includes a parameter ImplicitReleaseAfter, while the UE is in a radio resource control (RRC) idle mode, and
if a number of consecutive occasions for the PUR have been skipped, release the configuration information associated with the PUR,
wherein the parameter ImplicitReleaseAfter indicates the number of consecutive occasions for the PUR that can be skipped before the releasing of the configuration information.

* * * * *